(12) United States Patent
Somerman et al.

(10) Patent No.: US 12,478,662 B2
(45) Date of Patent: Nov. 25, 2025

(54) TNAP LOCALLY ADMINISTERED FOR PROMOTING PERIODONTAL HEALTH

(71) Applicants: THE UNITED STATES OF AMERICA, AS REPRESENTED BY THE SECRETARY, DEPARTMENT OF HEALTH AND HUMAN SERVICES, Bethesda, MD (US); OHIO STATE INNOVATION FOUNDATION, Columbus, OH (US); SANFORD BURNHAM PREBYS MEDICAL DISCOVERY INSTITUTE, La Jolla, CA (US); YALE UNIVERSITY, New Haven, CT (US)

(72) Inventors: Martha J. Somerman, Chevy Chase, MD (US); Nadine Laure Samara, Rockville, MD (US); Atsuhiro Nagasaki, Sendai (JP); Demetrios T. Braddock, New Haven, CT (US); Brian Lee Foster, Hilliard, OH (US); Jose Luis Millan, San Diego, CA (US)

(73) Assignees: The United States of America as represented by the Secretary Department of Heath and Human Services, Bethesda, MD (US); Ohio State Innovation Foundation, Columbus, OH (US); Sanford Burnham Prebys Medical Discovery Institute, La Jolla, CA (US); Yale University, New Haven, CA (US)

( * ) Notice: Subject to any disclaimer, the term of this patent is extended or adjusted under 35 U.S.C. 154(b) by 580 days.

(21) Appl. No.: 17/789,742

(22) PCT Filed: Dec. 31, 2020

(86) PCT No.: PCT/US2020/067697
§ 371 (c)(1),
(2) Date: Jun. 28, 2022

(87) PCT Pub. No.: WO2021/138581
PCT Pub. Date: Jul. 8, 2021

(65) Prior Publication Data
US 2023/0201315 A1 Jun. 29, 2023

Related U.S. Application Data

(60) Provisional application No. 62/957,051, filed on Jan. 3, 2020.

(51) Int. Cl.
*A61K 38/46* (2006.01)
*A61K 9/00* (2006.01)
*A61P 43/00* (2006.01)

(52) U.S. Cl.
CPC ............ *A61K 38/46* (2013.01); *A61K 9/0019* (2013.01); *A61P 43/00* (2018.01)

(58) Field of Classification Search
CPC .... A61K 38/46; A61K 9/0019; A61K 38/465; A61P 43/00; A61P 3/14; A61P 19/08
See application file for complete search history.

(56) References Cited

U.S. PATENT DOCUMENTS 7,763,712 B2  7/2010  Crine et al.
7,943,126 B2  5/2011  Tomatsu et al.
(Continued)

FOREIGN PATENT DOCUMENTS

WO   WO-2006039480 A2 *  4/2006   ............... C12N 9/16
WO   WO-2015112017 A1 *  7/2015   ............... A61P 37/02
(Continued)

OTHER PUBLICATIONS

NP_000469.3 (NCBI, Nov. 2019) (Year: 2019).*
(Continued)

*Primary Examiner* — Robert B Mondesi
*Assistant Examiner* — Naghmeh Nina Moazzami
(74) *Attorney, Agent, or Firm* — Klarquist Sparkman, LLP; Susan Alpert Siegel; Sheree L. Rybak

(57) ABSTRACT

Methods are disclosed for treating periodontal disease, peri-implantitis, or to preserve a tooth socket in a subject. These methods include selecting a subject with periodontal disease, peri-implantitis, or in need of tooth socket preservation; and locally administering into the periodontium of the subject a therapeutically effective amount of a tissue-non-specific alkaline phosphatase (TNAP) polypeptide, or a nucleic acid molecule encoding the recombinant TNAP polypeptide. Methods are also disclosed for i) promoting alveolar bone regeneration in the subject; ii) increasing attachment of a periodontal ligament to a root surface of a (Continued)

tooth in the subject; iii) increasing cementum formation; and/or iv) increasing mineralization in a tooth in the subject. Pharmaceutical compositions are also disclosed that are of use in these methods.

20 Claims, 13 Drawing Sheets

Specification includes a Sequence Listing.

(56) References Cited

U.S. PATENT DOCUMENTS

| | | | |
|---|---|---|---|
| 9,988,620 B2 | 6/2018 | Crine | |
| 2009/0053192 A1* | 2/2009 | Millan | A61P 3/14 424/94.6 |
| 2010/0297119 A1 | 11/2010 | Crine et al. | |
| 2018/0230445 A1 | 8/2018 | Jaluria | |
| 2018/0333470 A1 | 11/2018 | Ordljin | |

FOREIGN PATENT DOCUMENTS

| | | | | |
|---|---|---|---|---|
| WO | WO-2015126729 A1 * | 8/2015 | | A61K 38/00 |
| WO | WO 2017/058822 | 4/2017 | | |
| WO | WO 2018/183720 A1 | 10/2018 | | |

OTHER PUBLICATIONS

Rajeshwari et al., Local drug delivery systems in the management of periodontitis: A scientific review, Journal of Controlled Release, vol. 307, 2019, pp. 393-409 (Year: 2019).*
Kapp et al., Post-Targeting Functions of Signal Peptides. In: Madame Curie Bioscience Database [Internet]. Austin (TX): Landes Bioscience; p. 1-26. 2000-2013. Available from: https://www.ncbi.nlm.nih.gov/books/NBK6322 (Year: 2013).*
G1QH03, UniProt Database, 2017. (Year: 2017).*
Spriestersbach et al., Chapter One—Purification of His-Tagged Proteins, Editor(s): Jon R. Lorsch, Methods in Enzymology, Academic Press, vol. 559, 2015, pp. 1-15 (Year: 2015).*
NCBI Reference Sequence No. NP_001356734.1, alkaline phosphatase, tissue-nonspecific isoozyme isoform 1 precursor preproprotein [*Homo Sapiens*]<https://www.ncbi.nlm.nih.gov/protein/1621574613?sat-47&satkey=138465222, Dec. 16, 2019, 4 pages.
Ao et al., "Overlapping functions of bone sialoprotein and pyrophosphate regulators in directing cementogenesis," *Bone* 105: 134-147 (e-Pub Dec. 1, 2017).
Bowden and Foster "Profile of asfotase alfa in the treatment of hypophosphatasia: design, development, and place in therapy," *Drug Design, Development and Therapy* 12:3147-3161 (Sep. 24, 2018).
Di Mauro et al., "Kinetic characterization of hypophosphatasia mutations with physiological substrates," *Journal of Bone and Mineral Research* 17(8): 1383-1391 (Nov. 8, 2002).
Gasque et al., "Improvement of the skeletal and dental hypophosphatasia phenotype in Alpl$^{-/-}$ mice by administration of soluble (non-targeted) chimeric alkaline phosphatase," *Bone* 0:137-147 (Mar. 2015).

Greenstein and Polson "The role of local drug delivery in the management of periodontal diseases: A comprehensive review," *Journal of Periodontology* 69(5):507-520 (May 1998).
Ikeue et al., "Bone-targeted alkaline phosphatase treatment of mandibular bone and teeth in lethal hypophosphatasia via an scAAV8 vector," *Methods and Clinical Development* 10: 361-370 (Sep. 1, 2018).
International Search Report and Written Opinion from parent PCT Application No. PCT/US2020/067697, 34 pages (mailed May 25, 2021).
Kiffer-Moreira et al., "Catalytic signature of a heat-stable, chimeric human alkaline phosphatase with therapeutic potential," *PLoS One* 9(2): e89374 (Feb. 2014).
Mckee et al., "Enzyme replacement therapy prevents dental defects in a model of hypophosphatasia," *Journal of Dental Research* 90(4): 470-476 (e-Pub Jan. 6, 2011).
Millán and Plotkin et al., "Hypophosphatasia—pathophysiology and treatment," *Actual Osteol* 8(3): 164-182 (Sep. 1, 2012).
Millán and Whyte, "Alkaline phosphatase and hypophosphatasia," *Calcified Tissue International* 98(4): 398-416 (Nov. 21, 2015).
Millán et al., "Enzyme replacement therapy for murine hypophosphatasia," *Journal of Bone and Mineral Research* 23(6): 777-787 (ePub Dec. 17, 2007).
Nagasaki "Delivery of Alkaline Phosphatase Promotes Cementum and Alveolar Bone Regeneration," *IADR Abstract Archives*, https://iadr.abstractarchives.com/abstract/20iags-3327742/delivery-of-alkaline-phosphatase-promotes-cementum-and-alveolar-bone-regeneration, 2 pages (Mar. 21, 2020).
Nishioka et al., "Enhancement of drug delivery to bone: Characterization of human tissue-nonspecific alkaline phosphatase tagged with an acidic oligopeptide," *Molecular Genetics and Metabolism* 88(3): 244-255 (Jul. 1, 2006).
Pickkers et al., "Effect of human recombinant alkaline phosphatase on 7-Day creatinine clearance in patients with sepsis-associated acute kidney injury a randomized clinical trial," *JAMA* 320(19): 1998-2009 (e-Pub Oct. 24, 2018).
Yadav et al., "Enzyme replacement prevents enamel defects in hypophosphatasia mice," *Journal of Bone and Mineral Research* 27(8): 1722-1734 (Aug. 2012).
Yamamoto-Nemoto et al., "Improvement of bone and dental phenotype of murine hypophosphatasia mediated by a single injection of lentiviral gene therapy," *Open Journal of Stomatology* 7(1): 91-103 (Jan. 1, 2017).
Zweifler et al. "Counterregulatory phosphatases TNAP and NPP1 temporally regulate tooth root cementogenesis," *International Journal of Oral Science* 7(1): 27-41 (Mar. 2015).
Foster et al., "Conditional Alpl Ablation Phenocopies Dental Defects of Hypophosphatasia," *Journal of Dental Research* 96(1): 81-91 (Epub Oct. 1, 2016).
Foster et al., "Inherited Phosphate and Pyrophosphate Disorders," *Journal of the American Dental Association (JADA)* 155(11): 912-925 (Nov. 1, 2024).
Foster et al., "Periodontal Defects in the A116T Knock-in Murine Model of Odontohypophosphatasia," *Journal of Dental Research* 94(5): 706-714 (Epub Feb. 25, 2015).

* cited by examiner

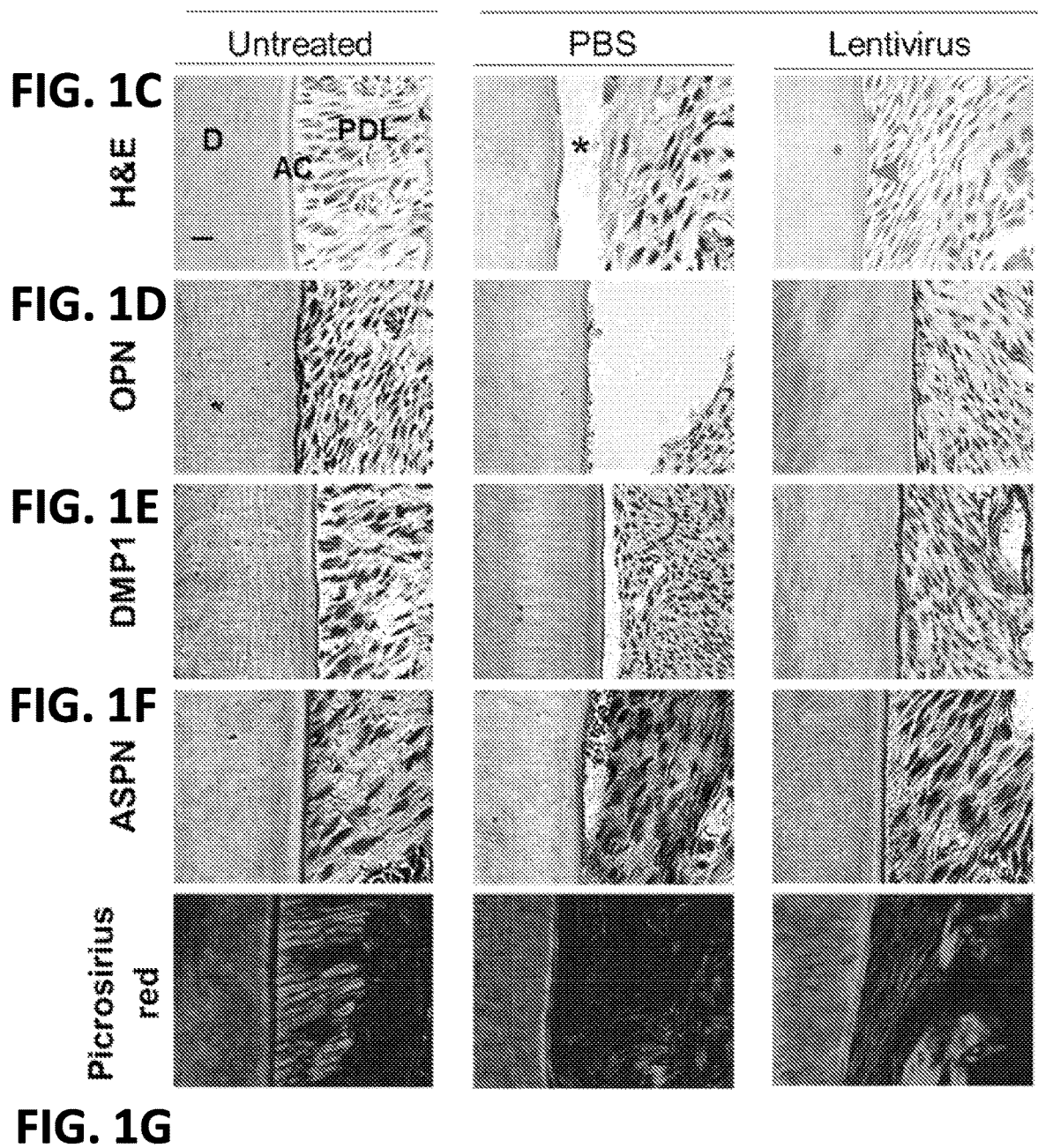

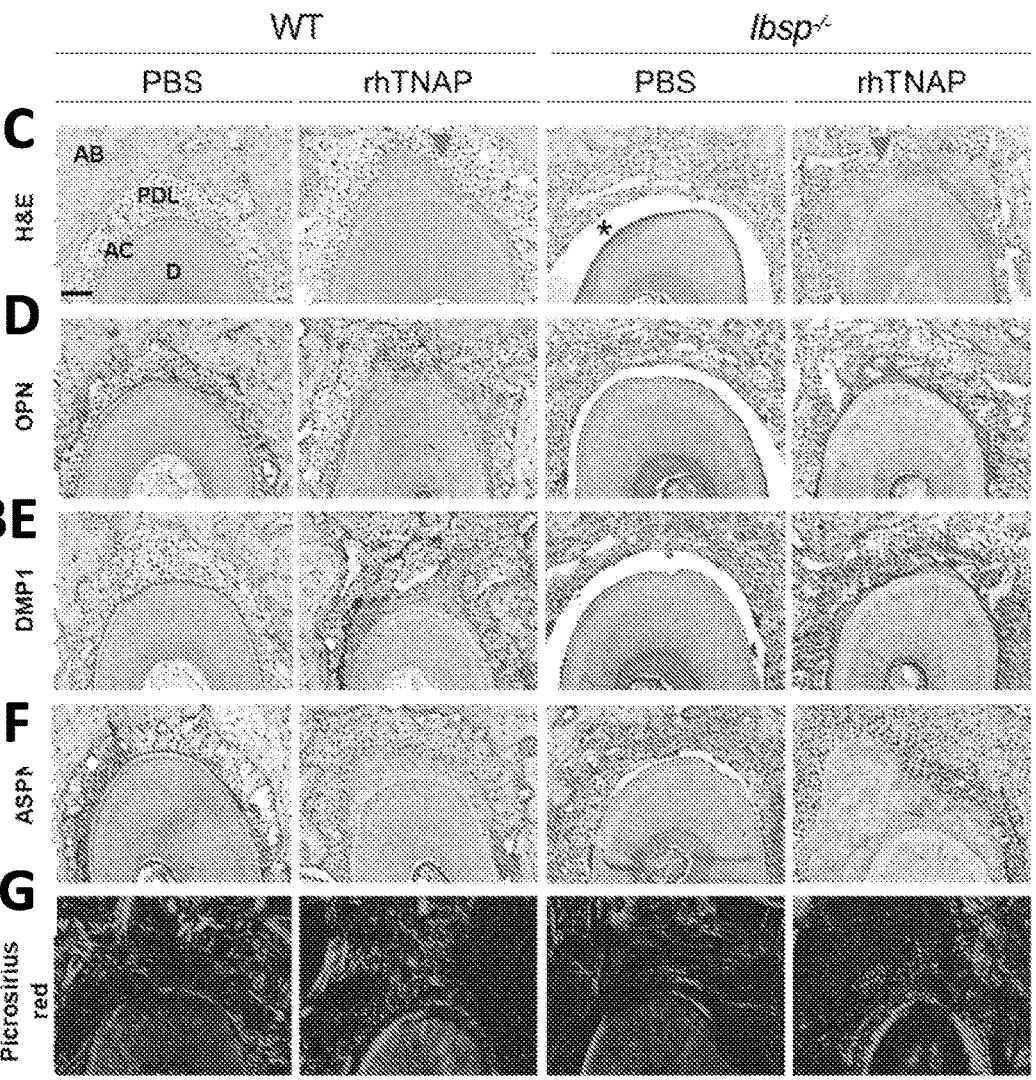

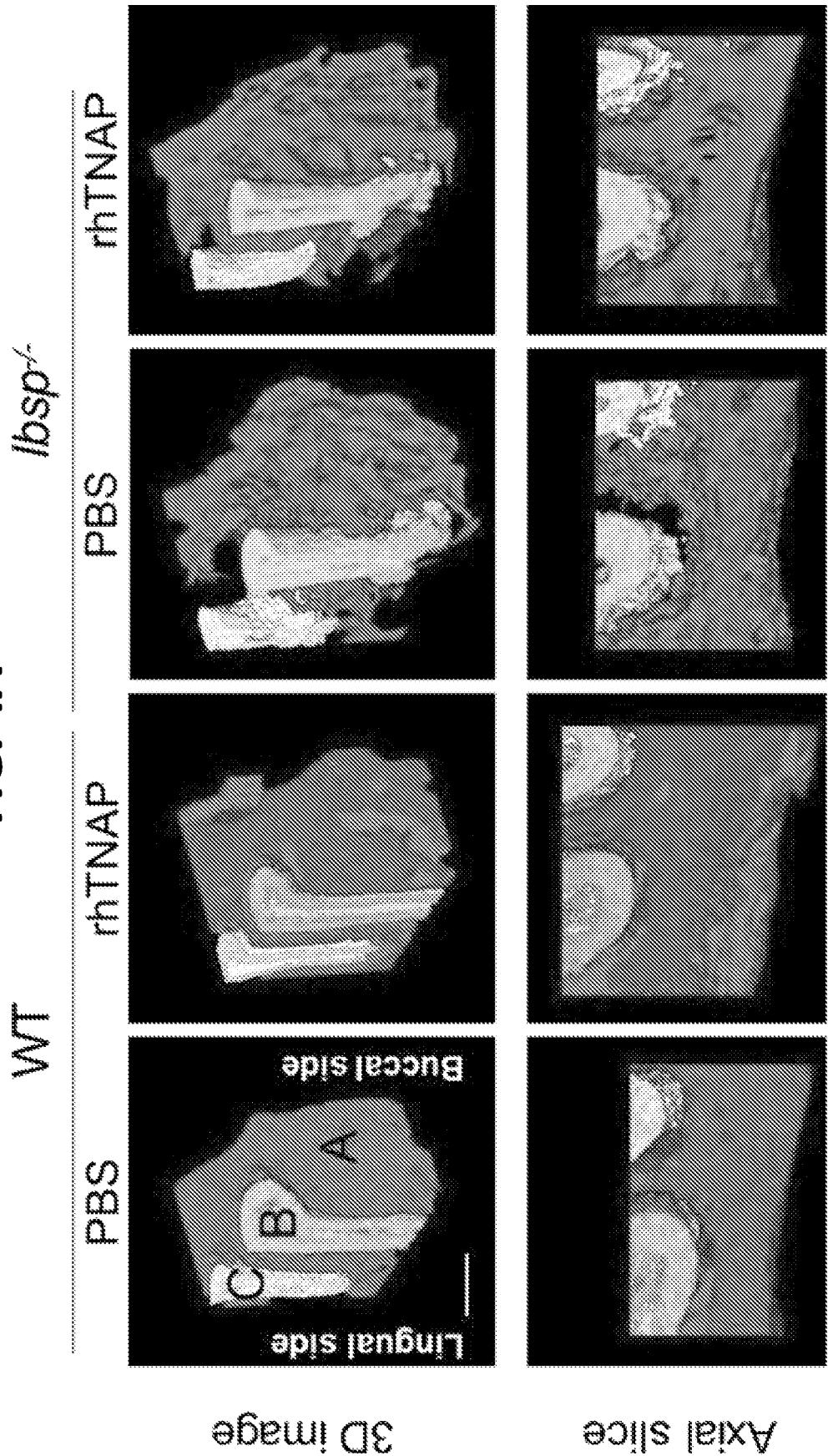

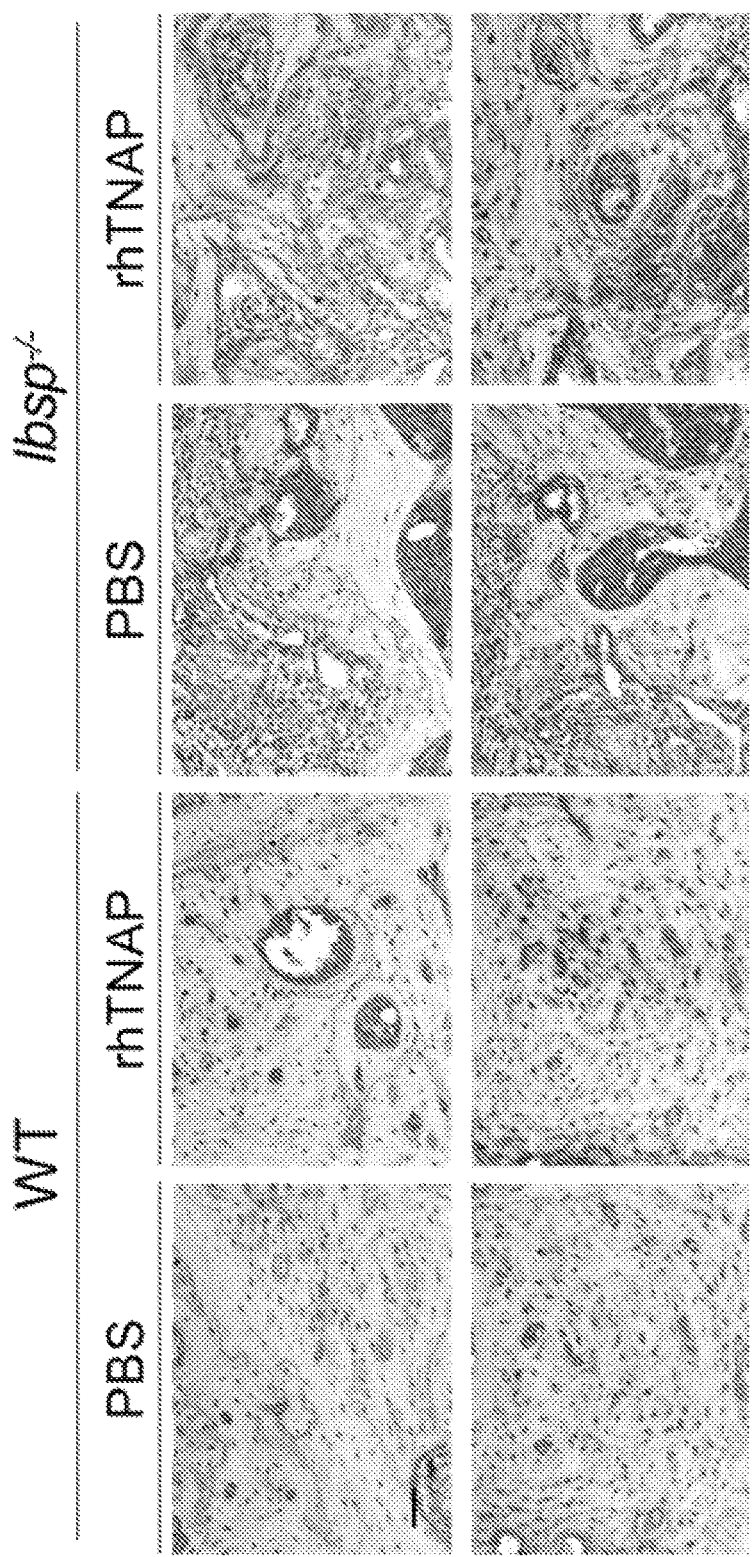

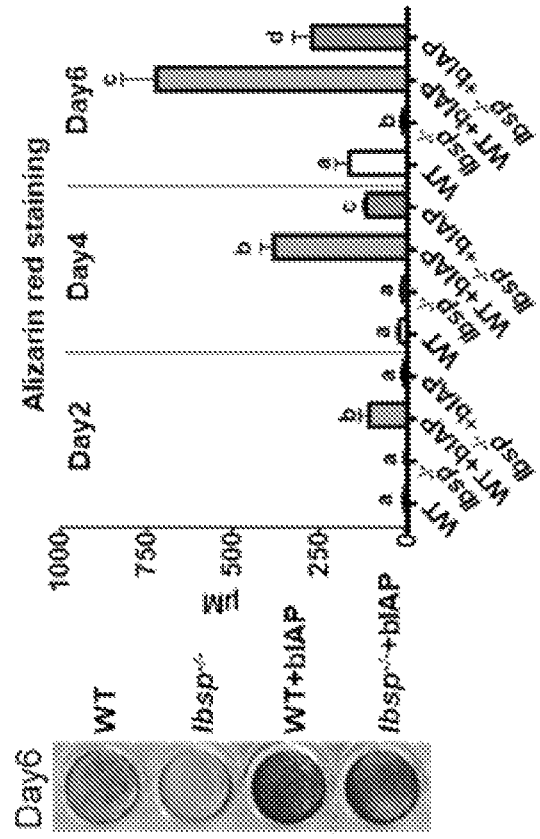
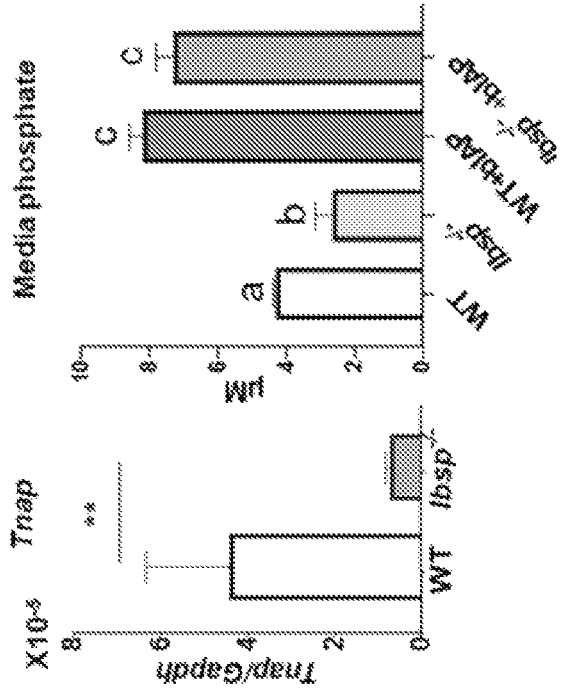
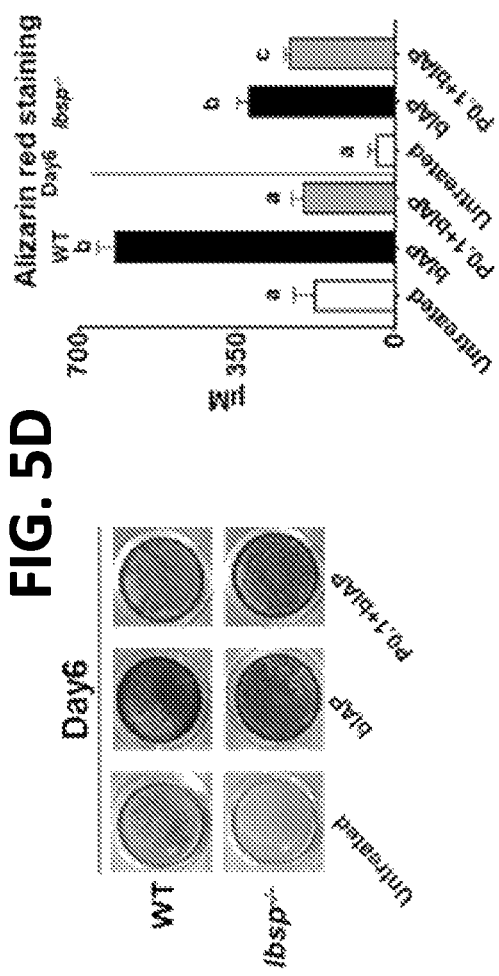
FIG. 5A FIG. 5B FIG. 5C FIG. 5D

TNAP LOCALLY ADMINISTERED FOR PROMOTING PERIODONTAL HEALTH

CROSS REFERENCE TO RELATED APPLICATIONS

This is a § 371 U.S. national stage of International Application No. PCT/US2020/067697, filed Dec. 31, 2020, which application claims the benefit of U.S. Provisional Application No. 62/957,051, filed Jan. 3, 2020, which are both incorporated by reference herein in their entirety.

STATEMENT OF GOVERNMENT SUPPORT

This invention was made with government support under DK121326 awarded by the National Institutes of Health. The government has certain rights in the invention.

FIELD OF THE DISCLOSURE

This relates to the field of periodontal disease, specifically to the use of a tissue-nonspecific alkaline phosphatase (TNAP) polypeptide, or a nucleic acid encoding the recombinant TNAP polypeptide, for treating periodontal disease, treating periimplantitis, or preserving the tooth socket.

BACKGROUND

Periodontal disease causes destruction of cementum, periodontal ligament (PDL), and surrounding alveolar bone. Approximately 45% of U.S. adults suffer from periodontal disease, that when left untreated, can result in tooth loss (Eke et al. 2016, J Dent Res. 95(5):515-522). The goals of periodontal therapy are to eliminate pathogenic microbes, resolve inflammation, and restore periodontal structure and function, however current therapies to promote tissue repair and regeneration are often suboptimal (Bosshardt 2005, J Dent Res. 84(5):390-406; Foster et al. 2007, Bone. 78:150-164; Sallum et al. 2019, Periodontol 2000. 79(1):22-55). This is particularly true for cementum, a tissue that features limited capacity for repair. A need remains for methods of treating periodontal disease.

SUMMARY OF THE DISCLOSURE

In some embodiments, methods are disclosed for treating periodontal disease, peri-implantitis, or to preserve a tooth socket in a subject. These methods can include selecting a subject with periodontal disease, peri-implantitis, or in need of tooth socket preservation; and locally administering into the periodontium of the subject a therapeutically effective amount of a recombinant tissue-nonspecific alkaline phosphatase (TNAP) polypeptide comprising SEQ ID NO: 1, a variant thereof, or a nucleic acid molecule encoding the recombinant TNAP polypeptide.

In other embodiments, methods are disclosed for treating a subject that include locally administering into the periodontium of the subject a therapeutically effective amount of a recombinant TNAP polypeptide comprising SEQ ID NO: 1, a variant thereof, or nucleic acid molecule encoding the recombinant TNAP polypeptide, wherein the method i) promotes alveolar bone regeneration in the subject; ii) increases attachment of a periodontal ligament to a root surface of a tooth in the subject; iii) increases cementum formation; and/or iv) increases mineralization in a tooth in the subject.

In further embodiments, disclosed are pharmaceutical compositions comprising a therapeutically effective amount of a recombinant TNAP polypeptide comprising SEQ ID NO: 1, a variant thereof, or a nucleic acid molecule encoding the recombinant TNAP polypeptide, for use in treating periodontal disease, peri-implantitis or preserving a tooth socket, treating alveolar bone disease or promoting retention of a dental implant.

The disclosed methods and compositions are of use in subjects with periodontal disease, including subjects that have hypophosphatasia (HPP), and subjects that do not have HPP.

The foregoing and other features of the disclosure will become more apparent from the following detailed description of several embodiments which proceeds with reference to the accompanying figures.

BRIEF DESCRIPTION OF THE FIGURES

FIGS. 1A-1G. Systemic Delivery of TNAP-$D_{10}$ Restores Cementum Formation in Ibsp$^{-/-}$ Mice. Mice at 5 dpn were injected intramuscularly injected with TNAP-$D_{10}$ lentiviral vector or PBS vehicle and evaluated at 60 dpn. (A) TNAP-$D_{10}$ increases plasma alkaline phosphatase (ALP) levels by 5-fold over PBS vehicle at 30 dpn, with no persistent differences at 60 dpn (n=3 mice/group; * p<0.05, by one-way ANOVA). (B) Compared to PBS, TNAP-$D_{10}$ treatment significantly increases both buccal and lingual acellular cementum (AC) thickness in Ibsp$^{-/-}$ mice (3-fold and 2-fold, respectively) at 60 dpn, though cementum thickness remains less than WT mice (n=3 mice/group; * p<0.05, ** p<0.01 by t-test). (C) H&E staining reveals lack of AC on root dentin (D) and detachment of the periodontal ligament (PDL) from root surfaces (*) in PBS-treated Ibsp$^{-/-}$ mice. TNAP-$D_{10}$ reestablishes AC and PDL attachment (arrowhead) in Ibsp$^{-/-}$ mice. (D) Unlike robust OPN in AC of untreated control WT mice, PBS-treated Ibsp$^{-/-}$ mice lack OPN localization on root surfaces. TNAP-$D_{10}$ increases OPN on Ibsp$^{-/-}$ mouse root surfaces. (E) In contrast to minimal DMP1 localization in AC of WT and PBS-treated Ibsp$^{-/-}$ mice, TNAP-$D_{10}$ increases DMP1 localization along root surfaces. (F) Compared to WT, Ibsp$^{-/-}$ mice exhibit increased localization of ASPN in root-associated PDL. TNAP-$D_{10}$ treatment reduces ASPN in Ibsp$^{-/-}$ mouse PDL. (G) Picrosirius red staining revealed that TNAP-$D_{10}$ induced PDL attachment in Ibsp$^{-/-}$ mice, which was comparable to untreated control WT mice. Representative images from n=3 mice. Scale bar: 20 μm.

FIGS. 3A-3G. Local Delivery of rhTNAP Increases Regenerated Cementum Thickness. Fenestration defects were created in 5-week-old WT and Ibsp$^{-/-}$ mice and healing was analyzed at postoperative day (POD) 45. (A) Plasma ALP levels were not altered by local delivery of rhTNAP in either WT or Ibsp$^{-/-}$ mice at POD 45 (n=6/group; p>0.05 by independent samples t-test in pairwise comparisons for each genotype). PBS: phosphate buffered saline vehicle. (B) Compared to PBS, local delivery of rhTNAP significantly cementum thickness in both WT and Ibsp$^{-/-}$ mice (21-fold and 42-fold, respectively) POD45. (n=6 mice/group;  p<0.01, * p<0.001 by t-test). (C) H&E staining reveals lack of acellular cementum (AC) on root dentin (D) and detachment of the periodontal ligament (PDL) from root surfaces (*) in PBS-treated Ibsp$^{-/-}$ mice. rhTNAP promotes AC formation and PDL attachment (arrowhead) in Ibsp$^{-/-}$ mice. Thick AC formation (arrowhead) is observed in rhTNAP-treated WT mice. IHC reveals that rhTNAP increases localization of (D) OPN and (E) DMP1 in regenerated in Ibsp$^{-/-}$ mice, with no apparent difference in treated vs. untreated WT mice. (F) rhTNAP reduces ASPN localization within the periodontal ligament (PDL) of WT and Ibsp$^{-/-}$ mice. (G) Local delivery of rhTNAP induced PDL attachment in Ibsp$^{-/-}$ mice, confirmed by picrosirius red staining. Scale bar: 200 µm.

FIGS. 4A-4E. Increased Regeneration of Alveolar Bone with Local Delivery of rhTNAP. Fenestration defects were created in 5-week-old WT and Ibsp$^{-/-}$ mice and healing was analyzed at postoperative day (POD) 45. (A) 3D microCT renderings of first mandibular molar distal (B) and second mesial (C) roots and surrounding alveolar bone (A). Scale bar: 500 m. (B) rhTNAP increases regenerated alveolar bone volume by 37% and (C) bone mineral density by 5% in Ibsp$^{-/-}$ mice (n=6 mice/group; * p<0.05;  p<0.01; * p<0.001 by t-test). Compared to PBS treatment, rhTNAP increases alveolar bone volume and mineral density in WT mice by 17% and 5%, respectively. (D, E) IHC reveals that rhTNAP increases OPN and DMP1 in regenerated alveolar bone of both WT and Ibsp$^{-/-}$ mice. Scale bar: 200 m.

FIGS. 5A-5H. bIAP Increases Mineralization in Cementoblasts. WT and Ibsp$^{-/-}$ OCCM.30 immortalized murine cementoblasts were used to test effects of bovine intestinal alkaline phosphatase IAP (bIAP) on cell expression and mineralization, in vitro. (A) Alpl expression is 80% reduced in Ibsp$^{-/-}$ vs. WT cells at day 1 (** p<0.01). (B) Compared to media from untreated WT controls, untreated Ibsp$^{-/-}$ cells exhibit 40% reduced P$_i$ levels. Addition of 100 g/ml bIAP increases P$_i$ levels in both WT and Ibsp$^{-/-}$ cell media (different letters p<0.01). (C) Compared to WT cells, Ibsp$^{-/-}$ cells show less mineralization. Addition of bIAP increases mineralization in both WT and Ibsp$^{-/-}$ cells. Mineral deposited by bIAP-treated Ibsp$^{-/-}$ cells lags that of treated WT cells by day 6 (different letters p<0.01). (D) Addition of 0.1 mM phosphonoformic acid (PFA) inhibits bIAP-induced increase in mineral nodule formation in both WT and Ibsp$^{-/-}$ cells, though effects of PFA on Ibsp$^{-/-}$ cells are minimal and mineral deposition by WT and Ibsp$^{-/-}$ cells treated with bIAP and PFA are equivalent. (E) bIAP increases Spp1 expression in both control and Ibsp$^{-/-}$ cells. PFA inhibits Spp1 expression in both WT and Ibsp$^{-/-}$ cells by 55% (different letters p<0.001). (F) bIAP increases Dmp1 expression in both WT and Ibsp$^{-/-}$ cells vs. untreated cells. Phosphate-induced Dmp1 expression in WT and Ibsp$^{-/-}$ cells is partially inhibited by PFA (different letters p<0.001). (G) Aspn expression is increased in Ibsp$^{-/-}$ cells vs. WT cells. bIAP decreases Aspn expression in both WT and Ibsp$^{-/-}$ cells (different letters p<0.01). P$_i$-induced downregulation of Aspn expression is not affected by PFA. (H) Alpl expression in Ibsp$^{-/-}$ cells was significantly decreased with bIAP by 37% (p<0.0001) with a trend in WT cells. There was a trend of increased Alpl expression with PFA in WT and Ibsp$^{-/-}$ cells.

SEQUENCE LISTING

Figures 1A, 1B:
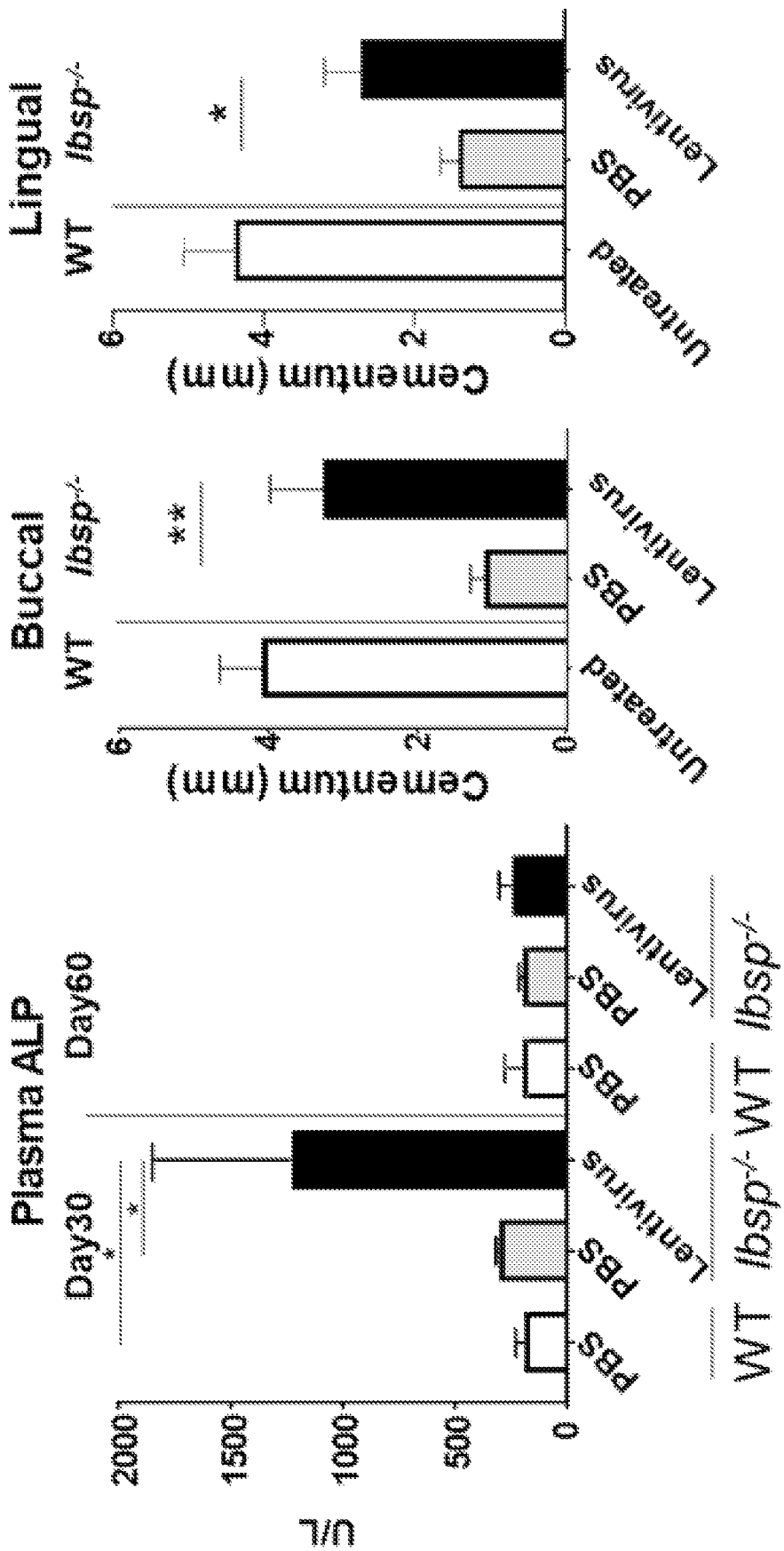

The nucleic and amino acid sequences listed in the accompanying sequence listing are shown using standard letter abbreviations for nucleotide bases, and three letter code for amino acids, as defined in 37 C.F.R. 1.822. Only one strand of each nucleic acid sequence is shown, but the complementary strand is understood as included by any reference to the displayed strand. The Sequence Listing is submitted as an ASCII text file [Sequence_Listing, Jun. 21, 2022, 25.8 KB], which is incorporated by reference herein. In the accompanying sequence listing:

SEQ ID NO: 1 is the amino acid sequence of a recombinant TNAP polypeptide that is amino acids 18-504 of a human TNAP protein.

SEQ ID NO: 2 is the amino acid sequence of a signal peptide.

SEQ ID NO: 3 is the amino acid sequence of a histidine tag.

SEQ ID NO: 4 is the amino acid sequence of a recombinant TNAP polypeptide, with a mineral binding domain.

SEQ ID NO: 5 is the amino acid sequence of a recombinant TNAP polypeptide without a mineral binding domain.

SEQ ID NOs: and 7 are the amino acid sequence of signal peptides.

SEQ ID NOs: 8-17 are primer sequences.

SEQ ID NOs: 18 and 19 are alternative recombinant TNAP polypeptides.

SEQ ID NO: 20 is the amino acid sequence of a signal peptide.

DETAILED DESCRIPTION OF SEVERAL EMBODIMENTS

Methods are disclosed for treating periodontal disease using recombinant TNAP polypeptides and nucleic acids encoding these TNAP polypeptides. These methods are of use in subjects with periodontal disease, including subjects that have hypophosphatasia (HPP) or subjects that do not have HPP.

It is disclosed that pharmacological approaches to decrease pyrophosphate ($PP_i$), a potent inhibitor of hydroxyapatite crystal growth, and increase inorganic phosphate ($P_i$), a promoter of hydroxyapatite (HA) formation, through delivery of a recombinant TNAP polypeptide can correct cementum defects and promote cementum regeneration in a mouse model of periodontal disease. In some embodiments, a lentivirus construct was employed that expressed mineral-targeted TNAP (Yamamoto et al. 2011, J Bone Miner Res. 26(1):135-142) for systemic delivery. However, other viral vectors can be used, such as AAV. In addition, recombinant human TNAP was used for local delivery to treat a periodontal fenestration defect (Rodrigues et al. 2011, J Periodontol. 82(12):1757-1766) in a mouse model. A cementoblast cell line also was used to demonstrate the effects of bovine intestinal ALP (bIAP) on gene expression and mineralization, in vitro.

Summary of Terms

Unless otherwise noted, technical terms are used according to conventional usage. Definitions of many common terms in molecular biology may be found in Krebs et al. (eds.), Lewin's genes XII, published by Jones & Bartlett Learning, 2017. As used herein, the singular forms "a," "an," and "the," refer to both the singular as well as plural, unless the context clearly indicates otherwise. For example, the term "a polypeptide" includes singular or plural antigens and can be considered equivalent to the phrase "at least one polypeptide." As used herein, the term "comprises" means "includes."

It is further to be understood that any and all base sizes or amino acid sizes, and all molecular weight or molecular mass values, given for nucleic acids or polypeptides are approximate, and are provided for descriptive purposes, unless otherwise indicated. Although many methods and materials similar or equivalent to those described herein can be used, particular suitable methods and materials are described herein. In case of conflict, the present specification, including explanations of terms, will control. In addition, the materials, methods, and examples are illustrative only and not intended to be limiting. To facilitate review of the various embodiments, the following explanations of terms are provided:

The term "about" denotes a range of +/−10% of a predetermined value. For example, "about 10" sets a range of 90% to 110% of 10, i.e., 9 to 11.

The term "administration" refers to introduction of a composition into a subject by a chosen route. Administration can be local or systemic. For example, if the chosen route is intravenous, the composition is administered by introducing the composition into a vein of the subject. Exemplary routes of administration include, but are not limited to, oral, injection (such as subcutaneous, intramuscular, intradermal, intraosseous, intraperitoneal, and intravenous), sublingual, buccal, transmucosal, transdermal (for example, topical), intranasal, and inhalation routes. In some embodiments, a composition is administered locally to the periodontium of a subject.

The term "alkaline phosphate (ALP)" or "tissue-nonspecific alkaline phosphatase (TNAP, TNALP)," as used herein, refers to an enzyme that is capable of dephosphorylating compounds. Also known as "basic phosphatase," ALP is a homodimeric protein enzyme optimally active in alkaline pH environments. The enzyme is found across a broad spectrum of organisms, from prokaryotes such as bacteria to eukaryotes such as animal cells. An exemplary human TNAP protein sequence is provided in NCBI Reference Sequence NP_001356734.1, and a corresponding coding sequence in NM_001369805.2, available on Dec. 12, 2020, incorporated herein by reference. An exemplary murine TNAP protein sequence is provided in NCBI Reference Sequence: NP_031457.2, Nov. 17, 2020, incorporated herein by reference).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds having a structure that is different from the general chemical structure of an amino acid, but that functions in a manner similar to a naturally occurring amino acid.

Various methods permit the incorporation of an unnatural amino acid derivative or analog into a polypeptide chain in a site-specific manner, see, e.g., WO 02/086075.

Amino acids may be referred to herein by either the commonly known three letter symbols or by the one-letter symbols recommended by the IUPAC-IUB Biochemical Nomenclature Commission. Nucleotides, likewise, may be referred to by their commonly accepted single-letter codes.

"Conservatively modified variants" applies to both amino acid and nucleic acid sequences. With respect to particular nucleic acid sequences, "conservatively modified variants" refers to those nucleic acids that encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein that encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid that encodes a polypeptide is implicit in each described sequence.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles.

The following eight groups each contain amino acids that are conservative substitutions for one another:
1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M)
(see, e.g., Creighton, *Proteins*, W. H. Freeman and Co., N. Y. (1984)).

In the present application, amino acid residues are numbered according to their relative positions from the left most residue, which is numbered 1, in an unmodified (e.g., wild-type) polypeptide sequence.

The term "control" refers to a reference standard, such as a biological sample from a subject that has not been treated (such as not treated with a recombinant TNAP polypeptide or nucleic acid coding sequence provided herein), or has been treated with a substance that is known to be inactive, such as a carrier.

A difference between a test sample and a control can be an increase or conversely a decrease. The difference can be a qualitative difference or a quantitative difference, for example a statistically significant difference. In some examples, a difference is an increase or decrease, relative to a control, of at least about 5%, such as at least about 10%, at least about 20%, at least about 30%, at least about 40%, at least about 50%, at least about 60%, at least about 70%, at least about 80%, at least about 90%, at least about 100%, at least about 150%, at least about 200%, at least about 250%, at least about 300%, at least about 350%, at least about 400%, or at least about 500%.

The term "effective amount," or "therapeutically effective amount" as used herein, refers to an amount that is sufficient to produces an intended effect for which a substance is administered. The effect may include a desirable change in a biological process (e.g., improved regeneration of tooth root [cementum] or alveolar bone, or improved attachment of new periodontal ligament to the surrounding alveolar bone and/or to the tooth root) as well as the prevention, correction, or inhibition of progression of the symptoms of a disease/condition and related complications to any detectable extent. The exact amount "effective" for achieving a desired effect will depend on the nature of the therapeutic agent, the manner of administration, and the purpose of the treatment, and will be ascertainable by one skilled in the art using known techniques (see, e.g., Lieberman, *Pharmaceutical Dosage Forms* [vols. 1-3, 1992]; Lloyd, *The Art, Science and Technology of Pharmaceutical Compounding* [1999]; and Pickar, *Dosage Calculations* [1999]).

The term "expression" refers to transcription or translation of a nucleic acid sequence, such as a TNAP sequence. For example, an encoding nucleic acid sequence (such as a gene) can be expressed when its DNA is transcribed into RNA or an RNA fragment, which in some examples is processed to become mRNA. An encoding nucleic acid sequence (such as a gene) may also be expressed when its mRNA is translated into an amino acid sequence, such as a protein or a protein fragment. In a particular example, a heterologous gene is expressed when it is transcribed into an RNA. In another example, a heterologous gene is expressed when its RNA is translated into an amino acid sequence. Regulation of expression can include controls on transcription, translation, RNA transport and processing, degradation of intermediary molecules such as mRNA, or through activation, inactivation, compartmentalization or degradation of specific protein molecules after they are produced.

The term "expression control sequence" refers to nucleic acid sequences that regulate the expression of a heterologous nucleic acid sequence (such as a TNAP sequence) to which it is operatively linked. Expression control sequences are operatively linked to a nucleic acid sequence when the expression control sequences control and regulate the transcription and, as appropriate, translation of the nucleic acid sequence. Thus, expression control sequences can include appropriate promoters, enhancers, transcriptional terminators, a start codon (ATG) in front of a protein-encoding gene, splice signals for introns, maintenance of the correct reading frame of that gene to permit proper translation of mRNA, and stop codons. The term "control sequences" includes, at a minimum, components whose presence can influence expression, and can also include additional components, for example, leader sequences and fusion partner sequences. In one example, an expression control sequence is a promoter.

An "expression cassette" is a nucleic acid construct, generated recombinantly or synthetically, with a series of specified polynucleotide elements that permit transcription of a particular polynucleotide sequence (such as a TNAP sequence) in a host cell. An expression cassette may be part of a plasmid, viral genome, or nucleic acid fragment. Typically, an expression cassette includes a polynucleotide to be transcribed, operably linked to a promoter.

The term "gene" means the segment of DNA involved in producing a polypeptide chain (e.g., a modified alkaline phosphatase disclosed herein). In some cases, it may include regions preceding and following the coding region (leader and trailer) as well as intervening sequences (introns) between individual coding segments (exons).

The term "heterologous" as used in the context of describing the relative location of two elements, refers to the two elements such as polynucleotide sequences (e.g., a promoter or a protein/polypeptide-encoding sequence) or polypeptide sequences (e.g., a recombinant TNAP polypeptide described herein) that are not naturally found in the same relative positions. Thus, a "heterologous promoter" of a gene refers to a promoter that is not naturally operably linked to that gene. Similarly, a "heterologous polypeptide" or "heterologous polynucleotide" to a first polypeptide or polynucleotide is one (1) derived from an origin different from the origin of the first polypeptide or polynucleotide or (2) derived from the same origin but not naturally connected to the first polypeptide or polynucleotide in the same fashion so as to generate a longer naturally occurring polypeptide or polynucleotide sequence when fused with the first polypeptide or polynucleotide.

"Gingiva" is a tissue that is the masticatory mucosa lining the alveolar bone which surrounds the cervical portion of the teeth. Gingival tissues provide a seal around the teeth through the junctional epithelium and the epithelial attachment to resist mechanical trauma and to defend against microorganism.

By "host cell" is meant a cell that contains an expression vector and supports the replication or expression of the expression vector, e.g., to produce a recombinant polypeptide (such as a TNAP polypeptide). Host cells may be prokaryotic cells such as *E. coli*, or eukaryotic cells such as yeast, insect, amphibian, or mammalian cells such as CHO, HeLa and the like, e.g., cultured cells, explants, and cells in vivo.

A "label," "detectable label," or "detectable moiety" is a composition detectable by radiological, spectroscopic, photochemical, biochemical, immunochemical, chemical, or other physical means. For example, useful labels include radioisotopes such as $^{32}P$, fluorescent dyes, electron-dense reagents, enzymes (e.g., as commonly used in an ELISA), biotin, digoxigenin, or haptens and proteins that can be made detectable, e.g., by incorporating a radioactive component into a polypeptide or used to detect antibodies specifically reactive with the polypeptide. Typically a detectable label is a heterologous moiety attached to a probe or a molecule (e.g., a protein or nucleic acid) with defined binding characteristics (e.g., a polypeptide with a known binding specificity or a polynucleotide), so as to allow the presence of the probe/molecule (and therefore its binding target) to be readily detectable. The heterologous nature of the label ensures that it has an origin different from that of the probe or molecule that it labels, such that the probe/molecule attached with the detectable label does not constitute a naturally occurring composition.

The term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res.* 19:5081 (1991); Ohtsuka et al., *J. Biol. Chem.* 260:2605-2608 (1985); and Rossolini et al., *Mol. Cell. Probes* 8:91-98 (1994)). The term nucleic acid is used interchangeably with gene, cDNA, and mRNA encoded by a gene.

The term "operably linked" refers to a first nucleic acid sequence is operably linked with a second nucleic acid sequence when the first nucleic acid sequence is placed in a functional relationship with the second nucleic acid sequence. For instance, a promoter, such as the CMV promoter, is operably linked to a coding sequence (such as a TNAP sequence) if the promoter affects the transcription or expression of the coding sequence. Generally, operably linked DNA sequences are contiguous and, where necessary to join two protein-coding regions, in the same reading frame.

The "pharmaceutically acceptable carrier(s)" of use are conventional. *Remington: The Science and Practice of Pharmacy*, 22$^{nd}$ ed., London, UK: Pharmaceutical Press, 2013, describes compositions and formulations suitable for pharmaceutical delivery of the disclosed agents, such as a TNAP polypeptide or coding sequence.

In general, the nature of the carrier will depend on the particular mode of administration being employed. For instance, parenteral formulations usually include injectable fluids that include pharmaceutically and physiologically acceptable fluids such as water, physiological saline, balanced salt solutions, aqueous dextrose, glycerol or the like as a vehicle. For solid compositions (e.g., powder, pill, tablet, or capsule forms), conventional non-toxic solid carriers can include, for example, pharmaceutical grades of mannitol, lactose, starch, or magnesium stearate. In addition to biologically neutral carriers, pharmaceutical compositions to be administered can contain minor amounts of non-toxic auxiliary substances, such as wetting or emulsifying agents, added preservatives (such as non-natural preservatives), and pH buffering agents and the like, for example sodium acetate or sorbitan monolaurate. In particular examples, the pharmaceutically acceptable carrier is sterile and suitable for parenteral administration to a subject for example, by injection. In some embodiments, the active agent and pharmaceutically acceptable carrier are provided in a unit dosage form such as a pill or in a selected quantity in a vial. Unit dosage forms can include one dosage or multiple dosages (for example, in a vial from which metered dosages of the agents can selectively be dispensed).

"Polypeptide," "peptide," and "protein" are used interchangeably herein to refer to a polymer of amino acid residues. All three terms apply to amino acid polymers in which one or more amino acid residue is an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

A "promoter" is defined as an array of nucleic acid control sequences that direct transcription of a polynucleotide sequence. As used herein, a promoter includes necessary polynucleotide sequences near the start site of transcription, such as, in the case of a polymerase II type promoter, a TATA element. A promoter also optionally includes distal enhancer or repressor elements, which can be located as much as several thousand base pairs from the start site of transcription. A "constitutive" promoter is a promoter that is active under most environmental and developmental conditions. An "inducible" promoter is a promoter that is active under environmental or developmental regulation. The term "operably linked" refers to a functional linkage between a polynucleotide expression control sequence (such as a promoter, or array of transcription factor binding sites) and a second polynucleotide sequence, wherein the expression control sequence directs transcription of the polynucleotide sequence corresponding to the second sequence.

The term "peri-implantitis" refers to a destructive inflammatory process affecting the soft and hard tissues surrounding dental implants. The soft tissues become inflamed whereas the alveolar bone (hard tissue), which surrounds the implant for the purposes of retention, is lost over time. A peri-implant is characterized by absence of erythema, bleeding on probing, swelling and suppuration.

"Periodontitis" refers to acute or chronic inflammatory oral disease that progressively destroys the tooth-supporting apparatus. It usually manifests as a worsening of gingivitis and then, if untreated, with loosening and loss of teeth. Systemic conditions such as heart disease, respiratory disease, and uncontrolled diabetes are associated with periodontitis. Severe periodontitis including necrotizing periodontal disease are commonly observed in immunocompromised patients such as HIV patients. Diagnosis is based on inspection, periodontal probing, and x-rays.

Periodontitis usually develops when gingivitis, usually with abundant plaque and calculus (a concretion of bacteria, food residue, saliva, and mucus with calcium and phosphate salts) beneath the gingival margin, has not been adequately treated. In periodontitis, deep pockets form in the periodontal tissue and can harbor anaerobic organisms that do more damage than those usually present in simple gingivitis. Colonizing organisms include, but are not limited to, *Aggregatibacter actinomycetemcomitans, Porphyromonas gingivalis, Eikenella corrodens*, and many bacteria which form oral microbiome and biofilms.

The organisms trigger chronic release of inflammatory mediators, including cytokines, prostaglandins, and enzymes from neutrophils and monocytes. The resulting inflammation affects the periodontal ligament, gingiva, cementum, and alveolar bone. The periodontal ligament progressively loses its attachment to the teeth, bone loss begins, and periodontal pockets deepen. With progressive bone loss, teeth may loosen, and gingiva recedes. Tooth migration is common in later stages, and tooth loss can occur.

The term "promoting periodontal health" or any variation thereof encompasses any detectable improvement or enhancement in the regeneration of tooth root (cementum), regeneration of alveolar bone, or attachment of new PDL to the surrounding alveolar bone and/or to the tooth root (i.e., cementum). Such improvement or enhancement may take place in a prophylactic context and in a therapeutic context, e.g., in regular (such as daily, weekly, or monthly etc.) use by a person at risk of later developing a periodontal disease or in the process of preparing for or performing a dental implant.

The term "purified" or "isolated" does not require absolute purity; rather, it is intended as a relative term. Thus, for example, a purified peptide preparation is one in which the peptide or protein (such as a TNAP polypeptide) is more enriched than the peptide or protein is in its natural environment within a cell. In one embodiment, a preparation is purified such that the protein or peptide represents at least 50% of the total peptide or protein content of the preparation. A biological component (such as a nucleic acid, peptide, protein or protein complex, for example an TNAP polypeptide) is isolated when it that has been substantially separated, produced apart from, or purified away from other biological components in the cell of the organism in which the component naturally occurs, that is, other chromosomal and extra-chromosomal DNA and RNA, and proteins. Thus, isolated nucleic acids, peptides and proteins include nucleic acids and proteins purified by standard purification methods. The term also embraces nucleic acids, peptides and proteins prepared by recombinant expression in a host cell, as well as, chemically synthesized nucleic acids and proteins. An isolated nucleic acid, peptide or protein, for example an TNAP polypeptide, can be at least 50%, at least 60%, at least 70%, at least 80%, at least 90%, at least 95%, at least 96%, at least 97%, at least 98%, or at least 99% pure.

The term "recombinant" when used with reference, e.g., to a cell, or a nucleic acid, protein, or vector, indicates that the cell, nucleic acid, protein or vector, has been modified by the introduction of a heterologous nucleic acid or protein or the alteration of a native nucleic acid or protein, such as by truncation or substitution. Thus, for example, recombinant cells express genes that are not found within the native (non-recombinant) form of the cell or express native genes that are otherwise abnormally expressed, under expressed or not expressed at all. Recombinant TNAP polypeptides are disclosed herein.

The term "sequence identity" refers to the identity between two or more nucleic acid sequences, or two or more amino acid sequences, is expressed in terms of the identity between the sequences. Sequence identity can be measured in terms of percentage identity; the higher the percentage, the more identical the sequences. Homologs and variants of a TNAP polypeptide are typically characterized by possession of at least about 75% sequence identity, for example at least about 80%, 85%, 90%, 91%, 92%, 93%, 94%, 95%, 96%, 97%, 98% or 99% sequence identity counted over the full-length alignment with the amino acid sequence of interest.

Methods of alignment of sequences for comparison are known. Various programs and alignment algorithms are described in: Smith and Waterman, *Adv. Appl. Math.* 2(4): 482-489, 1981; Needleman and Wunsch, *J. Mol. Biol.* 48(3): 443-453, 1970; Pearson and Lipman, *Proc. Natl. Acad. Sci. U.S.A.* 85(8):2444-2448, 1988; Higgins and Sharp, *Gene*, 73(1):237-244, 1988; Higgins and Sharp, *Bioinformatics*, 5(2):151-3, 1989; Corpet, *Nucleic Acids Res.* 16(22):10881-10890, 1988; Huang et al. *Bioinformatics*, 8(2):155-165, 1992; and Pearson, *Methods Mol. Biol.* 24:307-331, 1994. Altschul et al., *J. Mol. Biol.* 215(3):403-410, 1990, presents a detailed consideration of sequence alignment methods and homology calculations. The NCBI Basic Local Alignment Search Tool (BLAST) (Altschul et al., *J. Mol. Biol.* 215(3): 403-410, 1990) is available from several sources, including the National Center for Biological Information and on the Internet, for use in connection with the sequence analysis programs blastp, blastn, blastx, tblastn, and tblastx. Blastn is used to compare nucleic acid sequences, while blastp is used to compare amino acid sequences. Additional information can be found at the NCBI web site.

Generally, once two sequences are aligned, the number of matches is determined by counting the number of positions where an identical nucleotide or amino acid residue is present in both sequences. The percent sequence identity between the two sequences is determined by dividing the number of matches either by the length of the sequence set forth in the identified sequence, or by an articulated length (such as 100 consecutive nucleotides or amino acid residues from a sequence set forth in an identified sequence), followed by multiplying the resulting value by 100.

A "subject" is a living multicellular vertebrate organism, a category that includes human and non-human mammals. In an example, a subject is a mammal, such as a human. In an example, a mammal is a veterinary subject, such as a horse, pig, cat or dog.

A "tooth socket" is a hole in the bone where a tooth has been removed. After a tooth is pulled, a blood clot forms in the socket to protect the bone and nerves underneath. The clot can become dislodged or dissolve a couple of days after the extraction, which is called "dry socket" or "alveolar osteitis."

A "transformed" cell is a cell into which a nucleic acid molecule has been introduced by molecular biology techniques. As used herein, the term transformed and the like (e.g., transformation, transfection, transduction, etc.) encompasses all techniques by which a nucleic acid molecule (such as a TNAP coding sequence) can be introduced into such a cell, including transduction with viral vectors, transformation with plasmid vectors, and introduction of DNA by electroporation, lipofection, and particle gun acceleration.

A "vector" refers to an entity containing a nucleic acid molecule (such as a DNA or RNA molecule) bearing a promoter(s) that is operationally linked to the coding sequence of a protein of interest (such as a TNAP coding sequence) and can express the coding sequence. Non-limiting examples include a naked or packaged (lipid and/or protein) DNA, a naked or packaged RNA, a subcomponent of a virus or bacterium or other microorganisms that may be replication-incompetent, or a virus or bacterium or other microorganism that may be replication-competent. A vector is sometimes referred to as a construct. Recombinant DNA vectors are vectors having recombinant DNA. A vector can include nucleic acid sequences that permit it to replicate in a host cell, such as an origin of replication. A vector can also include one or more selectable marker genes and other genetic elements known in the art. Viral vectors are recombinant nucleic acid vectors having at least some nucleic acid sequences derived from one or more viruses. In one example, a viral vector is a lentiviral vector. In another example, a viral vector is an adeno-associated viral vector).

In this disclosure the term "or" is generally employed in its sense including "and/or" unless the content clearly dictates otherwise A. Recombinant TNAP Polypeptides In some embodiments, the recombinant TNAP polypeptides of use in the disclosed methods include the amino acid sequence of SEQ ID NO: 1:

LVPEKEKDPKYWRDQAQETLKYALELQKLNTNVAKNVIMFLGDGMGVST

VTAARILKGQLHHNPGEETRLEMDKFPFVALSKTYNTNAQVPDSAGTAT

AYLCGVKANEGTVGVSAATERSRCNTTQGNEVTSILRWAKDAGKSVGIV

TTTRVNHATPSAAYAHSADRDWYSDNEMPPEALSQGCKDIAYQLMHNIR

DIDVIMGGGRKYMYPKNKTDVEYESDEKARGTRLDGLDLVDTWKSFKPR

YKHSHFIWNRTELLTLDPHNVDYLLGLFEPGDMQYELNRNNVTDPSLSE

MVVVAIQILRKNPKGFFLLVEGGRIDHGHHEGKAKQALHEAVEMDRAIG

QAGSLTSSEDTLTVVTADHSHVFTFGGYTPRGNSIFGLAPMLSDTDKKP

FTAILYGNGPGYKVVGGERENVSMVDYAHNNYQAQSAVPLRHETHGGED

VAVFSKGPMAHLLHGVHEQNYVPHVMAYAACIGANLGHCAPASSAGS which corresponds to amino acids 18-505 of the human TNAP protein provided in NCBI Reference Sequence NP_001356734.1, as available on Dec. 12, 2020, incorporated herein by reference.

In some embodiments, the recombinant TNAP polypeptide comprises or consists of the amino acid sequence set forth as SEQ ID NO: 1. Homologs and variants, such as polypeptides about 95%, 96%, 97%, 98%, 99% identical to the amino acid sequence of SEQ ID NO: 1 are also of use. In some embodiments, the polypeptide is at least 95% identical to the amino acid sequence of SEQ ID NO: 1, such as at least 95%, at least 96%, at least 97%, at least 98%, at least 99%, or 100% identical to the amino acid sequence of SEQ ID NO: 1 are of use in the methods disclosed herein, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In further embodiments, the polypeptide includes at most 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 conservative substitutions in SEQ ID NO: 1, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject.

The location of the functional domains of TNAP protein are disclosed, for example, in J Biol Chem. 2001 Aug. 17; 276(33):31171-8. doi: 10.1074/jbc.M102788200, incorporated herein by reference, which provides the location and function of domains of the TNAP protein. Five regions are known in human TNAP. The TNAP structure has been investigated using mutations associated with hypophosphatasia (HPP) and the consequences of these mutations on the activity or the structure of the enzyme. The mutations are clustered within five regions, namely the active site and its vicinity, the active site valley, the homodimer interface, the crown domain, and the metal-binding site. The crown domain and the metal-binding domain are mammalian-specific. The crown domain contains a collagen binding loop. A synchrotron radiation x-ray fluorescence study confirmed that the metal in the metal-binding site is a calcium ion, which can be important for TNAP function (Mornet et al., J Biol Chem. 2001 Aug. 17; 276(33):31171-8. doi: 10.1074/jbc.M102788200; Kozlenkov et l., J Biol Chem. 2002 Jun. 21; 277(25):22992-9. doi: 10.1074/jbc.M202298200, incorporated herein by reference). In addition, residue 108 in TNAP determines the specificity of inhibition by L-homoarginine (L-hArg) and the conserved Tyr-371 was also necessary for binding of L-hArg. The binding of levamisole to TNAP is mostly dependent on His-434 and Tyr-371, but not on residues 108 or 109 and the main determinant of sensitivity to theophylline was His-434 (Kozlenkov et al., J Bone Miner Res. 2004 November; 19(11):1862-72. doi: 10.1359/JBMR.040608, incorporated herein by referene). See Mornet et al., J Biol Chem. 2001 Aug. 17; 276(33):31171-8. doi: 10.1074/jbc.M102788200, incorporated herein by reference, which provides structural evidence for a functional role of human tissue nonspecific alkaline phosphatase in bone mineralization. See also, Kozlenkov et l., J Biol Chem. 2002 Jun. 21; 277(25):22992-9. doi: 10.1074/jbc.M202298200, incorporated herein by reference, which identifies residues determining the binding specificity of uncompetitive inhibitors to tissue-nonspecific alkaline phosphatase, and Kozlenkov et al., J Bone Miner Res. 2004 November; 19(11):1862-72. doi: 10.1359/JBMR.040608, incorporated herein by reference. Thus, in some embodiments, one or more of these domains/residues is maintained in a variant. In further embodiments, substitutions are made outside of the domains required for TNAP activity.

In some embodiments, the recombinant TNAP polypeptide further includes 4-12 aspartic acid residues at the C terminus or 4-12 glutamic acid residues at the C terminus. In more embodiments, the recombinant TNAP polypeptide further includes 4-10 aspartic acid residues at the C terminus or 4-10 glutamic acid residues at the C terminus. In yet other embodiments, the recombinant TNAP polypeptide further includes 6-8 aspartic acid residues at the C terminus or 6-8 glutamic acid residues at the C terminus. In yet other embodiments, the recombinant TNAP polypeptide includes 4, 5, 6, 7, 8, 9, 10, 11 or 12 aspartic acid residues (e.g., 4, 5, 6, 7, 8, 9, 10, 11 or 12 aspartic acid residues added to the C-terminal amino acid of SEQ ID NO: 1). In more embodiments, the recombinant TNAP polypeptide includes 4, 5, 6, 7, 8, 9, 10, 11 or 12 glutamic acid residues (e.g., 4, 5, 6, 7, 8, 9, 10, 11 or 12 glutamic acid residues added to the C-terminal amino acid of SEQ ID NO: 1). In some non-limiting examples, the recombinant TNAP polypeptide further includes 4-12 aspartic acid residues at the C terminus. In other non-limiting examples, the recombinant TNAP polypeptide further includes 4-10 aspartic acid residues at the C terminus. In more non-limiting examples, the recombinant TNAP polypeptide further includes 6-8 aspartic acid residues at the C terminus.

In more embodiments, the recombinant TNAP polypeptide includes a series of aspartic acids at the C terminus, such as 4-10 aspartic acid residues at the C terminus or 4-10 glutamic acid residues at the C terminus. In yet other embodiments, the recombinant TNAP polypeptide further includes 6-8 aspartic acid residues. Thus, the recombinant TNAP polypeptide can include 4, 5, 6, 7, 8, 9, 10, 11 or 12 aspartic acid residues.

In yet other embodiments, the recombinant TNAP polypeptide does not include more than one aspartic acid residue or glutamic acid residue at the C terminus. In further embodiments, the recombinant TNAP polypeptide does not include any aspartic acid residues or glutamic acid residues at the C terminus. In these embodiments, the recombinant TNAP polypeptide does not include a repeat of aspartic acid residues or glutamic acid residues at the C-terminus.

In some embodiments, the recombinant TNAP polypeptide includes a signal peptide at the N-terminus (such as added to the N-terminal amino acid of SEQ ID NO: 1). The signal peptide sequence can include any suitable signal peptide sequence. In an embodiment, the signal peptide sequence is

MRGPAVLLTVALATLLAPGAGA (SEQ ID NO: 2)

However, other signal peptides are also of use, such as the mouse immunoglobulin light chain kappa signal sequence, such as an amino acid sequence including of consisting of MDFQVQIFSFLLISASVIMSRG (SEQ ID NO: 6). Other signal sequences known in the art can be utilized. In another example, the signal peptide sequence is a human granulocyte-macrophage colony-stimulating factor (GM-CSF) receptor sequence, such as an amino acid sequence including or consisting of LLVTSLLLCELPHPAFLLIPDT (SEQ ID NO: 7). In a further example, the signal peptide sequence is an IL-2 signal peptide. In another example, the signal peptide is MTRLTVLALLAGLLASSRA (SEQ ID NO: 20).

While the signal peptide sequence may facilitate expression of the recombinant TNAP polypeptide, the presence of the signal peptide sequence is not necessary for TNAP function. Upon expression of the TNAP polypeptide, the signal peptide sequence may be cleaved off from the recombinant TNAP polypeptide when produced synthetically. The signal sequence can be cleaved off by cells when the protein is secreted in vitro. Accordingly, in some embodiments, the TNAP polypeptide lacks a signal peptide sequence.

In some embodiments the recombinant TNAP polypeptide includes a histidine tag. In some embodiments, the histidine tag includes at least six histidines. In other embodiments, the histidine tag includes 6 to 12 histidines, such as 6, 7, 8, 9, 10, 11 or 12 histidines. The histidine tag can include 8-12, such as 9-11, such as 10 histidines. The histidine tag can be present at the N terminus or the C-terminus of the TNAP polypeptide. Thus, in specific non-limiting examples, a) the TNAP polypeptide includes a histidine tag N terminal to SEQ ID NO: 1; or b) the TNAP polypeptide includes a histidine tag C terminal to SEQ ID NO: 1. In more embodiments, the histidine tag includes:

(SEQ ID NO: 3)
HHHHHHHHHHENLYFQGM.

in specific non-limiting examples, a) the TNAP polypeptide includes SEQ ID NO: 3 such that it is N terminal to SEQ ID NO: 1; or b) the TNAP polypeptide includes SEQ ID NO: 3 such that it is C terminal to SEQ ID NO: 1.

In this embodiment, the bold sequence is a TEV cleavage sequence. A TEV protease can cleave this protein between the Q (in bold) and the G (in bold), so that the N-terminal portion is removed. In some embodiments, the histidine tag is not included. In some embodiments, GM is retained, at either the C or the N terminus of the TNAP polypeptide, such as comprising the amino acid sequence of SEQ ID NO: 1.

In some embodiments, the TNAP polypeptide includes the residues GM either at the N or the C terminus. In some non-limiting examples, the TNAP polypeptide includes GM C-terminal to SEQ ID NO: 1. In other non-limiting examples, the TNAP polypeptide includes GM N-terminal to SEQ ID NO: 1.

In more embodiments, the recombinant TNAP polypeptide includes, in N to C terminal order, a signal peptide, a histidine tag, and amino acids 18-504 of TNAP or a homolog or variant thereof. In other embodiments, the recombinant TNAP polypeptide is synthesized including the signal peptide and the histidine tag, but then the signal peptide is removed for use. In further embodiments, the recombinant TNAP polypeptide is synthesized including the signal peptide and the histidine tag, but the signal peptide and at least a portion of the histidine tag is removed for use.

In yet other embodiments, the recombinant TNAP polypeptide includes the amino acid sequence of (SEQ ID NO: 4)
<u>MRGPAVLLTVALATLLAPGAGA</u>HHHHHHHHHHENLYFQGMLVPEKEKDP

KYWRDQAQETLKYALELQKLNTNVAKNVIMFLGDGMGVSTVTAARILKG

QLHHNPGEETRLEMDKFPFVALSKTYNTNAQVPDSAGTATAYLCGVKAN

EGTVGVSAATERSRCNTTQGNEVTSILRWAKDAGKSVGIVTTTRVNHAT

PSAAYAHSADRDWYSDNEMPPEALSQGCKDIAYQLMHNIRDIDVIMGGG

RKYMYPKNKTDVEYESDEKARGTRLDGLDLVDTWKSFKPRYKHSHFIWN

RTELLTLDPHNVDYLLGLFEPGDMQYELNRNNVTDPSLSEMVVVAIQIL

RKNPKGFFLLVEGGRIDHGHHEGKAKQALHEAVEMDRAIGQAGSLTSSE

DTLTVVTADHSHVFTFGGYTPRGNSIFGLAPMLSDTDKKPFTAILYGNG

PGYKVVGGERENVSMVDYAHNNYQAQSAVPLRHETHGGEDVAVESKGPM

AHLLHGVHEQNYVPHVMAYAACIGANLGHCAPASSAGS*DDDDDD*.

In this sequence, the signal peptide is underlined, the histidine tag is bolded, and the C-terminal aspartic acids are shown in italics. Optionally, additional aspartic acid residues can be included at the C-terminus, such as 1-6 additional aspartic acid residues.

In further embodiments, the recombinant TNAP polypeptide includes the amino acid sequence:

(SEQ ID NO: 5)
<u>MRGPAVLLTVALATLLAPGAGA</u>HHHHHHHHHHENLYFQGMLVPEKEKDP

KYWRDQAQETLKYALELQKLNTNVAKNVIMFLGDGMGVSTVTAARILKG

QLHHNPGEETRLEMDKFPFVALSKTYNTNAQVPDSAGTATAYLCGVKAN

EGTVGVSAATERSRCNTTQGNEVTSILRWAKDAGKSVGIVTTTRVNHAT

PSAAYAHSADRDWYSDNEMPPEALSQGCKDIAYQLMHNIRDIDVIMGGG

```
RKYMYPKNKTDVEYESDEKARGTRLDGLDLVDTWKSFKPRYKHSHFIWN

RTELLTLDPHNVDYLLGLFEPGDMQYELNRNNVTDPSLSEMVVVAIQIL

RKNPKGFFLLVEGGRIDHGHHEGKAKQALHEAVEMDRAIGQAGSLTSSE

DTLTVVTADHSHVFTFGGYTPRGNSIFGLAPMLSDTDKKPFTAILYGNG

PGYKVVGGERENVSMVDYAHNNYQAQSAVPLRHETHGGEDVAVFSKGPM

AHLLHGVHEQNYVPHVMAYAACIGANLGHCAPASSAGS.
```

In this sequence, the signal peptide is underlined, AND the histidine tag is bolded.

In some embodiments, the recombinant TNAP polypeptide comprises or consists of the amino acid sequence set forth as SEQ ID NO: 4 or SEQ ID NO: 5. Homologs and variants, such as polypeptides about 95%, 96%, 97%, 98%, 99% identical to the amino acid sequence of SEQ ID NO: 4 or SEQ ID NO: 5 are also of use. In some embodiments, the recombinant TNAP polypeptide is at least 95% identical to the amino acid sequence of SEQ ID NO: 4, such as at least 95%, at least 96%, at least 97%, at least 98%, at least 99%, or 100% identical to the amino acid sequence of SEQ ID NO: 4, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In some embodiments, the recombinant TNAP polypeptide is at least 95% identical to the amino acid sequence of SEQ ID NO: 5, such as at least 95%, at least 96%, at least 97%, at least 98%, at least 99%, or 100% identical to the amino acid sequence of SEQ ID NO: 5, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject.

In further embodiments, the recombinant TNAP polypeptide includes at most 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 conservative substitutions in SEQ ID NO: 4, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In more embodiments, the recombinant TNAP polypeptide includes at most 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 conservative substitutions in SEQ ID NO: 5, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject.

In some embodiments, the recombinant TNAP polypeptide comprises amino acids 1-40 of SEQ ID NO: 4, and a polypeptide about 95%, 96%, 97%, 98%, 99% identical to the amino acids 41-528 SEQ ID NO: 4, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In some embodiments, the recombinant TNAP polypeptide comprises amino acids 1-40 of SEQ ID NO: 4, and a polypeptide about at least 95%, at least 96%, at least 97%, at least 98%, at least 99%, or 100% identical to amino acid 41-528 of SEQ ID NO: 4, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In further embodiments, the recombinant TNAP polypeptide includes amino acids 1-40 of SEQ ID NO: 4, includes at a polypeptide with most 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 conservative substitutions in amino acids 41-528 of SEQ ID NO: 4, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. Optionally, the polypeptide also includes additional aspartic acids at the C-terminus, such as 4-12 aspartic acid residues.

In some embodiments, the recombinant TNAP polypeptide comprises amino acids 1-40 of SEQ ID NO: 5, and a polypeptide about 95%, 96%, 97%, 98%, 99% identical to the amino acids 41-528 SEQ ID NO: 5, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In some embodiments, the recombinant TNAP polypeptide comprises amino acids 1-40 of SEQ ID NO: 5, and a polypeptide about at least 95%, at least 96%, at least 97%, at least 98%, at least 99%, or 100% identical to amino acid 41-528 of SEQ ID NO: 5, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject. In further embodiments, the recombinant TNAP polypeptide includes amino acids 1-40 of SEQ ID NO: 5, includes at a polypeptide with most 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 conservative substitutions in amino acids 41-528 of SEQ ID NO: 5, wherein the polypeptide i) promotes alveolar bone regeneration in a subject; ii) increases attachment of a periodontal ligament to a root surface of a tooth of a subject; iii) increases cementum formation in a subject; and/or iv) increases mineralization in a tooth of a subject.

In other embodiments, the recombinant TNAP polypeptide comprises:

```
                                        (SEQ ID NO: 18)
MHHHHHHENLYFQGMLVPEKEKDPKYWRDQAQETLKYALELQKLNTNVA

KNVIMFLGDGMGVSTVTAARILKGQLHHNPGEETRLEMDKFPFVALSKT

YNTNAQVPDSAGTATAYLCGVKANEGTVGVSAATERSRCNTTQGNEVTS

ILRWAKDAGKSVGIVTTTRVNHATPSAAYAHSADRDWYSDNEMPPEALS

QGCKDIAYQLMHNIRDIDVIMGGGRKYMYPKNKTDVEYESDEKARGTRL

DGLDLVDTWKSFKPRYKHSHFIWNRTELLTLDPHNVDYLLGLFEPGDMQ

YELNRNNVTDPSLSEMVVVAIQILRKNPKGFFLLVEGGRIDHGHHEGKA

KQALHEAVEMDRAIGQAGSLTSSEDTLTVVTADHSHVFTFGGYTPRGNS

IFGLAPMLSDTDKKPFTAILYGNGPGYKVVGGERENVSMVDYAHNNYQA
```

-continued

QSAVPLRHETHGGEDVAVFSKGPMAHLLHGVHEQNYVPHVMAYAACIGA

NLGHCAPASSAGSL-(D)$_{n=4-12}$.

In further embodiments, the recombinant TNAP polypeptide comprises:

(SEQ ID NO: 19)
MHHHHHHENLYFQGMLVPEKEKDPKYWRDQAQETLKYALELQKLNTNVA

KNVIMFLGDGMGVSTVTAARILKGQLHHNPGEETRLEMDKFPFVALSKT

YNTNAQVPDSAGTATAYLCGVKANEGTVGVSAATERSRCNTTQGNEVTS

ILRWAKDAGKSVGIVTTTRVNHATPSAAYAHSADRDWYSDNEMPPEALS

QGCKDIAYQLMHNIRDIDVIMGGGRKYMYPKNKTDVEYESDEKARGTRL

DGLDLVDTWKSFKPRYKHSHFIWNRTELLTLDPHNVDYLLGLFEPGDMQ

YELNRNNVTDPSLSEMVVVAIQILRKNPKGFFLLVEGGRIDHGHHEGKA

KQALHEAVEMDRAIGQAGSLTSSEDTLTVVTADHSHVFTFGGYTPRGNS

IFGLAPMLSDTDKKPFTAILYGNGPGYKVVGGERENVSMVDYAHNNYQA

QSAVPLRHETHGGEDVAVFSKGPMAHLLHGVHEQNYVPHVMAYAACIGA

NLGHCAPASSAGSL-(E)$_{n=4-12}$

These polypeptides include the elements of (1) the amino acid sequence set forth in SEQ ID NO:1; (2) 6×His; and (3) 4-12×Asp or 4-12×Glu.

In some embodiments, the recombinant TNAP polypeptide has a 6×His, located at the N-terminus immediately following a Met as the first amino acid of the polypeptide. In further embodiments, the polypeptide has the 6×His is located at its C-terminus.

In some embodiments, the recombinant TNAP polypeptide includes, or consists of, the amino acid sequence set forth in SEQ ID NOs: 18 or 19. In these embodiments, 4-12×Asp or 4-12×Glu includes any number of Asp or Glu ranging from 4, 5, 6, 7, 8, 9, 10, 11, up to 12, for example, 4, 6, 8, 10, 12×Asp or 4, 6, 8, 10, or 12×Glu.

In further embodiments, provided are recombinant TNAP polypeptides comprising the elements of (1) the amino acid sequence set forth in SEQ ID NO:1; (2) 6×His; and (3) 4-12×Asp or 4-12×Glu.

In some embodiments, the 6×His is located at the N-terminus following a Met as the first amino acid of the polypeptide. In other embodiments, the 6×His is located at the C-terminus of the polypeptide. In further embodiments, the histidine tag includes a TEV cleavage sequence. A TEV protease can cleave this protein between the Q (in bold) and the G (in bold), so that the N-terminal portion is removed. In some embodiments, the histidine tag is not included in the polypeptide that is administered to the subject.

B. Chemical Synthesis and Supports

The amino acid sequences disclosed herein can also be synthesized chemically using conventional peptide synthesis or other known protocols. Polypeptides may be synthesized by solid-phase peptide synthesis methods using procedures similar to those described by Merrifield et al., *J. Am. Chem. Soc.*, 85:2149-2156 (1963); Barany and Merrifield, *Solid-Phase Peptide Synthesis, in The Peptides: Analysis, Synthesis*, Biology Gross and Meienhofer (eds.), Academic Press, N.Y., vol. 2, pp. 3-284 (1980); and Stewart et al., *Solid Phase Peptide Synthesis* 2nd ed., Pierce Chem. Co., Rockford, Ill. (1984). During synthesis, N-α-protected amino acids having protected side chains are added stepwise to a growing polypeptide chain linked by its C-terminal and to a solid support, i.e., polystyrene beads. The peptides are synthesized by linking an amino group of an N-α-deprotected amino acid to an α-carboxy group of an N-α-protected amino acid that has been activated by reacting it with a reagent such as dicyclohexylcarbodiimide. The attachment of a free amino group to the activated carboxyl leads to peptide bond formation. The most commonly used N-α-protecting groups include Boc, which is acid labile, and Fmoc, which is base labile.

The recombinant TNAP polypeptides can be included on a solid support Materials suitable for use as the solid support are well known to those of skill in the art and include, but are not limited to, the following: halomethyl resins, such as chloromethyl resin or bromomethyl resin; hydroxymethyl resins; phenol resins, such as 4-(α-[2,4-dimethoxyphenyl]-Fmoc-aminomethyl)phenoxy resin; tert-alkyloxycarbonyl-hydrazidated resins, and the like. Such resins are commercially available, and their methods of preparation are known by those of ordinary skill in the art.

Briefly, the C-terminal N-α-protected amino acid is first attached to the solid support. The N-α-protecting group is then removed. The deprotected α-amino group is coupled to the activated α-carboxylate group of the next N-α-protected amino acid. The process is repeated until the desired peptide is synthesized. The resulting peptides are then cleaved from the insoluble polymer support and the amino acid side chains deprotected. Longer peptides can be derived by condensation of protected peptide fragments. Details of appropriate chemistries, resins, protecting groups, protected amino acids and reagents are well known in the art and so are not discussed in detail herein (See, Atherton et al., *Solid Phase Peptide Synthesis: A Practical Approach*, IRL Press (1989), and Bodanszky, *Peptide Chemistry, A Practical Textbook*, 2nd Ed., Springer-Verlag (1993)).

A biocompatible scaffold can be used. The recombinant TNAP polypeptide can be included in a suitable matrix implant, including, but not limited to, a biopolymer or synthetic polymer or polymer matrix (so as to encapsulate the recombinant TNAP polypeptide prior to introduction into the body of the subject, such as for slow release). Examples of biopolymer include, but are not limited to, fibronectin, fibrin, fibrinogen, thrombin, collagen, and proteoglycans, which may be chemically modified or shaped. In some embodiments, the polymer allows for controlled release. In one example, the recombinant TNAP polypeptide is part of or attached to a hydrogel or microspheres.

A three-dimensional gel is of use with the recombinant TNAP polypeptide included within the interstices of the three-dimensional gel. Numerous biocompatible scaffolds are known and are available. An example of a biocompatible scaffold that may be used is hydroxyapatite/tricalcium phosphate. PLGA or other types of scaffolds can be used. The biocompatible scaffold can be a collagen sponge or gel.

C. Cloning and Subcloning of Coding Sequences for a Recombinant TNAP Polypeptide Polynucleotide sequences encoding TNAP polypeptides can be determined based on their amino acid sequences and available information of various known TNAPs. They can be isolated from a vector containing a known coding sequence or from a genomic library including one or more TNAP genes or can be synthesized by a commercial supplier before further modifications are made.

A nucleic acid sequence encoding a naturally occurring TNAP can be isolated from a cDNA or genomic DNA library using standard cloning techniques such as polymerase chain reaction (PCR). Most commonly used techniques for this purpose are described in standard texts, e.g., Sambrook and Russell, *Molecular Cloning, A Laboratory Manual* (3rd ed. 2001); Kriegler, *Gene Transfer and Expression: A Laboratory Manual* (1990); and Ausubel et al., eds., *Current Protocols in Molecular Biology* (1994).

cDNA libraries suitable for obtaining a coding sequence are commercially available or can be constructed. The general methods of isolating mRNA, making cDNA by reverse transcription, ligating cDNA into a recombinant vector, transfecting into a recombinant host for propagation, screening, and cloning are well known (see, e.g., Gubler and Hoffman, *Gene*, 25: 263-269 (1983); Ausubel et al., supra). Upon obtaining an amplified segment of nucleotide sequence by PCR, the segment can be further used as a probe to isolate a longer length polynucleotide sequence encoding the TNAP from the cDNA library. A general description of appropriate procedures can be found in Sambrook and Russell, supra.

Based on sequence homology, degenerate oligonucleotides can be designed as primer sets and PCR can be performed under suitable conditions (see, e.g., White et al., *PCR Protocols: Current Methods and Applications*, 1993; Griffin and Griffin, *PCR Technology*, CRC Press Inc. 1994) to amplify a segment of nucleotide sequence from a cDNA or genomic library. Using the amplified segment as a probe, a longer length nucleic acid encoding the recombinant TNAP polypeptide, such as SEQ ID NO: 1, is obtained.

Upon acquiring a nucleic acid sequence encoding TNAP, the coding sequence can be modified as appropriate (e.g., deletion, addition, and/or substitution of one or more amino acid residues, fusion with one or more coding sequences of a heterologous origin, including adding a coding sequence for a heterologous tag, such as an affinity tag, for example, 6×His tag or GST tag, SEQ ID NO: 3, and the like) and then be subcloned into a vector, for instance, an expression vector, so that a recombinant TNAP polypeptide can be produced from the resulting construct, for example, after transfection and culturing host cells under conditions permitting recombinant protein expression directed by a promoter operably linked to the coding sequence.

D. Modification of Nucleic Acids for Preferred Codon Usage in a Host Organism

Polynucleotide sequences encoding a recombinant TNAP polypeptide, as disclosed herein, can be further altered to coincide with the preferred codon usage of a particular host. For example, the preferred codon usage of one strain of bacterial cells can be used to derive a polynucleotide that encodes a recombinant TNAP polypeptide and includes the codons favored by this strain. The frequency of preferred codon usage exhibited by a host cell can be calculated by averaging frequency of preferred codon usage in a large number of genes expressed by the host cell (e.g., calculation service is available from web site of the Kazusa DNA Research Institute, Japan). This analysis is preferably limited to genes that are highly expressed by the host cell.

At the completion of modification, the coding sequences can be verified by sequencing and are then subcloned into an appropriate expression vector for recombinant production of the recombinant TNAP polypeptides.

E. Expression and Purification of a Recombinant TNAP Polypeptide

Using the coding sequence, a recombinant TNAP polypeptide can be produced using recombinant genetics, relying on the polynucleotide sequences encoding the polypeptides disclosed herein.

1. Expression Systems

To obtain high level expression of a nucleic acid encoding a recombinant TNAP polypeptide, one typically subclones a polynucleotide encoding the polypeptide into an expression vector that contains a strong promoter (typically heterologous origin) to direct transcription, a transcription/translation terminator and a ribosome binding site for translational initiation. Suitable bacterial promoters include those described, e.g., in Sambrook and Russell, supra, and Ausubel et al., supra. Bacterial expression systems for expressing a recombinant polypeptide are available in, e.g., *E. coli*, *Bacillus* sp., *Salmonella*, and *Caulobacter*. Kits for such expression systems are commercially available. Eukaryotic expression systems for mammalian cells, yeast, and insect cells are well known and are commercially available. In one embodiment, the eukaryotic expression vector is an adenoviral vector, an adeno-associated vector (AAV), or a retroviral vector.

The promoter used to direct expression of a heterologous nucleic acid can depend on the particular application. The promoter is optionally positioned about the same distance from the heterologous transcription start site as it is from the transcription start site in its natural setting. However, some variation in this distance can be accommodated without loss of promoter function.

In addition to the promoter, the expression vector typically includes a transcription unit or expression cassette that contains all the additional elements required for the expression of the recombinant TNAP polypeptide in host cells. A typical expression cassette thus contains a promoter operably linked to the coding sequence and signals required for efficient polyadenylation of the transcript, ribosome binding sites, and translation termination. The nucleic acid sequence encoding the recombinant TNAP polypeptide is typically linked to a cleavable signal peptide sequence to promote secretion of the recombinant polypeptide by the transformed cell. Such signal peptides include, among others, the signal peptides from tissue plasminogen activator, insulin, and neuron growth factor, and juvenile hormone esterase of *Heliothis virescens*. Additional elements of the cassette may include enhancers and, if genomic DNA is used as the structural gene, introns with functional splice donor and acceptor sites.

In addition to a promoter sequence, the expression cassette can also contain a transcription termination region downstream of the structural gene to provide for efficient termination. The termination region may be obtained from the same gene as the promoter sequence or may be obtained from different genes.

The particular expression vector used to transport the genetic information into the cell is not particularly critical. Any of the conventional vectors used for expression in eukaryotic or prokaryotic cells may be used. Standard bacterial expression vectors include plasmids such as pBR322 based plasmids, pSKF, pET23d, pcDNA™, 3.4 TOPO®, and fusion expression systems such as GST and LacZ. Epitope tags can also be added to recombinant proteins to provide convenient methods of isolation, e.g., c-myc.

Expression vectors containing regulatory elements from eukaryotic viruses are typically used in eukaryotic expression vectors, e.g., SV40 vectors, papilloma virus vectors, and vectors derived from Epstein-Barr virus. Other exemplary eukaryotic vectors include pMSG, pAV009/A$^+$, pMTO10/A$^+$, pMAMneo-5, baculovirus pDSVE, and any other vector allowing expression of proteins under the direction of the SV40 early promoter, SV40 later promoter, metallothionein promoter, murine mammary tumor virus promoter, Rous sarcoma virus promoter, polyhedrin promoter, or other promoters shown effective for expression in eukaryotic cells. Lentiviral vectors are also of use.

Some expression systems have markers that provide gene amplification such as thymidine kinase, hygromycin B phosphotransferase, and dihydrofolate reductase. Alternatively, high yield expression systems not involving gene amplification are also suitable, such as a baculovirus vector in insect cells, with a polynucleotide sequence encoding the recombinant TNAP polypeptide under the direction of the polyhedrin promoter or other strong baculovirus promoters.

The elements that are typically included in expression vectors also include a replicon that functions in *E. coli*, a gene encoding antibiotic resistance to permit selection of bacteria that harbor recombinant plasmids, and unique restriction sites in nonessential regions of the plasmid to allow insertion of eukaryotic sequences. The particular antibiotic resistance gene chosen is not critical, any of the many resistance genes known in the art are suitable. The prokaryotic sequences are optionally chosen such that they do not interfere with the replication of the DNA in eukaryotic cells, if necessary. Similar to antibiotic resistance selection markers, metabolic selection markers based on known metabolic pathways may also be used as a means for selecting transformed host cells.

When periplasmic expression of a recombinant protein (e.g., a recombinant TNAP polypeptide) is desired, the expression vector further comprises a sequence encoding a secretion signal, such as the *E. coli* OppA (Periplasmic Oligopeptide Binding Protein) secretion signal or a modified version thereof, which is directly connected to 5' of the coding sequence of the protein to be expressed. This signal sequence directs the recombinant protein produced in cytoplasm through the cell membrane into the periplasmic space. The expression vector may further comprise a coding sequence for signal peptidase 1, which is capable of enzymatically cleaving the signal sequence when the recombinant protein is entering the periplasmic space. More detailed description for periplasmic production of a recombinant protein can be found in, e.g., Gray et al., *Gene* 39: 247-254 (1985), U.S. Pat. Nos. 6,160,089 and 6,436,674.

2. Transfection Methods

Standard transfection methods are used to produce bacterial, mammalian, yeast, insect, or plant cell lines that express large quantities of a recombinant polypeptide, which are then purified using standard techniques (see, e.g., Colley et al., *J. Biol. Chem.* 264: 17619-17622 (1989); *Guide to Protein Purification*, in *Methods in Enzymology*, vol. 182 (Deutscher, ed., 1990). Transformation of eukaryotic and prokaryotic cells are performed according to standard techniques (see, e.g., Morrison, *J. Bact.* 132: 349-351 (1977); Clark-Curtiss & Curtiss, *Methods in Enzymology* 101: 347-362 (Wu et al., eds, 1983).

Any known procedures for introducing foreign nucleotide sequences into host cells may be used. These include the use of calcium phosphate transfection, polybrene, protoplast fusion, electroporation, liposomes, microinjection, plasma vectors, viral vectors and any of the other well-known methods for introducing cloned genomic DNA, cDNA, synthetic DNA, or other foreign genetic material into a host cell (see, e.g., Sambrook and Russell, supra). It is only necessary that the particular genetic engineering procedure used be capable of successfully introducing at least one gene into the host cell capable of expressing the recombinant polypeptide. Exemplary host cells include, but are not limited to, Chinese hamster ovary cells, such as ExpiCHO cells.

3. Detection of Recombinant Expression of a Recombinant TNAP Polypeptide in Host Cells After the expression vector is introduced into appropriate host cells, the transfected cells are cultured under conditions favoring expression of the recombinant TNAP polypeptide. The cells are then screened for the expression of the recombinant polypeptide, which is subsequently recovered from the culture using standard techniques (see, e.g., Scopes, *Protein Purification: Principles and Practice* (1982); U.S. Pat. No. 4,673,641; Ausubel et al., supra; and Sambrook and Russell, supra).

Several general methods for screening gene expression are known. First, gene expression can be detected at the nucleic acid level. A variety of methods of specific DNA and RNA measurement using nucleic acid hybridization techniques are commonly used (e.g., Sambrook and Russell, supra). Some methods involve an electrophoretic separation (e.g., Southern blot for detecting DNA and Northern blot for detecting RNA), but detection of DNA or RNA can be carried out without electrophoresis as well (such as by dot blot). The presence of nucleic acid encoding a recombinant TNAP polypeptide in transfected cells can also be detected by PCR or RT-PCR using sequence-specific primers.

Second, gene expression can be detected at the polypeptide level. Various immunological assays are routinely used by those skilled in the art to measure the level of a gene product, particularly using polyclonal or monoclonal antibodies that react specifically with the recombinant TNAP polypeptide (e.g., Harlow and Lane, Antibodies, *A Laboratory Manual*, Chapter 14, Cold Spring Harbor, 1988; Kohler and Milstein, *Nature,* 256: 495-497 (1975)). Such techniques require antibody preparation by selecting antibodies with high specificity against the recombinant TNAP polypeptide. The methods of raising polyclonal and monoclonal antibodies are well established, see, e.g., Harlow and Lane, supra; Kohler and Milstein, *Eur. J. Immunol.,* 6: 511-519 (1976). More detailed descriptions of preparing antibodies against the recombinant TNAP polypeptide and conducting immunological assays detecting the polypeptides containing the antigens are provided in a later section.

4. Purification of a Recombinantly Produced Recombinant TNAP Polypeptide

Once the expression of a recombinant TNAP polypeptide in transfected host cells is confirmed, the host cells are then cultured in an appropriate scale for the purpose of purifying the recombinant polypeptide.

A. Purification of Recombinantly Produced Polypeptides from Bacteria

When the recombinant TNAP polypeptides are produced recombinantly by transformed bacteria in large amounts, typically after promoter induction, although expression can be constitutive, the polypeptides may form insoluble aggregates. There are several protocols that are suitable for purification of protein inclusion bodies. For example, purification of aggregate proteins (hereinafter referred to as inclusion bodies) typically involves the extraction, separation and/or purification of inclusion bodies by disruption of bacterial cells, e.g., by incubation in a buffer of about 100-150 µg/ml lysozyme and 0.1% Nonidet P40, a non-ionic detergent. The cell suspension can be ground using a Polytron grinder (Brinkman Instruments, Westbury, NY). Alternatively, the cells can be sonicated on ice. Alternate methods of lysing bacteria are described in Ausubel et al. and Sambrook and Russell, both supra, and will be apparent to those of skill in the art.

The cell suspension is generally centrifuged and the pellet containing the inclusion bodies resuspended in buffer which does not dissolve but washes the inclusion bodies, e.g., 20 mM Tris-HCl (pH 7.2), 1 mM EDTA, 150 mM NaCl and 2% Triton-X 100, a non-ionic detergent. It may be necessary to repeat the wash step to remove as much cellular debris as possible. The remaining pellet of inclusion bodies may be resuspended in an appropriate buffer (e.g., 20 mM sodium phosphate, pH 6.8, 150 mM NaCl). Other appropriate buffers will be apparent to those of skill in the art.

Following the washing step, the inclusion bodies are solubilized by the addition of a solvent that is both a strong hydrogen acceptor and a strong hydrogen donor (or a combination of solvents each having one of these properties). The proteins that formed the inclusion bodies may then be renatured by dilution or dialysis with a compatible buffer. Suitable solvents include, but are not limited to, urea (from about 4 M to about 8 M), formamide (at least about 80%, volume/volume basis), and guanidine hydrochloride (from about 4 M to about 8 M). Some solvents that are capable of solubilizing aggregate-forming proteins, such as SDS (sodium dodecyl sulfate) and 70% formic acid, may be inappropriate for use in this procedure due to the possibility of irreversible denaturation of the proteins, accompanied by a lack of immunogenicity and/or activity. Although guanidine hydrochloride and similar agents are denaturants, this denaturation is not irreversible and renaturation may occur upon removal (by dialysis, for example) or dilution of the denaturant, allowing re-formation of the immunologically and/or biologically active protein of interest. After solubilization, the protein can be separated from other bacterial proteins by standard separation techniques. For further description of purifying recombinant polypeptides from bacterial inclusion body, see, e.g., Patra et al., *Protein Expression and Purification* 18: 182-190 (2000).

Alternatively, it is possible to purify recombinant polypeptides, e.g., a recombinant TNAP polypeptide, from bacterial periplasm. Where the recombinant protein is exported into the periplasm of the bacteria, the periplasmic fraction of the bacteria can be isolated by cold osmotic shock in addition to other methods known to those of skill in the art (see e.g., Ausubel et al., supra). To isolate recombinant proteins from the periplasm, the bacterial cells are centrifuged to form a pellet. The pellet is resuspended in a buffer containing 20% sucrose. To lyse the cells, the bacteria are centrifuged and the pellet is resuspended in ice-cold 5 mM $MgSO_4$ and kept in an ice bath for approximately 10 minutes. The cell suspension is centrifuged and the supernatant decanted and saved. The recombinant proteins present in the supernatant can be separated from the host proteins by standard separation techniques well known to those of skill in the art.

b. Standard Protein Separation Techniques for Purification

When a recombinant polypeptide, e.g., a recombinant TNAP polypeptide, is expressed in host cells in a soluble form, its purification can follow the standard protein purification procedure described below. The histidine tag can be used for purification. Several standard purification procedures are also suitable for purifying a recombinant TNAP polypeptide obtained from chemical synthesis.

i. Solubility Fractionation

Often as an initial step, and if the protein mixture is complex, an initial salt fractionation can separate many of the unwanted host cell proteins (or proteins derived from the cell culture media) from the recombinant protein of interest. The preferred salt is ammonium sulfate. Ammonium sulfate precipitates proteins by effectively reducing the amount of water in the protein mixture. Proteins then precipitate on the basis of their solubility. The more hydrophobic a protein is, the more likely it is to precipitate at lower ammonium sulfate concentrations. A typical protocol is to add saturated ammonium sulfate to a protein solution so that the resultant ammonium sulfate concentration is between 20-30%. This will precipitate the most hydrophobic proteins. The precipitate is discarded (unless the protein of interest is hydrophobic) and ammonium sulfate is added to the supernatant to a concentration known to precipitate the protein of interest. The precipitate is then solubilized in buffer and the excess salt removed if necessary, through either dialysis or diafiltration. Other methods that rely on solubility of proteins, such as cold ethanol precipitation, are well known to those of skill in the art and can be used to fractionate complex protein mixtures.

ii. Size Differential Filtration

Based on a calculated molecular weight, a protein of greater and lesser size can be isolated using ultrafiltration through membranes of different pore sizes (for example, Amicon or Millipore membranes). As a first step, the protein mixture is ultrafiltered through a membrane with a pore size that has a lower molecular weight cut-off than the molecular weight of a protein of interest, e.g., a recombinant TNAP polypeptide. The retentate of the ultrafiltration is then ultrafiltered against a membrane with a molecular cut off greater than the molecular weight of the protein of interest. The recombinant protein will pass through the membrane into the filtrate. The filtrate can then be chromatographed as described below.

iii. Column Chromatography

The proteins of interest (such as a recombinant TNAP polypeptide) can also be separated from other proteins on the basis of their size, the histidine tag, net surface charge, hydrophobicity, or affinity for ligands. In addition, antibodies raised against a recombinant TNAP polypeptide can be conjugated to column matrices and the recombinant TNAP polypeptide immunopurified. All of these methods are well known in the art.

It will be apparent to one of skill that chromatographic techniques can be performed at any scale and using equipment from many different manufacturers (e.g., Pharmacia Biotech).

F. Methods

Pharmaceutical compositions are provided herein that include a recombinant TNAP polypeptide, or a polynucleotide encoding the recombinant TNAP polypeptide for the use in promoting periodontal health in a patient. In some embodiments, methods are provided for treating periodontal disease in a subject. The method includes selecting a subject with periodontal disease and, locally administering into the periodontium of the subject a therapeutically effective amount of a recombinant TNAP polypeptide as disclosed herein, or a nucleic acid molecule encoding the recombinant TNAP polypeptide. In other embodiments, methods are provided for treating periimplantitis in a subject. The method includes selecting a subject with periimplantitis, and locally administering into the periodontium of the subject a therapeutically effective amount of a recombinant TNAP polypeptide as disclosed herein, or a nucleic acid molecule encoding the recombinant TNAP polypeptide. In more embodiments, methods are provided for preserving a tooth socket in a subject. The method includes selecting a subject with a tooth socket, such as after a tooth extraction, and locally administering into the periodontium of the subject a therapeutically effective amount of a recombinant TNAP polypeptide as disclosed herein, or a nucleic acid molecule encoding the recombinant TNAP polypeptide. The local administration can be to the gingiva.

The pharmaceutical compositions can be administered by various local routes, e.g., local such as oral, injection into a tooth socket, and/or injection into the periodontium, such as to the gingiva. However, administration can also be systemic, such as subcutaneous, transdermal, transnasal, intramuscular, intravenous, or intraperitoneal. The routes of administering the pharmaceutical compositions include local periodontal delivery to a subject at daily doses of about 0.01-5000 mg, such as about 0.01 to 20 mg, including the weight of a scaffold, which may be about 10 to about 90% of any composition. In other embodiments, about 0.1 g to about 10 mg, or about 0.1 g to about 20 mg, is used per bone defect, depending on the size of the defect. In one non-limiting example, about 0.1 g of protein is used for a bone defect of 1 mm×2 mm×0.5 mm (depth). The appropriate dose may be administered in a single daily dose or as divided doses presented at appropriate intervals, for example as two, three, four, or more sub-doses per day. The dose can be administered as a single dose, or can be repeated, such as daily for 1, 2, 3, 4 or 5 days. The doses can be adjusted based the type and size of the defect.

Periodontal disease is characterized by gingivitis, destruction of alveolar bone and periodontal ligament, apical migration of the epithelial attachment resulting-in the formation of periodontal pockets. Many different tissues are involved, including epithelium, cartilage and bone. The disclosed methods promote healing and regeneration of the gum tissues (epithelial tissue) the periodontal ligament (cartilage) and the jaw (bone). Pulp and dentin tissue within the tooth which was eroded or attacked by periodontal disease can be regenerated using the present methods. In some embodiments the method i) promotes alveolar bone regeneration in the subject; ii) increases attachment of a periodontal ligament to a root surface of a tooth in the subject; iii) increases cementum formation; and/or iv) increases mineralization in a tooth in the subject. In some examples, the method promotes alveolar bone regeneration in the subject by increasing alveolar bone regeneration in the subject by at least 20%, at least 25%, at least 40%, at least 50%, at least 70%, at least 80%, at least 90%, at least 100%, at least 200%, at least 300%, or more, for example relative to absence of administration of the TNAP polypeptide or coding sequence. In some examples, the method increases attachment of a periodontal ligament to a root surface of a tooth in the subject, for example an increase of at least 20%, at least 25%, at least 40%, at least 50%, at least 70%, at least 80%, at least 90%, at least 100%, at least 200%, at least 300%, or more, for example relative to absence of administration of the TNAP polypeptide or coding sequence. In some examples, the method increases cementum formation by at least 20%, at least 25%, at least 40%, at least 50%, at least 70%, at least 80%, at least 90%, at least 100%, at least 200%, at least 300%, or more, for example relative to absence of administration of the TNAP polypeptide or coding sequence. In some examples, the method increases mineralization in a tooth in the subject by at least 20%, at least 25%, at least 40%, at least 50%, at least 70%, at least 80%, at least 90%, at least 100%, at least 200%, at least 300%, or more, for example relative to absence of administration of the TNAP polypeptide or coding sequence. In some examples, combinations of these effects are achieved. The method can also include measuring i) alveolar bone regeneration in the subject; ii) attachment of a periodontal ligament to a root surface of a tooth in the subject; iii) cementum formation; and/or iv) mineralization in the tooth of the subject.

In some embodiments, a composition including an effective amount of a recombinant TNAP polypeptide (or TNAP coding sequence, for example as part of a viral vector) is drawn up into a syringe and administered to a subject. Multiple injections may be made using this procedure. The use of such procedures can direct the TNAP polypeptide to any predetermined site and is relatively non-traumatic.

In some embodiments, the composition including the recombinant TNAP polypeptide (or TNAP coding sequence, for example as part of a viral vector) is combined with a pharmaceutically acceptable carrier substance for local, topical administration. Examples of pharmaceutically acceptable carriers include, for example, commercially available inert gels, or liquids supplemented with albumin, methyl cellulose or a collagen matrix. Typical of such formulations are ointments, creams and gels. These provide advantages, for example, they are non-invasive.

Topical application, and or injection of a viscous solution, such as an ointment or cream can also be used. Ointments can also be prepared using an oleaginous base, e.g., containing fixed oils or hydrocarbons, such as white petrolatum or mineral oil, or an absorbent base, e.g., consisting of an absorbent anhydrous substance or substances, for example, anhydrous lanolin. Following formation of the base, the active ingredients are added in the desired concentration. Creams generally comprise an oil phase (internal phase) containing typically fixed oils, hydrocarbons, and the like, such as waxes, petrolatum, mineral oil, and the like, and an aqueous phase (continuous phase), comprising water and any water-soluble substances, such as added salts. The two phases are stabilized by use of an emulsifying agent, for example, a surface-active agent, such as sodium lauryl sulfate; hydrophilic colloids, such as acacia colloidal clays, beegum, and the like. Upon formation of the emulsion, the active ingredients are added in the desired concentration. Gels are comprised of a base selected from an oleaginous base, water, or an emulsion-suspension base, as previously described. To the base is added a gelling agent which forms a matrix in the base, increasing its viscosity to a semisolid consistency. Examples of gelling agents are hydroxypropyl cellulose, acrylic acid polymers, and the like. The active ingredients are added to the formulation at the desired concentration at a point preceding addition of the gelling agent. These can be provided, for example, to the gingiva.

A biocompatible scaffold can be used for treatment. The recombinant TNAP polypeptide can be included in a suitable matrix implant, including, but not limited to, a biopolymer or synthetic polymer or polymer matrix (so as to encapsulate the recombinant TNAP polypeptide prior to introduction into the body of the subject, such as for slow release). Examples of biopolymer include, but are not limited to, fibronectin, fibrin, fibrinogen, thrombin, collagen, and proteoglycans, which may be chemically modified or shaped. In some embodiments, the polymer allows for controlled release. A hydrogel or microspheres are also of use. These can be applied to the periodontium, such as the gingiva, or inserted into a tooth socket.

A three-dimensional gel is of use with the recombinant TNAP polypeptide included within the interstices of the three-dimensional gel. Numerous biocompatible scaffolds are known in the art and are available. An example of a biocompatible scaffold that may be used is hydroxyapatite/tricalcium phosphate. PLGA or other types of scaffolds can be used. The biocompatible scaffold can be a collagen sponge or gel. These can be applied to the periodontium, such as the gingiva, or inserted into a tooth socket.

Useful matrix materials include, but are not limited to, synthetic homopolymers and copolymers of glycolic acid and lactic acid, hydroxyapatite, tricalcium and other calcium phosphates, and particulate demineralized guanidine extracted species-specific (allogenic) bone. The matrix containing the recombinant TNAP polypeptide can be applied into a shape spanning the bone or cartilage defect to serve as a "temporary scaffold" and substratum as a base for anchoring and proliferation of differentiated tissue cell.

A bone collagen matrix, see, for example, U.S. Pat. No. 4,975,526, which is incorporated herein by reference, can be used as the carrier for application to bone and/or cartilage. The collagen matrix described in this patent is a biodegradable, biocompatible, mineral-free, insoluble Type-I bone collagen particles being depleted of non-collagenous protein. The collagen matrix particles can have a mean diameter of about 70 m-850 m, and an increased intraparticle surface area relative to untreated material. In this embodiment, the recombinant TNAP polypeptide is first dissolved in a suitable solvent such as buffered sterile saline and then added to the collagen matrix. The mixture is vortexed, and the matrix is lyophilized and shaped as desired or implanted into an area of bone or cartilage by packing.

1. Additional Pharmaceutical Compositions for Use in the Disclosed Methods

Pharmaceutical compositions, when used to deliver an effective amount of the recombinant TNAP polypeptide (or TNAP coding sequence, for example as part of a viral vector) to a recipient may contain certain physiologically acceptable excipient(s) and are optionally formulated for certain preferred delivery methods. Pharmaceutical compositions including (1) an effective amount of a recombinant TNAP polypeptide (or TNAP coding sequence, for example as part of a viral vector), and (2) at least one possibly more physiologically acceptable excipients or carriers, therefore useful in both prophylactic and therapeutic applications designed for treating or preventing various periodontal diseases and conditions involving diminished regeneration of cementum or alveolar bone or weakened PDL attachment to cementum and/or alveolar bone. A physiological or pharmaceutically acceptable carrier is an inert agent that does not detectably alter or affect the functionality of an active ingredient (e.g., the recombinant TNAP polypeptide) present in the same composition for which the active ingredient is used. The pharmaceutical compositions can be used, for example, in the methods disclosed herein. Some examples include a lyoprotectant; a surfactant; a bulking agent; a tonicity adjusting agent; a stabilizer; a preservative; and a buffer. Compositions are suitable for use in a variety of drug delivery systems. Suitable formulations for use are found in Remington's Pharmaceutical Sciences, Mack Publishing Company, Philadelphia, PA, 17th ed. (1985). For a brief review of methods for drug delivery, see, Langer, Science 249: 1527-1533 (1990).

For preparing pharmaceutical compositions containing a recombinant TNAP polypeptide (or TNAP coding sequence, for example as part of a viral vector), inert and pharmaceutically acceptable carriers can be used. The pharmaceutical carrier can be either solid or liquid. Solid form preparations include, for example, powders, tablets, dispersible granules, capsules, cachets, and suppositories. A solid carrier can be one or more substances that can also act as diluents, flavoring agents, solubilizers, lubricants, suspending agents, binders, or tablet disintegrating agents; it can also be an encapsulating material.

In powders, the carrier is generally a finely divided solid that is in a mixture with the finely divided active component, e.g., a recombinant TNAP polypeptide. In tablets, the active ingredient (the recombinant TNAP polypeptide) is mixed with the carrier having the necessary binding properties in suitable proportions and compacted in the shape and size desired.

For preparing pharmaceutical compositions in the form of suppositories, a low-melting wax such as a mixture of fatty acid glycerides and cocoa butter is first melted and the active ingredient is dispersed therein by, for example, stirring. The molten homogeneous mixture is then poured into convenient-sized molds and allowed to cool and solidify.

Powders and tablets preferably contain between about 5% to about 70% by weight of the active ingredient. Suitable carriers include, for example, magnesium carbonate, magnesium stearate, talc, lactose, sugar, pectin, dextrin, starch, tragacanth, methyl cellulose, sodium carboxymethyl cellulose, a low-melting wax, cocoa butter, and the like.

The pharmaceutical compositions can include the formulation of the active compound of a recombinant TNAP polypeptide or TNAP coding sequence, for example as part of a viral vector) with encapsulating material as a carrier providing a capsule in which the polypeptide (with or without other carriers) is surrounded by the carrier, such that the carrier is thus in association with the compound. In a similar manner, cachets can also be included. Tablets, powders, cachets, and capsules can be used as solid dosage forms suitable for oral administration.

Liquid pharmaceutical compositions include, for example, solutions suitable for oral or parenteral administration, suspensions, and emulsions suitable for oral administration. Sterile water solutions of the active component (e.g., a recombinant TNAP polypeptide) or sterile solutions of the active component in solvents comprising water, buffered water, saline, PBS, ethanol, or propylene glycol are examples of liquid compositions suitable for parenteral administration. The compositions may contain pharmaceutically acceptable auxiliary substances as required to approximate physiological conditions, such as pH adjusting and buffering agents, tonicity adjusting agents, wetting agents, detergents, and the like.

Sterile solutions can be prepared by dissolving the active component (e.g., a recombinant TNAP polypeptide) in the desired solvent system, and then passing the resulting solution through a membrane filter to sterilize it or, alternatively, by dissolving the sterile compound in a previously sterilized solvent under sterile conditions. The resulting aqueous solutions may be packaged for use as is, or lyophilized, the lyophilized preparation being combined with a sterile aqueous carrier prior to administration. The pH of the preparations typically will be between 3 and 11, such as pH 5 to 9 or pH 7 to 8.

The pharmaceutical compositions containing the recombinant TNAP polypeptide (or TNAP coding sequence, for example as part of a viral vector) can be administered for prophylactic and/or therapeutic treatments. In therapeutic applications, compositions are administered to a patient already suffering from a periodontal disease in an amount sufficient to prevent, cure, reverse, or at least partially slow or arrest the symptoms of the condition and its complications. An amount adequate to accomplish this will depend on the severity of the disease or condition, the size of the bone defect, and general state of the patient. Local periodontal delivery can be applied to a subject at daily doses of about 0.01-5000 mg, such as about 0.01 to 20 mg, including the weight of a scaffold, which may be about 10 to about 90% of any composition. In other embodiments, about 0.1 g to about 10 mg, or about 0.1 g to about 20 mg, is used per bone defect, depending on the size of the defect. In one non-limiting example, about 0.1 g of protein is used for a bone defect of 1 mm×2 mm×0.5 mm (depth). The appropriate dose may be administered in a single daily dose or as divided doses presented at appropriate intervals, for example as two, three, four, or more sub-doses per day. The dose can be administered as a single dose, or can be repeated, such as daily for 1, 2, 3, 4 or 5 days. The doses can be adjusted based the size and type of the defect.

In prophylactic applications, pharmaceutical compositions containing a recombinant TNAP polypeptide (or TNAP coding sequence, for example as part of a viral vector) are administered to a patient susceptible to or otherwise at risk of developing a periodontal disease or disorder in an amount sufficient to delay or prevent the onset of the symptoms. Such an amount is defined to be a "prophylactically effective dose." The routes of administering the pharmaceutical compositions include local periodontal delivery to a subject at daily doses of about 0.01-5000 mg, such as about 0.01 to 20 mg, including the weight of a scaffold, which may be about 10 to about 90% of any composition. In other embodiments, about 0.1 g to about 10 mg, or about 0.1 g to about 20 mg, is used per bone defect, depending on the size of the defect. In one non-limiting example, about 0.1 g of protein is used for a bone defect of 1 mm×2 mm×0.5 mm (depth). The appropriate dose may be administered in a single daily dose or as divided doses presented at appropriate intervals, for example as two, three, four, or more sub-doses per day. The dose can be administered as a single dose, or can be repeated, such as daily for 1, 2, 3, 4 or 5 days. The doses can be adjusted based type and size of the defect.

Single or multiple administrations of the compositions can be carried out with dose levels and pattern being selected by the treating physician, dentist, or health care provided. In any event, the pharmaceutical formulations should provide a quantity of a recombinant TNAP polypeptide sufficient to effectively promote periodontal health in the patient, either therapeutically or prophylactically.

As the recombinant TNAP polypeptide (or TNAP coding sequence, for example as part of a viral vector) is intended for use to promote periodontal health, treat periodontal diseases, peri-implantitis, preserve a tooth socket, or alleviate the symptoms, the recombinant TNAP polypeptide may be the sole active agent in the pharmaceutical composition, or the composition may further comprise one or more other active agents suitable for, e.g., inhibiting bacterial infection, promoting biomineralization of the periodontium (e.g., cementum and alveolar bone), promoting mineralization, promote or suppressing dental caries. The importance of the extracellular matrix including small integrin-binding ligand N-linked glycoprotein (SIBLING family) of proteins on skeletal mineralization and bone remodeling is disclosed, for example, in *J Endocrinol.* 2012 September; 214(3):241-55. doi: 10.1530/JOE-12-0143, incorporated herein by reference.

While the compositions can be administered by any suitable route, in some embodiments, the compositions may be formulated for topical administration, which may be in the form of ointments, lotions, creams, pastes, gels, drops, sprays, liquids, or powders. Conventional pharmaceutical carriers, aqueous, powder or oily bases, thickeners and the like may be necessary or desirable. The compositions can also be in form of (including but not limited to) tablets, pills, powders, lozenges, sachets, cachets, elixirs, suspensions, emulsions, solutions, syrups, aerosols (as a solid). In some cases, the composition may contain, for example, up to 1%, 2%, 5%, 10% or more by weight of the active agent (e.g., a recombinant TNAP).

In a particular embodiment, the composition is in the form of a dental care product, including but not limited to, toothpaste, toothpowder, mouth wash/rinse, dental floss, liquid dentifrice, dental tablet, topical gel, troch, chewing gum, dental paste, gingival massage cream, gargle tablet, lozenge, and food product. Further, the composition may be formulated for injection, especially location injection that directly deliver to the patient's mouth, such as oral epithelial tissue or periodontium tissue. One example of delivery method is injection into the gingiva or in a crevice in the cementum or alveolar bone, for example, just prior to, during, or just after a dental implant process.

2. Use of Nucleic Acid Molecules in the Disclosed Methods

Periodontal diseases and peri-implantitis can be treated or alleviated, and a tooth socket can be preserved, by therapeutic approaches that involve introducing a nucleic acid encoding a recombinant TNAP such that the expression of the polypeptide leads to reduced or abolished cause and symptoms of the periodontal diseases in the recipients. Compositions and methods are provided herein for nucleic acid-based treatment schemes.

a. Vectors for Nucleic Acid Delivery

For delivery to a cell or organism, a nucleic acid encoding a recombinant TNAP polypeptide can be incorporated into a vector. Examples of vectors used for such purposes include expression plasmids capable of directing the expression of the recombinant TNAP polypeptide in the target cell. In other instances, the vector is a viral vector system wherein the polynucleotide coding sequence is incorporated into a viral genome that is capable of transfecting the target cell. In an embodiment, the coding sequence can be operably linked to expression and control sequences that can direct transcription of sequence in the desired target tissue. Thus, one can achieve improved periodontal health in the target tissue, such as periodontium.

b. Gene Delivery Systems

A gene delivery system is any means for the delivery of a nucleic acid to a target cell. Viral vector systems useful in the introduction and expression of a recombinant TNAP polypeptide include, for example, naturally occurring or recombinant viral vector systems. Depending upon the particular application, suitable viral vectors include replication competent, replication deficient, and conditionally replicating viral vectors. For example, viral vectors can be derived from the genome of human or bovine adenoviruses, vaccinia virus, herpes virus, adeno-associated virus, minute virus of mice (MVM), lentiviruses such as HIV, sindbis virus, and retroviruses (including but not limited to Rous sarcoma virus and lentivirus), and MoMLV. Typically, the coding sequence for the recombinant TNAP polypeptide is inserted into such vectors to allow packaging of the gene construct, typically with accompanying viral DNA, followed by infection of a sensitive host cell and expression of the polypeptide.

Similarly, viral envelopes used for packaging gene constructs that include the coding sequence for a recombinant TNAP polypeptide can be modified by the addition of receptor ligands or antibodies specific for a receptor to permit receptor-mediated endocytosis into specific cells (see, e.g., WO 93/20221, WO 93/14188, and WO 94/06923).

Retroviral vectors may also be useful for introducing the recombinant TNAP polypeptide into target cells or organisms. Retroviral vectors are produced by genetically manipulating retroviruses. The viral genome of retroviruses is RNA. Upon infection, this genomic RNA is reverse transcribed into a DNA copy which is integrated into the chromosomal DNA of transduced cells with a high degree of stability and efficiency. The integrated DNA copy is referred to as a provirus and is inherited by daughter cells as is any other gene. The wild type retroviral genome and the proviral DNA have three genes: the gag, the pol and the env genes, which are flanked by two long terminal repeat (LTR) sequences. The gag gene encodes the internal structural (nucleocapsid) proteins; the pol gene encodes the RNA directed DNA polymerase (reverse transcriptase); and the env gene encodes viral envelope glycoproteins. The 5' and 3' LTRs serve to promote transcription and polyadenylation of virion RNAs. Adjacent to the 5' LTR are sequences necessary for reverse transcription of the genome (the tRNA primer binding site) and for efficient encapsulation of viral RNA into particles (the Psi site) (see, Mulligan, In: *Experimental Manipulation of Gene Expression*, Inouye (ed), 155-173 (1983); Mann et al., *Cell* 33:153-159 (1983); Cone and Mulligan, *Proceedings of the National Academy of Sciences, U.S.A.*, 81:6349-6353 (1984)).

The design of retroviral vectors is well known to those of ordinary skill in the art. In brief, if the sequences necessary for encapsidation (or packaging of retroviral RNA into infectious virions) are missing from the viral genome, the result is a cis acting defect which prevents encapsidation of genomic RNA. However, the resulting mutant is still capable of directing the synthesis of all virion proteins. Retroviral genomes from which these sequences have been deleted, as well as cell lines containing the mutant genome stably integrated into the chromosome are well known in the art and are used to construct retroviral vectors. Preparation of retroviral vectors and their uses are described in many publications including, e.g., European Patent Application EPA 0 178 220; U.S. Pat. No. 4,405,712, Gilboa *Biotechniques* 4:504-512 (1986); Mann et al., *Cell* 33:153-159 (1983); Cone and Mulligan *Proc. Natl. Acad. Sci. USA* 81:6349-6353 (1984); Eglitis et al. *Biotechniques* 6:608-614 (1988); Miller et al. *Biotechniques* 7:981-990 (1989); Miller (1992) supra; Mulligan (1993), supra; and WO 92/07943.

The retroviral vector particles are prepared by recombinantly inserting the desired coding sequence into a retrovirus vector and packaging the vector with retroviral capsid proteins by use of a packaging cell line. The resultant retroviral vector particle is incapable of replication in the host cell but is capable of integrating into the host cell genome as a proviral sequence containing the desired nucleotide sequence. As a result, the patient is capable of producing the recombinant TNAP polypeptide, thus reducing or abolishing the underlying cause of various periodontal diseases.

Packaging cell lines that are used to prepare the retroviral vector particles are typically recombinant mammalian tissue culture cell lines that produce the necessary viral structural proteins required for packaging, but which are incapable of producing infectious virions. The defective retroviral vectors that are used, on the other hand, lack these structural genes but encode the remaining proteins necessary for packaging. To prepare a packaging cell line, one can construct an infectious clone of a desired retrovirus in which the packaging site has been deleted. Cells comprising this construct will express all structural viral proteins, but the introduced DNA will be incapable of being packaged. Alternatively, packaging cell lines can be produced by transforming a cell line with one or more expression plasmids encoding the appropriate core and envelope proteins. In these cells, the gag, pol, and env genes can be derived from the same or different retroviruses.

A number of packaging cell lines are also available. Examples of these cell lines include Crip, GPE86, PA317 and PG13 (see Miller et al., *J. Virol.* 65:2220-2224 (1991)). Examples of other packaging cell lines are described in Cone and Mulligan *Proceedings of the National Academy of Sciences, USA*, 81:6349-6353 (1984); Danos and Mulligan *Proceedings of the National Academy of Sciences, USA*, 85:6460-6464 (1988); Eglitis et al. (1988), supra; and Miller (1990), supra.

c. Pharmaceutical Formulations for Nucleic Acid Molecules

When used for pharmaceutical purposes, the nucleic acid encoding a recombinant TNAP polypeptide is generally formulated in a suitable buffer, which can be any pharmaceutically acceptable buffer, such as phosphate buffered saline or sodium phosphate/sodium sulfate, Tris buffer, glycine buffer, sterile water, and other buffers known to the ordinarily skilled artisan such as those described by Good et al. *Biochemistry* 5:467 (1966).

The compositions can further include a stabilizer, an enhancer, and/or other pharmaceutically acceptable carriers or vehicles. A pharmaceutically acceptable carrier can contain a physiologically acceptable compound that acts, for example, to stabilize the nucleic acid and any associated vector. A physiologically acceptable compound can include, for example, carbohydrates, such as glucose, sucrose or dextrans, antioxidants, such as ascorbic acid or glutathione, chelating agents, low molecular weight proteins or other stabilizers or excipients. Other physiologically acceptable compounds include wetting agents, emulsifying agents, dispersing agents or preservatives, which are particularly useful for preventing the growth or action of microorganisms. Various preservatives are well known and include, for example, phenol and ascorbic acid. Examples of carriers, stabilizers or adjuvants can be found in Remington's *Pharmaceutical Sciences*, Mack Publishing Company, Philadelphia, PA, 17th ed. (1985).

D. Administration of Formulations Including Nucleic Acid Molecules

The formulations containing a nucleic acid encoding a recombinant TNAP polypeptide can be delivered to any tissue or organ using any delivery method known to the ordinarily skilled artisan. In some embodiments, the nucleic acid is formulated in mucosal, topical, and/or buccal formulations, particularly mucoadhesive gel and topical gel formulations. Exemplary permeation enhancing compositions, polymer matrices, and mucoadhesive gel preparations for transdermal delivery are disclosed in U.S. Pat. No. 5,346,701.

The formulations containing the encoding nucleic acid are typically administered to a patient systematically or locally, such as directly to the periodontium. In some embodiments, the encoding nucleic acid is introduced into periodontium by such methods as microinjection, calcium phosphate precipitation, liposome fusion, ultrasound, electroporation, or biolistics. In further embodiments, the nucleic acid is taken up directly by the tissue of interest (e.g., periodontium).

In some embodiments, the encoding nucleic acid is administered ex vivo to cells or tissues explanted from a patient, then returned to the patient. Examples of ex vivo administration of therapeutic gene constructs include Nolta et al., *Proc Natl. Acad. Sci. USA* 93(6):2414-9 (1996); Koc et al., *Seminars in Oncology* 23(1):46-65 (1996); Raper et al., *Annals of Surgery* 223(2):116-26 (1996); Dalesandro et al., *J. Thorac. Cardi. Surg.*, 11(2):416-22 (1996); and Makarov et al., *Proc. Natl. Acad. Sci. USA* 93(1):402-6 (1996).

Effective dosage of the formulations will vary depending on many different factors, including means of administration, target site, physiological state of the patient, and other medicines administered. Thus, treatment dosages will need to be titrated to optimize safety and efficacy. In determining the effective amount of the vector to be administered, the physician should evaluate the particular nucleic acid used, the disease state being diagnosed; the age, weight, and overall condition of the patient, circulating plasma levels, vector toxicities, progression of the disease, and the production of anti-vector antibodies. The size of the dose also will be determined by the existence, nature, and extent of any adverse side-effects that accompany the administration of a particular vector.

In some embodiments, doses ranging from about 10 ng-1 g, 100 ng-100 mg, about 1 µg-10 mg, or about 30-300 µg encoding nucleic acid per patient are used. Doses generally range between about 0.01 and about 50 mg per kilogram of body weight, preferably between about 0.1 and about 5 mg/kg of body weight or about $10^8$-$10^{10}$ or $10^{12}$ viral particles per injection. In general, the dose equivalent of a naked nucleic acid from a vector is from about 1 µg-100 µg for a typical 70 kg patient, and doses of vectors which include a retroviral particle are calculated to yield an equivalent amount of a nucleic acid encoding a recombinant TNAP polypeptide.

G. Kits

Kits are provided for promoting periodontal health, treating periodontal disease, peri-implantitis, or preserving a tooth socket, by administering a recombinant TNAP polypeptide or nucleic acid encoding the polypeptide according to a method disclosed herein. The kits typically include a first container (such as a glass or plastic vial) that contains a pharmaceutical composition having an effective amount of recombinant TNAP polypeptide (or TNAP coding sequence, for example as part of a viral vector), optionally with a second container (such as a glass or plastic vial) containing one or more agents with activity for promoting dental and periodontal health, for example, a compound providing fluoride, calcium, or phosphate ion, anti-microbial agents to inhibit bacterial infection, biomineralization-promoting agents to control or promote biomineralization of periodontium tissue, or agents capable of inhibiting dental caries. See, e.g., U.S. Pat. Nos. 6,811,769; 8,999,298; 9,211,240; 9,290,555; and 10,314,776 disclose therapeutically active agents and formulations that can be used in combination with the disclosed recombinant TNAP polypeptides.

The pharmaceutical composition containing a recombinant TNAP polypeptide (or TNAP coding sequence, for example as part of a viral vector), optionally with another active agent capable of promoting dental/periodontal health, can be in any suitable form, including but not limited to tablets, pills, powders, lozenges, sachets, cachets, elixirs, suspensions, emulsions, solutions, syrups, aerosols (as a solid or in a liquid medium), ointments containing, for example, up to 10% by weight of the active compound, soft and hard gelatin capsules, sterile injectable solutions, and sterile packaged powders.

In some embodiments the pharmaceutical compositions are in the form of a dental care product, including but not limited to toothpaste, toothpowders, mouthwash, dental floss, liquid dentifrices, dental tablets, topical gels, troches, chewing gums, dental pastes, gingival massage creams, gargle tablets, lozenges, and food products. In other embodiments, the compositions may be formulated for injection directly delivering the active ingredient(s) such as the recombinant TNAP polypeptide or another active agent into the periodontium tissue, e.g., gingiva, or a crevice in the cementum or alveolar bone, or in the oral epithelial tissue near the site of a periodontal condition may exist or develop later.

In some embodiments, the kits will also include informational material containing instructions on how to dispense the pharmaceutical composition, including description of the type of patients who may be treated (e.g., a person suffering from a periodontal disease or at increased risk of later developing a periodontal disease), the schedule (e.g., dose and frequency of administration) and route of administration, and the like.

The disclosure is illustrated by the following non-limiting Examples.

EXAMPLES

Identification of novel therapeutic approaches inspired by the developmental biology of periodontal tissues can lead to improved therapeutic outcomes. Studies revealed that appropriate balance in levels of inorganic phosphate ($P_i$), a promoter of hydroxyapatite (HA) formation, and pyrophosphate ($PP_i$), a potent inhibitor of hydroxyapatite crystal growth, is crucial for proper mineralization, and that acellular cementum is particularly sensitive to this mechanism of regulation (Ao et al. 2017, Bone. 105:134-147; Chu et al. 2020, Bone. 136:115329; Foster et al. 2012, Bone. 78:150-164; Thumbigere-Math et al. 2018, J Dent Res. 97(4):432-441; Nagasaki et al. 2020, J Dent Res. In press). Three $P_i/PP_i$ regulators work in concert to direct mineralization of periodontal tissues. Tissue-nonspecific alkaline phosphatase (Gene:Alpl for mouse and ALPL for humans; Protein: TNAP) promotes mineralization by hydrolyzing $PP_i$ to produce $P_i$(Millan 2006, Purinergic Signal. 2(2):335-341). TNAP is expressed by mineralizing cells, including cementoblasts and osteoblasts, and loss-of-function mutations result in increased $PP_1$ levels and the inherited hypomineralization disorder, hypophosphatasia (HPP; OMIM #241500, 241510, 146300), which features tooth loss due to cementum defects (Bowden and Foster 2019, Adv Exp Med Biol. 1148:279-322). The progressive ankylosis protein (Ank$^{-/-}$ ANK in mice, ANKH/ANK in human) is a transmembrane regulator of $PP_i$ transport to the extracellular space (Ho et al. 2000, Science. 289(5477):265-270; Szeri et al. 2020, PLoS Genet. 16(7):e1008884). Ectonucleotide pyrophosphatase phosphodiesterase 1 (Enpp1/ENPP1) is an ectoenzyme that extracellularly cleaves nucleotide triphosphates to $PP_1$ (Rutsch et al. 2003, Nat Genet. 34(4):379-381). Both ANK and ENPP1 increase local $PP_i$ levels, and loss-of-function of either gene causes $PP_i$ deficiency and hypermineralization disorders. Loss of ANK or ENPP1 results in dramatically thicker acellular cementum (Ao et al. 2017, Bone. 105:134-147; Chu et al. 2020, Bone. 136: 115329; Foster et al. 2012, Bone. 78:150-164; Thumbigere-Math et al. 2018, J Dent Res. 97(4):432-441). Genetic reduction of $PP_i$, by crossing Ank$^{-/-}$ mice with Alpl$^{-/-}$ mice, corrected cementum developmental defects. Furthermore, loss of ANK or ENPP1 promotes cementum regeneration in a periodontal fenestration model (Rodrigues et al. 2011, *J Periodontol.* 82(12):1757-1766; Nagasaki et al.2020, *J Dent Res*. In press), implicating modifiers of $P_i/PP_i$ metabolism as strategies to promote periodontal regeneration.

Mice lacking bone sialoprotein (BSP/Ibsp), an extracellular matrix (ECM) protein, exhibit severe periodontal breakdown, including reduced cementum, PDL detachment and disorganization, and alveolar bone destruction (Foster et al. 2015; Foster et al. 2013, J Dent Res. 92(2):166-172).

Genetic reduction of $PP_i$ by crossing $Ank^{-/-}$ with $Ibsp^{-/-}$ mice, resulted in correction of cementum defects noted in $Ibsp^{-/-}$ mice (Ao et al. 2017, Bone. 105:134-147). As disclosed herein, it was determined that pharmacological approaches to decrease $PP_i$ and increase $P_i$ levels through delivery of TNAP could correct cementum defects and promote cementum regeneration in the $Ibsp^{-/-}$ model of periodontal disease. A lentivirus construct was employed that expressed mineral-targeted TNAP (Yamamoto et al. 2011, J Bone Miner Res. 26(1):135-142) for systemic delivery to treat developmental defects in the $Ibsp^{-/-}$ model. Recombinant human TNAP (rhTNAP) was used for local delivery to treat a periodontal fenestration defect (Rodrigues et al. 2011, J Periodontol. 82(12):1757-1766) in adult $Ibsp^{-/-}$ mice. An $Ibsp^{-/-}$ cementoblast cell line was used to determine effects of bovine intestinal ALP (bIAP) on gene expression and mineralization, in vitro.

Example 1

Materials and Methods

Animals: $Ibsp^{-/-}$ mice on a 129P3/CD1 background were described previously (Ao et al. 2017, Bone. 105:134-147). Male wild-type (WT) control, and $Ibsp^{-/-}$ mice were employed to minimize potential gender variability. At weaning, mice were provided a soft diet (Diet Gel 31M, ClearH2O, Portland, ME) in addition to normal chow (NIH-31) to reduce incisor malocclusion in $Ibsp^{-/-}$ mice.

Systemic TNAP Lentiviral Vector Delivery: For systemic delivery, a lentiviral vector expressing mineral-targeted TNAP with a deca-aspartate tail ($TNAP-D_{10}$) was employed that was previously shown to produce high levels of alkaline phosphatase (ALP/Alpl) and correct skeletal defects in $Alpl^{-/-}$ mice (Cellomics Technology, Halethorpe, MD) (Yamamoto et al. 2011, J Bone Miner Res. 26(1):135-142). $TNAP-D_{10}$ lentivirus ($5.0 \times 10^7$ transduction units; TU) in phosphate-buffered saline (PBS) was mixed with Evans Blue dye (Sigma-Aldrich Inc, St. Louis, MO) to monitor intramuscular injection using a Hamilton syringe and 34 gauge Hamilton needle (Hamilton Company, Reno, NV). Injections were made into the quadriceps muscles of 5-day-postnatal (dpn) bone sialoprotein knockout ($Ibsp^{-/-}$) mice (n=3). PBS vehicle was injected into control $Ibsp^{-/-}$ and wild-type (WT) mice (n=3/genotype). Blood was collected from the retro-orbital sinus at 30 dpn and by cardiac puncture at 60 dpn for measurement of plasma ALP levels. Mice were euthanized by cervical dislocation at 60 dpn.

Figure 6:
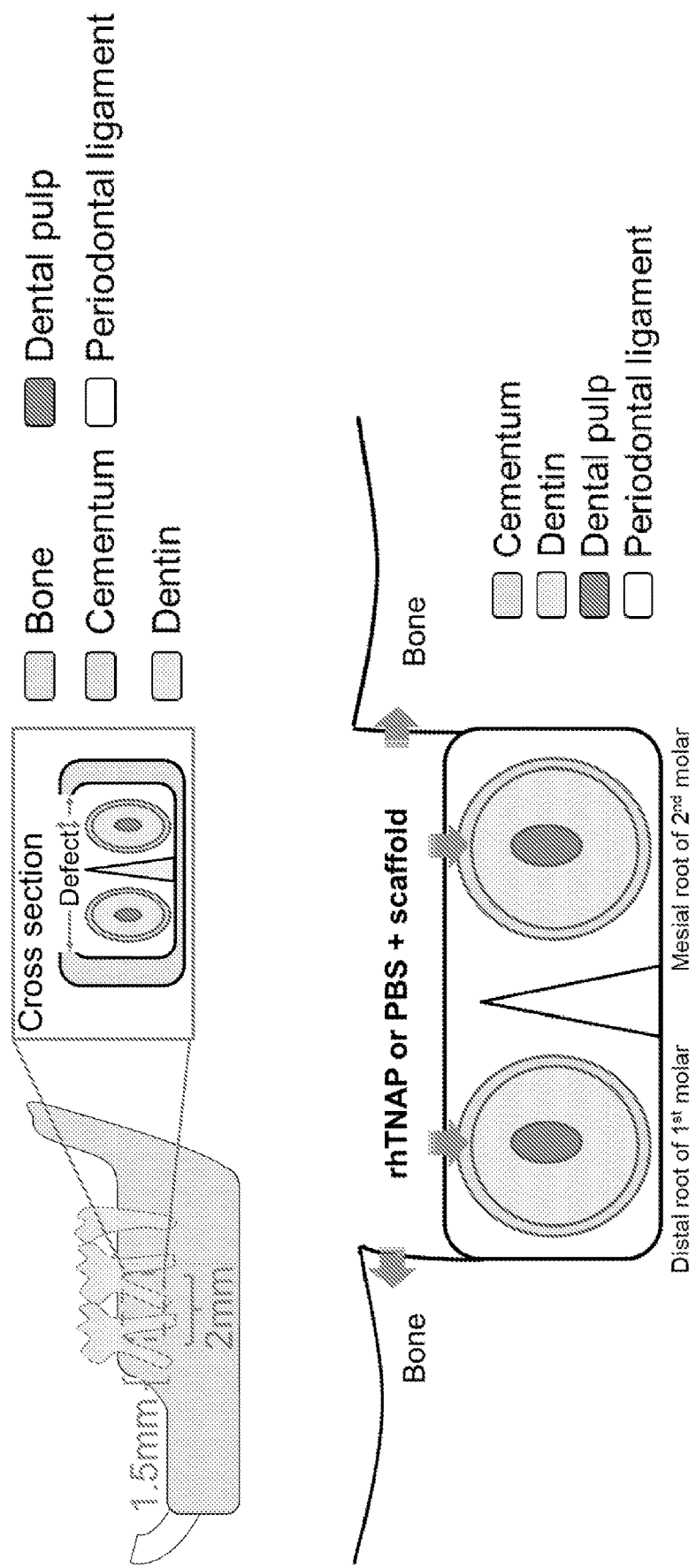
FIG. 6. Periodontal fenestration defects (approximately 2×1.5×0.5 mm) were created by removal of alveolar bone on the buccal aspect of the distal root of mandibular first molar and mesial root of the second mandibular molar. Local delivery included collagen scaffolds with 0.1 g (in 1 l) recombinant human tissue-nonspecific alkaline phosphatase (rhTNAP) or 1 µl phosphate-buffered saline (PBS) vehicle.

Local Recombinant Human TNAP Delivery: For local delivery of rhTNAP (0.1 g in 1 l) (R&D Systems, Minneapolis, MN), a mouse fenestration defect model modified from previous reports was performed on 5-week-old WT and $Ibsp^{-/-}$ mice (n=6/genotype) (FIG. 6) (King et al. 1997, J Dent Res. 76(8):1460-1470; Rodrigues et al. 2011, J Periodontol. 82(12):1757-1766). PBS (1 l) was used as negative control (n=6/group). Prior to surgery, mice were anesthetized by intraperitoneal administration of 100 mg/kg ketamine and 7 mg/kg xylazine. Skin incisions were made around the buccal side of left mandibles. After securing the field of view using an operating microscope over the surgical site, periodontal fenestration bone defects, (approximately 2×1.5×0.5 mm), were created on the buccal aspect of mandibular bone around the distal root of the first molar and mesial root of the second molar. Type I collagen scaffolds (Zimmer Collagen Patch Absorbable Wound Dressing, Collagen Matrix Inc., Oakland, NJ) were used to deliver rhTNAP or PBS. Tissues were repositioned and sutured using 4-0 Coated VICRYL (Polyglactin 910; Ethicon Inc., Somerville, NJ). Buprenorphine (0.05 mg/20 g) was given just before or after surgery for pain control. Mice were euthanized on postoperative day (POD) 45.

Blood Biochemistry: To measure plasma alkaline phosphatase activity (ALP), blood was collected at 30 and 60 dpn (n=3) for systemic $TNAP-D_{10}$ experiments and at POD 45 (n=6) for local delivery of rhTNAP experiments. From mice enrolled in systemic delivery experiments, blood was collected from the retro-orbital sinus at 30 dpn and mice were euthanized by cervical dislocation, then blood was collected by cardiac puncture in lithium heparin gel tubes (Becton, Dickinson and Company, Franklin Lakes, NJ). Plasma samples were maintained at room temperature for 30 minutes, then centrifuged at 10,000×g for 30 minutes at 4° C. Plasma samples were stored at −80° C. until ALP measurements were performed.

Micro-computed Tomography (microCT): To measure volume and density of regenerated bone, microCT analysis was performed using a modification of a previously described approach (Ao et al. 2017). Formalin fixed hemimandibles were scanned in 70% ethanol in a μCT 50 (Scanco Medical, Bassersdorf, Switzerland) at 70 kVp, 85 μA, 0.5 mm A1 filter, 900 ms integration time, and 6 μm voxel dimension. DICOM files were created from scans and uploaded to AnalyzePro 1.0 (AnalyzeDirect, Overland Park, KS). A standard curved was determined using 5 hydroxyapatite (HA) standards of known densities (mg $HA/cm^3$). To measure regenerated bone, a region of interest was created beginning at the center between the mesial and distal roots of first molars and extending 200 slices mesially and distally (1,200 μm) and 175 slices (1050 μm) coronally from the root apex.

Histology: Tissues were decalcified in an acetic acid/ formalin/sodium chloride (AFS) solution, and paraffin embedded for 5 μm sections (Ao et al. 2017). Hematoxylin and eosin (H&E) staining, immunohistochemistry (IHC), picrosirius red staining and histomorphometry were performed. Mandibles were fixed in 10% neutral buffered formalin for 48 hours at room temperature and then placed in 70% ethanol for storage. After microCT scanning, samples were demineralized in AFS (acetic acid, formaldehyde, sodium chloride) for 4 weeks, as described previously (Ao et al. 2017, Bone. 105:134-147). After decalcification, samples were washed twice with 70% ethanol and embedded in paraffin for serial sectioning at 5 m thickness. In $TNAP-D_{10}$ developmental experiments, the mandible was sectioned coronally. In local delivery of rhTNAP experiments, the mandible was sectioned axially. Because the defect for local delivery of rhTNAP was limited in size, approximately 20 serial sections were prepared from each sample. To standardize, the same axial level slide was used for each staining. H&E staining was performed for morphological analysis. Acellular cementum thickness was measured at 100 m apical from the cementoenamel junction (CEJ) on buccal and lingual sides in $TNAP-D_{10}$ developmental experiments and the cementum thickness at the same axial level was measured in the local delivery of rhTNAP experiments using NDP.view2 Viewing software (Hamamatsu Photonics K.K., Hamamatsu, Shizuoka, Japan). Immunohistochemistry (IHC) was performed using an avidin-biotinylated peroxidase (ABC) based kit (Vectastain Elite, Vector Labs, Burlingame, CA) with a 3-amino-9-ethylcarbazole (AEC) substrate to produce a red-brown product as previously described (Ao et al. 2017). Primary antibodies included rabbit polyclonal LF-175 rabbit anti-mouse osteopontin (OPN; Kerafast, Inc., Boston, MA)

diluted at 1:200, rabbit polyclonal M176 anti-dentin matrix protein 1 (DMP1; TakaRa Bio Inc, Kusatsu, Shiga, Japan), diluted at 1:600, and goat polyclonal ab31303 anti-asporin (ASPN; Abcam Inc., Cambridge, MA) diluted at 1:50. Negative controls included slides processed through the same protocol except lacking primary antibody addition. To analyze periodontal ligament (PDL), picrosirius red staining (Polysciences, Inc, Warrington, PA) was performed following manufacturer's directions.

Cell Culture: Ibsp$^{-/-}$ OCCM.30 immortalized murine cementoblasts were engineered using CRISPR/Cas9 (Ao et al. 2017, Bone. 105:134-147). WT parent cells served as normal control. Ibsp and WT cells were maintained in Dulbecco's modified Eagle's medium (DMEM; Life Technologies Corporation, Gland Island, NY) with 10% fetal bovine serum (FBS; Hyclone laboratories, South Logan, UT), 2 mM L-glutamine (Life Technologies Corporation), 100 U/ml penicillin (Life Technologies Corporation), and 100 g/ml streptomycin (Life Technologies Corporation). For all in vitro experiments, cells were seeded at $4 \times 10^4$ cells/ml in growth media with 2.5 ml/well in 6-well cell culture dishes or 0.5 ml/well in 24-well cell culture dishes. After 24 hours, media were changed to mineralization media, consisting of DMEM with 2% FBS, 50 g/ml ascorbic acid (AA; Sigma-Aldrich Inc) and 10 mM β-glycerophosphate (BGP; Sigma-Aldrich Inc) (Osathanon et al. 2009), as well as 2 mM L-glutamine, 100 U/ml penicillin, and 100 g/ml streptomycin.

To increase ALP levels in vitro, bovine intestinal alkaline phosphatase (bIAP) was used (Sigma-Aldrich Inc) (Osathanon et al. 2009, Biomaterials. 30(27):4513-4521). bIAP is a TNAP analog encoded by the gene AlpI and differs from TNAP in substrate specificity, though it has been shown to hydrolyze $PP_i$ and BGP (Manes et al. 1998, J Biol Chem. 273(36):23353-23360; Millan 2006, Purinergic Signal. 2(2):335-341; Weissig et al. 1993, Biochem J. 290 (Pt 2):503-508). bIAP was used in cell culture experiments because large quantities of enzyme were required, and cost became a factor in the experimental design. bIAP (100 g/ml) was added when maintenance media were changed to mineralization media.

Phosphonoformic acid (PFA; Sigma-Aldrich Inc) was used to inhibit sodium-phosphate co-transport (Foster et al. 2012, PLoS One. 7(6):e38393). PFA, a non-specific low affinity competitive inhibitor of type II sodium-$P_i$ co-transporters, was used to study how $P_i$ import affects signaling and mineralization, in vitro (Addison et al. 2007, J Biol Chem. 282(21):15872-15883; Foster et al. 2006, Calcif Tissue Int. 78(2):103-112). The concentration 0.1 mM of PFA was used to reduce potential direct effects on mineral nodule formation that have been described (Villa-Bellosta et al. 2009, Am J Physiol Renal Physiol. 296(4):F691-699). 0.1 mM was tested and determined it to be nontoxic for OCCM.30 cells. Twenty-four hours after plating, cells were pretreated with PFA or untreated for 2 hours, then treated with BGP+/−bIAP for 48 hours.

Media $P_i$ levels were analyzed following manufacturer's directions (Sigma-Aldrich Inc). Mineralization was measured by alizarin red stain (EMS, Hatfield, PA) as previously described (Foster et al. 2012, PLoS One. 7(6):e38393).

Inorganic Phosphate ($P_i$) Measurement: To measure the concentration of $P_i$ in cell culture media, cells were cultured as mentioned above and media were collected after 24 hours. Cell culture media at confluence were analyzed for $P_i$ using a phosphate assay kit according to manufacturer's directions (Sigma-Aldrich Inc). $P_i$ levels in the media were measured at 620 nm using a plate reader and calculated using a standard curve included with the test kit.

Alizarin Red Staining: To analyze in vitro mineral nodule formation, cells exposed to mineralization media for 2, 4, or 6 days were assayed as previously described (Foster et al. 2012, PLoS One. 7(6):e38393). Briefly, alizarin red stain (Electron Microscopy Sciences, Hatfield, PA) bound to mineral deposits was eluted by cetylpyridinium chloride and measured using a plate reader set at the wavelength 490 nm.

Quantitative polymerase chain reaction (qPCR): Total RNA was extracted from cells using MagMAX mirVava Total RNA Isolation Kit (Thermo Fisher Scientific Baltics UAB, Vilnius, Lithuania) and quantified using standard spectrophotometric methods. Complimentary DNA (cDNA) was synthetized from 250 μg of total RNA with Transcriptor First Strand cDNA Synthesis kit (Roche Diagnostics, Indianapolis, IN). Gapdh was used as an internal control for normalization. Primer sequences for qPCR are listed in Table 1. Amplification by SYBR Green I Master kit for qPCR (Roche Diagnostics, Indianapolis, IN) was performed in a LightCycler 480 thermal cycler.

TABLE 1

Primer sequences for qPCR analysis of expression in mouse OCCM.30 cementoblasts.

| | | | SEQ ID NO: |
|---|---|---|---|
| Gapdh | Forward primer | ACCACAGTCCATGCCATCAC | 8 |
|  | Reverse primer | TCCACCACCCTGTTGCTGTA | 9 |
| Spp1 | Forward primer | TTTACAGCCTGCACCC | 10 |
|  | Reverse primer | CTAGCAGTGACGGTCT | 11 |
| Dmp1 | Forward primer | GCGCGGATAAGGATGA | 12 |
|  | Reverse primer | GTCCCCGTGGCTACTC | 13 |
| Aspn | Forward primer | ACAGGGTGGATAAATTCTACTTTGA | 14 |
|  | Reverse primer | GCCTGTGTACAAGTCCAACCT | 15 |
| Alpl | Forward primer | GGGGACATGCAGTATGAGTT | 16 |
|  | Reverse primer | GGCCTGGTAGTTGTTGTGAG | 17 |

Statistical analysis: Results are reported as mean±standard deviation. Data were analyzed (Prism 7; GraphPad Software, La Jolla, CA) by independent samples t-test where p<0.05 (*), p<0.01 (), or p<0.001(*) indicate significance, or by one-way ANOVA with post-hoc Tukey test where experimental groups marked by different letters are significantly different (p<0.05) and groups sharing the same letter are not different (p>0.05).

Example 2

Systemic TNAP-D$_{10}$ Delivery Improves Periodontal Development in Ibsp$^{-/-}$ Mice To determine whether systemic delivery of TNAP could overcome developmental cementum defects in Ibsp$^{-/-}$ mice, 5 days postnatal mice (5 dpn; prior to molar root formation), were injected intramuscularly with lentivirus encoding mineral-targeted TNAP-D$_{10}$. TNAP-D$_{10}$ treatment increased plasma ALP nearly 5-fold vs. PBS-treated WT and Ibsp$^{-/-}$ mice at 30 dpn, with return to normal levels by 60 dpn (FIG. 1A).

Cementum and PDL were evaluated by histology. At 60 dpn, TNAP-D$_{10}$ increased both buccal and lingual cementum thickness vs. PBS-treated Ibsp$^{-/-}$ mice (3-fold and 2-fold, respectively), though cementum thickness remained 20-40% reduced compared to WT (FIG. 1B). By H&E stain, PBS-treated Ibsp$^{-/-}$ mice exhibited detached and disorganized PDL, whereas TNAP-D$_{10}$ treatment reestablished PDL attachment and organization comparable to untreated control WT mice (FIG. 1C). The restored cementum was characterized by immunostaining for mineralization markers, osteopontin (OPN) and dentin matrix protein-1 (DMP1). PBS-treated Ibsp$^{-/-}$ mice lacked clear OPN localization indicative of acellular cementum on the root surface, unlike WT controls (FIG. 1D). TNAP-D$_{10}$ increased OPN deposition on Ibsp$^{-/-}$ mouse root surfaces. In contrast to minimal DMP1 expression in cementum of PBS-treated Ibsp$^{-/-}$ and untreated control WT mice, TNAP-D$_{10}$ increased DMP1 expression along the root surface (FIG. 1E). Asporin (Aspn/ASPN), a negative regulator of mineralization (Kajikawa et al. 2014, J Dent Res. 93(4):400-405; Yamada et al. 2007, J Biol Chem. 282(32):23070-23080), was increased in PDL of Ibsp$^{-/-}$ vs. untreated control WT mice (FIG. 1F), as indicated previously by qPCR (Ao et al. 2017, Bone. 105:134-147). TNAP-D$_{10}$ treatment reduced ASPN in Ibsp$^{-/-}$ mice to levels approaching normal. Picrosirius red staining revealed that TNAP-D$_{10}$ induced PDL attachment in Ibsp$^{-/-}$ mice, which was comparable to untreated control WT mice (FIG. 1G).

Figure 2A:
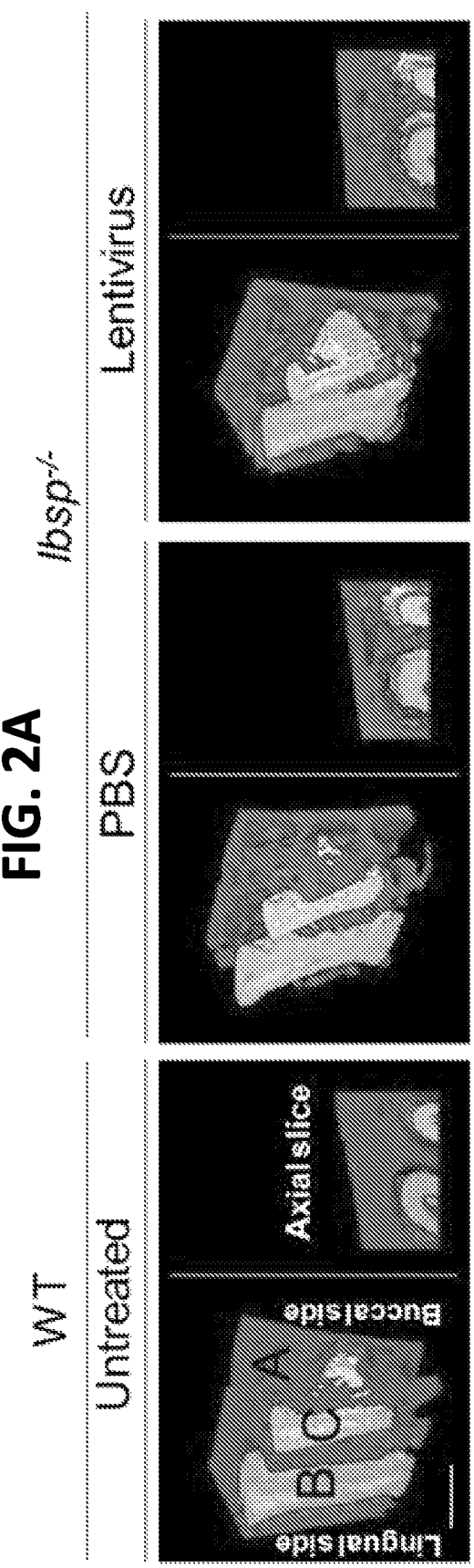
FIGS. 2A-2F. Increased Alveolar Bone Volume in Ibsp$^{-/-}$ Mice from Systemic Delivery of TNAP-$D_{10}$. Mice at 5 dpn were injected intramuscularly injected with TNAP-$D_{10}$ lentiviral vector or PBS vehicle and evaluated at 60 dpn. (A) 3D microCT renderings of first mandibular molar distal (B) and second molar mesial (C) roots and surrounding alveolar bone (A). Scale bar: 500 μm. (B) TNAP-$D_{10}$ significantly increases alveolar bone volume by 20% in Ibsp$^{-/-}$ mice, (C) though alveolar bone density was not altered (n=3 mice; * p<0.05 by t-test). (D) H&E staining reveals improved AB formation in TNAP-$D_{10}$ vs. untreated Ibsp$^{-/-}$ mice. (E) IHC indicates increased OPN in AB of Ibsp$^{-/-}$ vs. WT mice, with additional increase associated with TNAP-$D_{10}$ treatment. (F) TNAP-$D_{10}$ restores normal distribution of DMP1 in AB of Ibsp$^{-/-}$ mice. Scale bar: 25 μm.
Figure 2C:
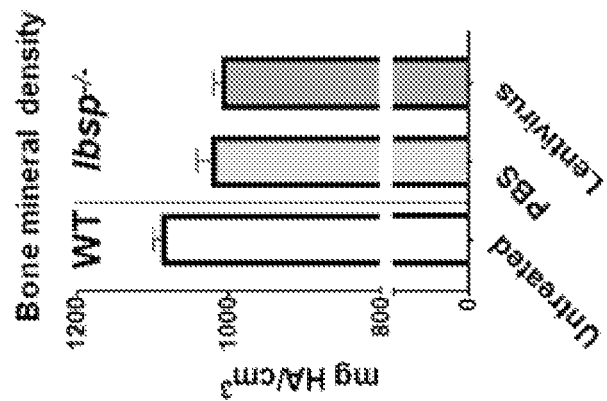
Figure 2B:
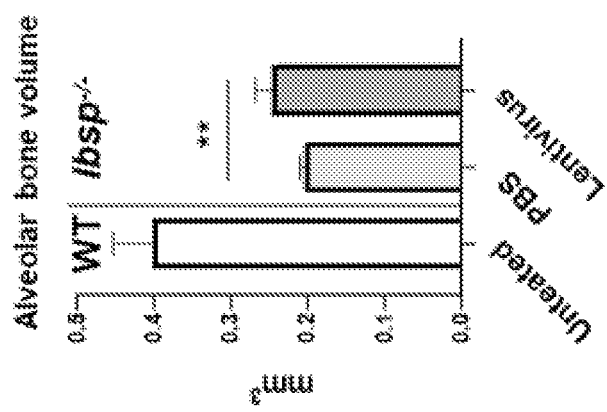
Figure 2D:
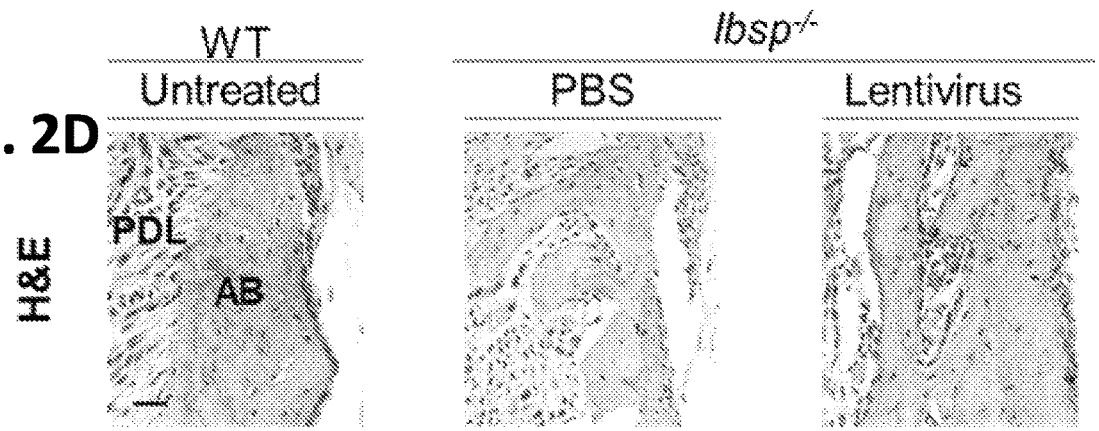
Figure 2E:
Figure 2F:
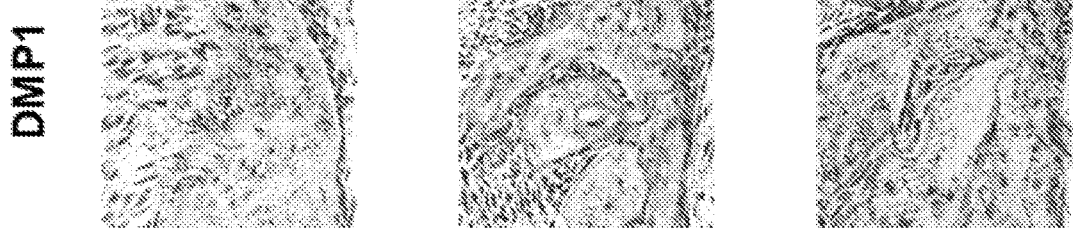

Alveolar bone was evaluated by microCT and histology. Alveolar bone volume increased 20% in TNAP-D$_{10}$ treated vs. untreated Ibsp$^{-/-}$ mice, though volumes remained reduced vs. untreated control WT levels (FIGS. 2A-C). Treatment did not significantly alter Ibsp$^{-/-}$ mouse alveolar bone density, which remained decreased vs. control WT. IHC revealed increased OPN staining in Ibsp$^{-/-}$ vs. untreated control WT alveolar bone, with TNAP-D$_{10}$ further increasing OPN deposition in Ibsp$^{-/-}$ mice (FIG. 2E). TNAP-D$_{10}$ also increased DMP1 expression in alveolar bone of Ibsp$^{-/-}$ mice, restoring levels to those comparable with WT mice (FIG. 2F).

Example 3

Figure 3A:
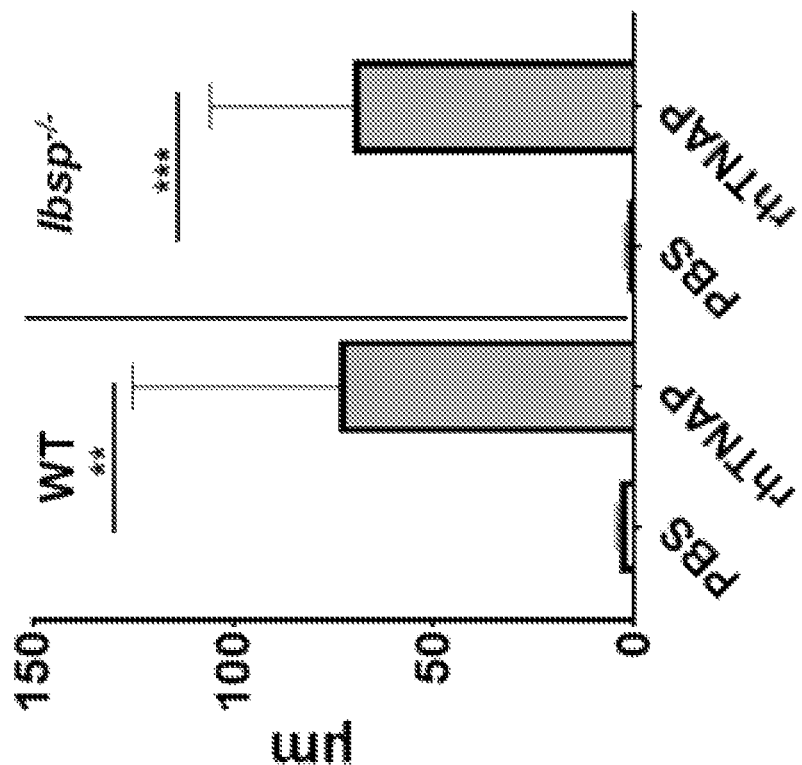

Local Delivery of rhTNAP Promotes Cementum and Alveolar Bone Regeneration in Ibsp$^{-/-}$ Mice Since systemic delivery of TNAP-D$_{10}$ restored cementogenesis and periodontal function in Ibsp$^{-/-}$ mice, confirming that pharmacologic modulation of P$_i$/PP$_i$ can overcome inherent mineralization defects, the efficacy of local rhTNAP delivery was determined; this is a more translational approach close to the clinical scenario for treatment of periodontal disease. Fenestration defects were created in 5-week-old mice. The 45 days postoperative (POD45) recovery period was uneventful, with no overt signs of inflammation or infection. Local delivery of rhTNAP did not affect plasma ALP levels (FIG. 3A).

Figure 3B:
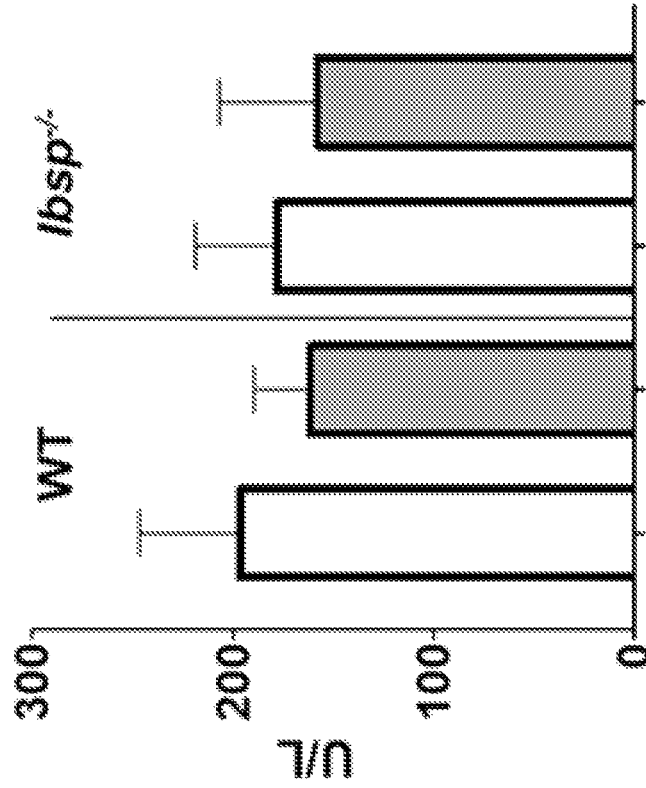
Figure 7:
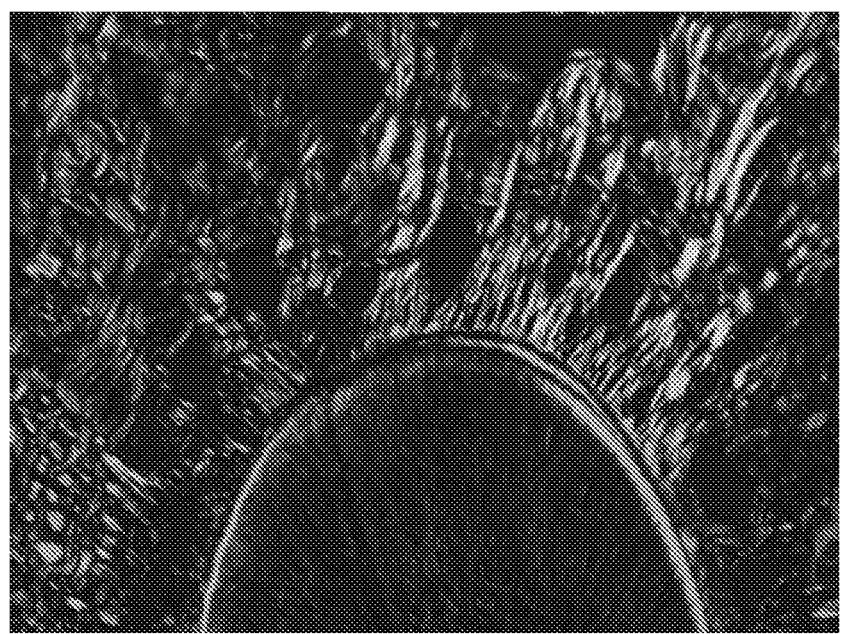
FIG. 7. Picrosirius Red Staining of Untreated Mandibular Periodontal Tissue (Distal Root of 1st Molar) in WT Mice. PDL attachment was observed clearly in untreated periodontal tissue of WT mice (11 weeks old as same age as surgical models). Scale bar: 200 µm.

Cementum and PDL were evaluated by histology. rhTNAP treatment increased cementum thickness in WT mice and promoted formation of a cementum-like layer on the root surfaces of Ibsp$^{-/-}$ -mice (21-fold and 42-fold, respectively), with mineralized matrix extending into the PDL space, though tooth-bone ankylosis was not observed (FIGS. 3B, C). rhTNAP improved PDL attachment and organization compared to PBS treated Ibsp$^{-/-}$ mice (FIG. 3C). Both OPN and DMP1 localization increased in response to rhTNAP treatment in Ibsp$^{-/-}$ mice, though treatment differences were not apparent in WT mice, suggesting more active cementogenesis in tissues with compromised cementum, e.g., Ibsp$^{-/-}$ mice (FIG. 3D, E). ASPN localization in PDL appeared less intense in Ibsp$^{-/-}$ mice treated with rhTNAP vs. vehicle controls (FIG. 3F). As well as TNAP-D$_{10}$, local delivery of rhTNAP induced PDL attachment in Ibsp$^{-/-}$ mice, confirmed by picrosirius red staining (FIG. 3G). However, PDL attachment/insertion into cementum in PBS and rhTNAP treated WT mice was not clear as untreated WT mice (FIG. 7), suggesting PDL regeneration occurs later than cementum regeneration.

Figure 4C:
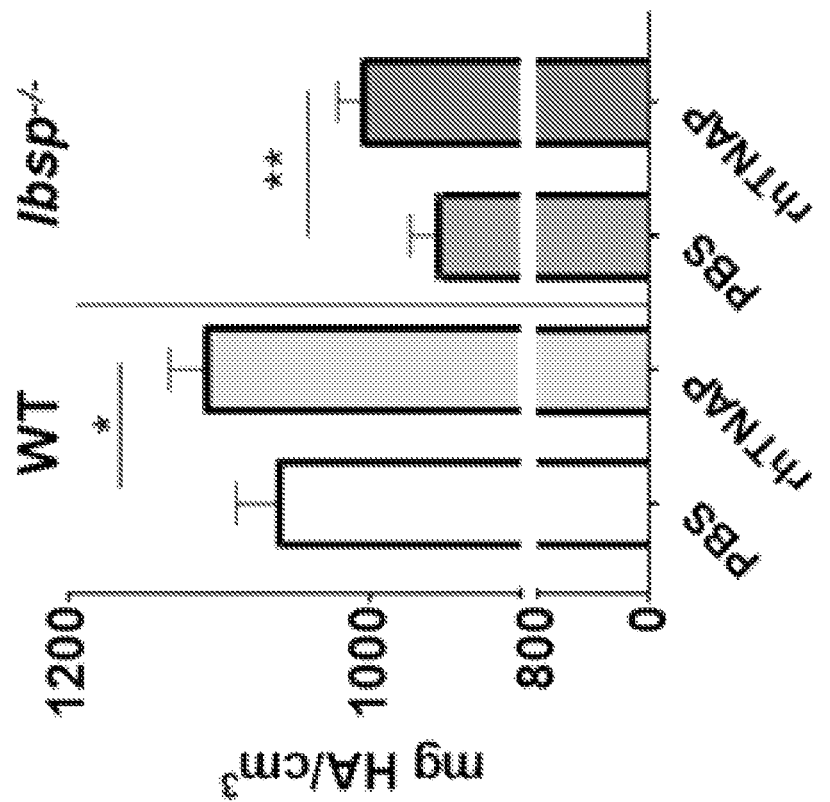
Figure 4B:
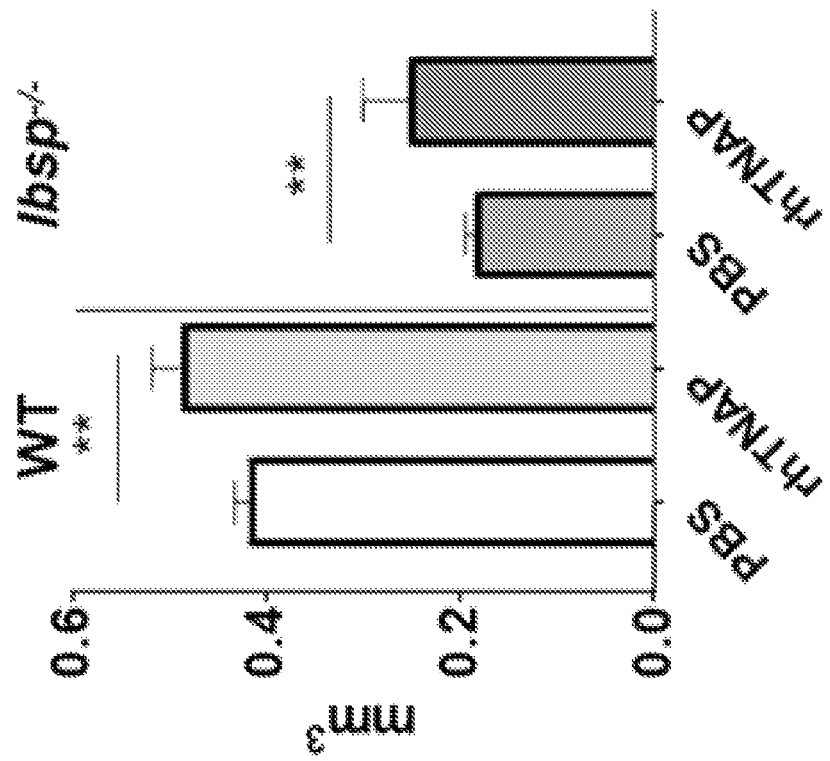

Alveolar bone was evaluated by microCT and histology. rhTNAP significantly increased alveolar bone volume and density in both WT (17% and 5%, respectively) and Ibsp$^{-/-}$ mice (37% and 5%, respectively) (FIGS. 4A-4C). Local rhTNAP delivery increased expression of OPN and DMP1 in regenerated alveolar bone of both WT and Ibsp$^{-/-}$ mice (FIGS. 4D, 4E).

Example 4 bIAP Increases Mineralization in Cementoblasts

To further define the mechanistic aspects of TNAP-mediated periodontal regeneration, Ibsp OCCM.30 immortalized murine cementoblasts were used that exhibit reduced mineral formation vs. WT cells (Ao et al. 2017, Bone. 105:134-147). Alpl expression was 80% reduced in Ibsp$^{-/-}$ vs. WT cells at day 1 ($p<0.01$; FIG. 5A). Compared to media from WT controls, Ibsp$^{-/-}$ cells exhibited 40% reduced P$_i$ levels. Addition of 100 g/ml bIAP increased P$_i$ levels in both WT and Ibsp$^{-/-}$ cell media about 2-3 fold ($p<0.01$) (FIG. 5B). Compared to WT cells, Ibsp$^{-/-}$ cells showed less mineralization. Addition of bIAP increased mineralization in both WT and Ibsp$^{-/-}$ cells, however, mineral deposited by bIAP-treated Ibsp lagged that of treated WT cells by day 6 ($p<0.01$) (FIG. 5C).

Figure 5E:
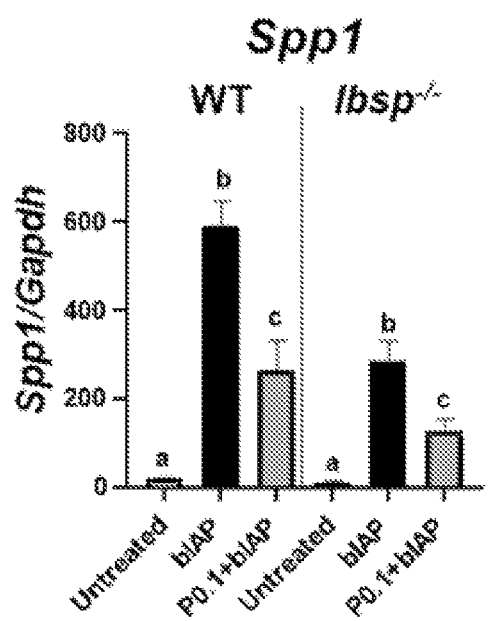
Figure 5F:
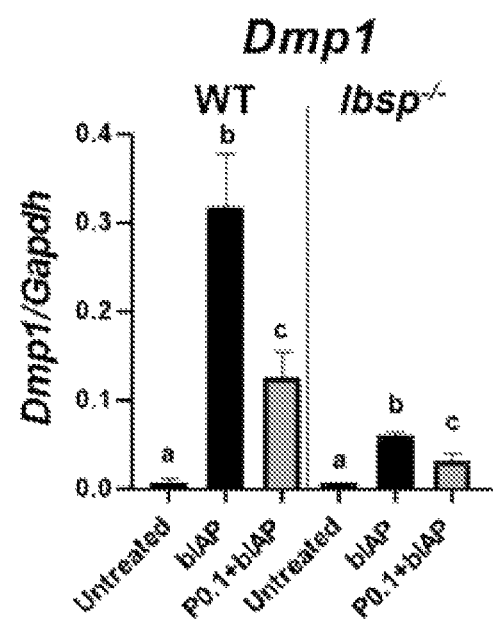
Figure 5G:
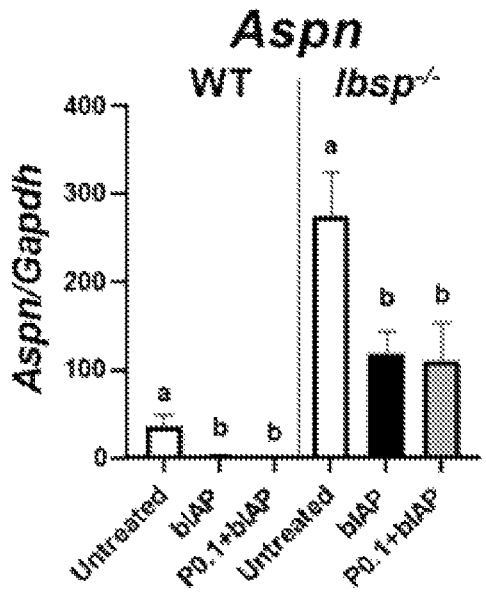
Figure 5H:
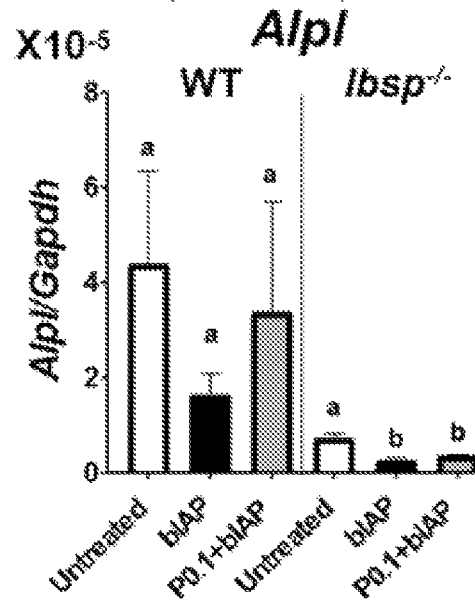
Figure 8:
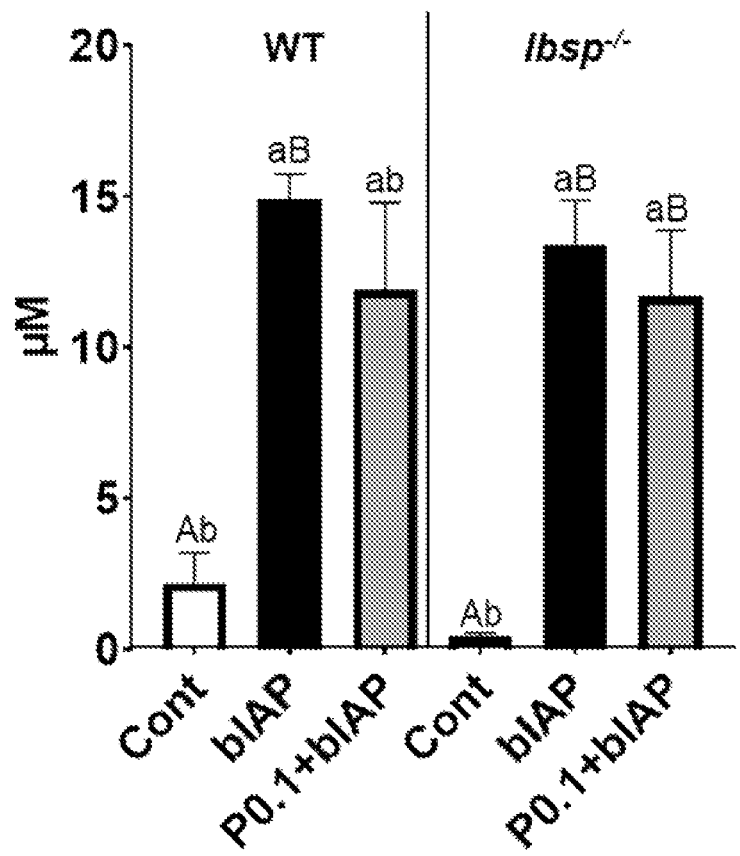
FIG. 8. PFA Did Not Affect bIAP-induced Media P$_i$ Concentrations in WT or Ibsp$^{-/-}$ Cementoblasts. P$_i$ levels were tested on day 1. Media from untreated Ibsp$^{-/-}$ cells exhibit 80% lower P$_i$ levels than untreated WT cells. Addition of 100 g/ml bovine intestinal ALP (bIAP) increases P$_i$ levels in both WT and Ibsp$^{-/-}$ cell media (14-fold and 43-fold, respectively), as noted in FIG. 5A. The increase in P$_i$ levels from bIAP is unaffected by addition of 0.1 mM phosphonoformic acid (PFA; indicated by P in the graph) in both WT and Ibsp$^{-/-}$ cells (n=4 wells/treatment). Experimental groups marked by differently cased letters are significantly different (p<0.0001, by one-way ANOVA), while groups sharing the same letter case are not different (p>0.05). Results were reproduced in 3 independent experiments.

In addition to contributing to HA crystal growth, P$_i$ acts as a signaling factor for many cells, including cementoblasts (Beck et al. 2000, Proc Natl Acad Sci USA. 97(15):8352-8357; Chaudhary et al. 2016, Matrix Biol. 52-54:284-300; Rutherford et al. 2006, J Dent Res. 85(6):505-509). Based on increased media P$_i$ concentrations from bIAP treatment, it was tested whether inhibiting P$_i$ transport into cells would impair positive effects on mineralization. PFA, a non-specific low affinity competitive inhibitor of type II sodium-P$_i$ co-transporters, was employed (Addison et al. 2007, J Biol Chem. 282(21):15872-15883; Foster et al. 2006, Calcif Tissue Int. 78(2):103-112). A relatively low concentration of 0.1 mM PFA was used to reduce potential direct effects of altered P$_i$ on mineral nodule formation as described previously (Villa-Bellosta et al. 2009, Am J Physiol Renal Physiol. 296(4):F691-699). Addition of PFA inhibited bIAP-induced increase in mineral nodule formation in both WT and Ibsp$^{-/-}$ cells, though effects of PFA on Ibsp$^{-/-}$ cells were minimal and mineral deposition by WT and Ibsp$^{-/-}$ cells treated with bIAP and PFA were equivalent (FIG. 5D). In the presence of bIAP, Spp1 expression in both control and Ibsp$^{-/-}$ cells was increased by 29-fold and 26-fold, respectively ($p<0.0001$). PFA inhibited Spp1 expression in both WT and Ibsp$^{-/-}$ cells by 55% ($p<0.001$) (FIG. 5E). bIAP increased Dmp1 expression in both WT and Ibsp$^{-/-}$ cells by 42-fold and 10-fold compared to untreated cells ($p<0.0001$). Phosphate-induced Dmp1 expression in WT and Ibsp$^{-/-}$ cells was inhibited with PFA by 60% and 49%, respectively ($p<0.001$) (FIG. 5F). Aspn expression was increased in Ibsp cells vs. WT cells by 7-fold ($p<0.001$). bIAP decreased Aspn expression in both WT and Ibsp$^{-/-}$ cells by 97% and 57% ($p<0.01$), though P$_i$-induced downregulation of Aspn expression was not affected by PFA (FIG. 5G). Alpl expression in Ibsp$^{-/-}$ cells was significantly decreased with bIAP by 37% (p<0.0001) with a trend in WT cells. There was a trend of increased Alpl expression with PFA in WT and Ibsp$^{-/-}$ cells (FIG. 5H) though PFA did not affect bIAP induced media P$_i$ concentrations of both WT and Ibsp (FIG. 8). These results suggest that bIAP-induced mineralization by WT cells depends more on P$_i$ import (and potential signaling), while bIAP-induced mineralization in Ibsp$^{-/-}$ cells may be acting through both P$_i$ import as well as direct effects on mineralization processes.

The periodontium, particularly cementum, is sensitive to regulators of P$_i$/PP$_i$ metabolism (Chu et al. 2020, Bone. 136:115329; Thumbigere-Math et al. 2018, J Dent Res. 97(4):432-441; Zweifler et al. 2015, Int J Oral Sci. 7(1):27-41; Nagasaki et al. 2020, J Dent Res. In press). It was determined whether pharmacologic modulation of P$_i$/PP$_i$ through delivery of TNAP could promote cementogenesis using a novel Ibsp$^{-/-}$ mouse model of periodontal breakdown. Systemic delivery of TNAP-D$_{10}$ increased circulating plasma ALP levels and restored cementogenesis and periodontal function in Ibsp$^{-/-}$ mice, confirming that pharmacologic approaches to modulate P$_i$/PP$_i$ can overcome inherent periodontal defects in Ibsp$^{-/-}$ mice. Local delivery of rhTNAP in a periodontal fenestration defect model promoted increased cementum and bone regeneration and restored periodontal attachment in Ibsp$^{-/-}$ mice, confirming that increasing TNAP promotes periodontal regeneration. Importantly, rhTNAP also increased regenerated cementum thickness in WT mice, supporting this as a generalizable approach for periodontal regeneration. Increasing ALP via delivery of bIAP partially rescued mineralization defects in Ibsp$^{-/-}$ cementoblasts in vitro, and was implicated in direct effects on mineralization and on expression of ECM proteins.

Dental defects, including acellular cementum hypoplasia, periodontal disease, and premature loss of primary and secondary dentition, are common among individuals with HPP. These periodontal defects are phenocopied in mouse models of HPP (Foster et al. 2017, J Dent Res. 96(1):81-91; McKee et al. 2011, J Dent Res. 90(4):470-476; Zweifler et al. 2015, *Int J Oral Sci*. 7(1):27-41). Further evidence for the important role played by P$_i$ in the mineralization process are highlighted by inherited hypophosphatemic disorders. X-linked hypophosphatemia (XLH; OMIM #307800) is caused by inactivating mutations in PHEX and results in decreased serum P$_i$ levels, and skeletal and dental mineralization disorders including thin cementum, poorly mineralized alveolar bone, and a high prevalence of periodontal disease (Biosse Duplan et al. 2017, J Dent Res. 96(4):388-395).

Conversely, loss-of-function mutations in ENPP1 or ANKH result in decreased extracellular PP$_i$ levels and ectopic calcification in the disorders, generalized arterial calcification in infancy (GACI; OMIM #208000), and craniometaphyseal dysplasia (CMD; OMIM #123000), respectively. In mouse models of these disorders, acellular cementum is dramatically increased (Dutra et al. 2013, J Dent Res. 92(2):173-179; Foster et al. 2012, PLoS One. 7(6):e38393, Zweifler et al. 2015, Int J Oral Sci. 7(1):27-41), and similarly expanded acellular cementum results from GACI in humans (Thumbigere-Math et al. 2018, J Dent Res. 97(4):432-441). Confirming that PP$_i$ concentration is the primary driver of these outcomes, crossing Alpl$^{-/-}$ and Ank$^{-/-}$ mice resulted in correction of cementogenesis, with return of periodontal attachment and function (Chu et al. 2020, Bone. 136:115329). Collectively, these data support P$_i$/PP$_i$ regulation as an evolutionarily conserved mechanism controlling periodontal tissues. Correction of the P$_i$/PP$_i$ ratio by addition of P$_i$ improved mineralization in primary PDL and dental pulp cells, obtained from subjects with HPP (Rodrigues et al. 2012, J Periodontol. 83(5):653-663; Rodrigues et al; 2012, J Endod. 38(7):907-912). An FDA clinically approved mineral-targeted TNAP-D$_{10}$ molecule, designed to deliver enzymatic activity at the mineralization front, has been remarkably effective at correcting skeletal effects, dental development, and prolonging life in severe HPP (Bowden and Foster 2019, Adv Exp Med Biol. 1148: 279-322; Foster et al. 2012, PLoS One. 7(6):e38393; McKee et al. 2011, J Dent Res. 90(4):470-476; Millan 2006, Purinergic Signal. 2(2):335-341; Whyte 2016, Nat Rev Endocrinol. 12(4):233-246).

The data presented herein showed pharmacologic reduction of PP$_i$ levels was effective at promoting cementogenesis. Systemic delivery experiments using a TNAP-D$_{10}$ encoding lentiviral construct, shown to prolong survival and improved skeletal mineralization in Alpl mice demonstrated that TNAP-D$_{10}$ promoted cementogenesis, along with retention of periodontal attachment, and maintenance of alveolar bone in Ibsp$^{-/-}$ mice at an early postnatal age. This evidences that pharmacologic administration of TNAP can enhance cementogenesis in a mineralization deficiency caused by the absence of BSP.

The effects of local delivery of rhTNAP in a periodontal fenestration model is similar to the clinical scenario of periodontal disease. As disclosed herein, local delivery of rhTNAP significantly increased alveolar bone volume and mineral density, and promoted cementum regeneration on the root surface, PDL attachment, and increased ECM localization of mineralization markers, i.e., OPN and DMP1, in both Ibsp$^{-/-}$ and WT mice. Previous studies suggest that ASPN is an inhibitor of mineralization (Kajikawa et al. 2014, J Dent Res. 93(4):400-405; Yamada et al. 2007, J Biol Chem. 282(32):23070-23080) and was increased in PDL of Ibsp$^{-/-}$ mice (Ao et al. 2017, Bone. 105:134-147). ASPN localization was decreased in PDL of Ibsp$^{-/-}$ mice with local delivery of rhTNAP. Thus, local delivery of rhTNAP is a viable strategy to promote periodontal regeneration. The benefits of local delivery of recombinant protein include a finite pro-mineralization activity focused in local tissues and lower potential for side effects than systemic delivery. Both TNAP and its intestinal analog IAP have anti-inflammatory properties via detoxification of bacterial lipopolysaccharides, adding another potential additional therapeutic benefit.

Cell culture experiments confirmed in vivo outcomes, revealing that bIAP partially rescues mineralization deficiency in Ibsp$^{-/-}$ OCCM.30 cementoblasts. This is associated with increased P$_i$ and altered gene expression, consistent with data from in vivo experiments. Addition of PFA, a non-specific low affinity competitive inhibitor of type II sodium-P$_i$ co-transporters, inhibited bIAP-induced increase mineralization. Thus, without being bound by theory, the positive effect of TNAP in vivo may be in part related to its ability to increase local levels of P$_i$.

The multiple in vivo and in vitro approaches disclosed herein document that pharmacologic modulation of P$_i$/PP$_i$ metabolism, using TNAP, can overcome periodontal breakdown and accomplish regeneration and return to a functional periodontium.

In view of the many possible embodiments to which the principles of our invention may be applied, it should be recognized that illustrated embodiments are only examples of the invention and should not be considered a limitation on the scope of the invention. Rather, the scope of the invention is defined by the following claims. We therefore claim as our invention all that comes within the scope and spirit of these claims.

We claim:

1. A method of treating periodontal disease, or to preserve a tooth socket, in a subject, comprising:
   selecting a subject with periodontal disease, or in need of tooth socket preservation, wherein the subject does not have hypophosphatasia (HPP); and
   locally administering into the periodontium of the subject an effective amount of a recombinant tissue-nonspecific alkaline phosphatase (TNAP) polypeptide comprising SEQ ID NO: 1, or a nucleic acid molecule encoding the recombinant TNAP polypeptide,
   thereby treating the periodontal disease, or preserving the tooth socket in the subject.

2. The method of claim 1, wherein the recombinant TNAP polypeptide has a C-terminus and an N-terminus, and wherein the recombinant TNAP polypeptide further comprises 4-12 continuous aspartic acid residues at the C terminus or 4-12 continuous glutamic acid residues at the C terminus.

3. The method of claim 2, wherein the recombinant TNAP polypeptide comprises 6-8 continuous aspartic acid residues at the C terminus.

4. The method of claim 1, wherein the recombinant TNAP polypeptide does not comprise a repeat of aspartic acid residues at the C terminus.

5. The method of claim 1, wherein the recombinant TNAP polypeptide further comprises a signal sequence at the N-terminus.

6. The method of claim 5, wherein the signal sequence comprises SEQ ID NO: 2.

7. The method of claim 1, wherein the recombinant TNAP polypeptide further comprises a histidine tag polypeptide that comprises at least six histidine residues.

8. The method of claim 7, wherein the histidine tag polypeptide comprises SEQ ID NO: 3.

9. The method of claim 1, wherein the recombinant TNAP polypeptide comprises, in amino (N) to carboxy (C) terminal order, a signal sequence, a tag polypeptide, the amino acid sequence set forth as SEQ ID NO: 1, and 4-8 continuous aspartic acid residues.

10. The method of claim 9, wherein the recombinant TNAP polypeptide comprises 6-8 continuous aspartic acid residues.

11. The method of claim 10, wherein the recombinant TNAP polypeptide comprises SEQ ID NO: 4.

12. The method of claim 1, wherein the recombinant TNAP polypeptide comprises SEQ ID NO: 5.

13. The method of claim 1, wherein locally administering comprises injection into the periodontium.

14. The method of claim 1, comprising locally administering the recombinant TNAP polypeptide to the subject using a biocompatible scaffold.

15. The method of claim 1, wherein the recombinant TNAP polypeptide further comprises 10 continuous aspartic acid residues at the C terminus.

16. The method of claim 1, wherein the recombinant TNAP polypeptide comprises SEQ ID NO: 4 and further comprises 10 continuous aspartic acid residues at the C terminus.

17. The method of claim 1, wherein the subject has peri-implantitis.

18. A method of treating a subject, comprising
   locally administering into the periodontium of the subject an effective amount of a recombinant TNAP polypeptide comprising SEQ ID NO: 1, or nucleic acid molecule encoding the recombinant TNAP polypeptide, wherein the method i) promotes alveolar bone regeneration in the subject; ii) increases attachment of a periodontal ligament to a root surface of a tooth in the subject; iii) increases cementum formation; and/or iv) increases mineralization in a tooth in the subject, wherein the subject has a dental implant, peri-implantitis, sinus augmentation, or tooth loss due to a cementum defect, and wherein the subject does not have hypophosphatasia (HPP).

19. The method of claim 18, wherein the subject has the peri-implantitis.

20. The method of claim 18, wherein the subject has the dental implant.

* * * * *

SEQUENCE LISTING

<160> NUMBER OF SEQ ID NOS: 20

<210> SEQ ID NO 1
<211> LENGTH: 488
<212> TYPE: PRT
<213> ORGANISM: Homo sapiens

<400> SEQUENCE: 1

```
Leu Val Pro Glu Lys Glu Lys Asp Pro Lys Tyr Trp Arg Asp Gln Ala
1               5                   10                  15

Gln Glu Thr Leu Lys Tyr Ala Leu Glu Leu Gln Lys Leu Asn Thr Asn
            20                  25                  30

Val Ala Lys Asn Val Ile Met Phe Leu Gly Asp Gly Met Gly Val Ser
        35                  40                  45

Thr Val Thr Ala Ala Arg Ile Leu Lys Gly Gln Leu His His Asn Pro
50                  55                  60

Gly Glu Glu Thr Arg Leu Glu Met Asp Lys Phe Pro Phe Val Ala Leu
65                  70                  75                  80

Ser Lys Thr Tyr Asn Thr Asn Ala Gln Val Pro Asp Ser Ala Gly Thr
                85                  90                  95

Ala Thr Ala Tyr Leu Cys Gly Val Lys Ala Asn Glu Gly Thr Val Gly
            100                 105                 110

Val Ser Ala Ala Thr Glu Arg Ser Arg Cys Asn Thr Thr Gln Gly Asn
        115                 120                 125

Glu Val Thr Ser Ile Leu Arg Trp Ala Lys Asp Ala Gly Lys Ser Val
    130                 135                 140

Gly Ile Val Thr Thr Thr Arg Val Asn His Ala Thr Pro Ser Ala Ala
145                 150                 155                 160

Tyr Ala His Ser Ala Asp Arg Asp Trp Tyr Ser Asp Asn Glu Met Pro
                165                 170                 175

Pro Glu Ala Leu Ser Gln Gly Cys Lys Asp Ile Ala Tyr Gln Leu Met
            180                 185                 190

His Asn Ile Arg Asp Ile Asp Val Ile Met Gly Gly Gly Arg Lys Tyr
        195                 200                 205

Met Tyr Pro Lys Asn Lys Thr Asp Val Glu Tyr Glu Ser Asp Glu Lys
    210                 215                 220

Ala Arg Gly Thr Arg Leu Asp Gly Leu Asp Leu Val Asp Thr Trp Lys
225                 230                 235                 240

Ser Phe Lys Pro Arg Tyr Lys His Ser His Phe Ile Trp Asn Arg Thr
                245                 250                 255

Glu Leu Leu Thr Leu Asp Pro His Asn Val Asp Tyr Leu Leu Gly Leu
            260                 265                 270

Phe Glu Pro Gly Asp Met Gln Tyr Glu Leu Asn Arg Asn Asn Val Thr
        275                 280                 285

Asp Pro Ser Leu Ser Glu Met Val Val Ala Ile Gln Ile Leu Arg
    290                 295                 300

Lys Asn Pro Lys Gly Phe Phe Leu Leu Val Glu Gly Gly Arg Ile Asp
305                 310                 315                 320

His Gly His His Glu Gly Lys Ala Lys Gln Ala Leu His Glu Ala Val
                325                 330                 335

Glu Met Asp Arg Ala Ile Gly Gln Ala Gly Ser Leu Thr Ser Ser Glu
            340                 345                 350

Asp Thr Leu Thr Val Val Thr Ala Asp His Ser His Val Phe Thr Phe
        355                 360                 365
```

```
Gly Gly Tyr Thr Pro Arg Gly Asn Ser Ile Phe Gly Leu Ala Pro Met
        370                 375                 380

Leu Ser Asp Thr Asp Lys Lys Pro Phe Thr Ala Ile Leu Tyr Gly Asn
385                 390                 395                 400

Gly Pro Gly Tyr Lys Val Val Gly Gly Glu Arg Glu Asn Val Ser Met
                405                 410                 415

Val Asp Tyr Ala His Asn Asn Tyr Gln Ala Gln Ser Ala Val Pro Leu
            420                 425                 430

Arg His Glu Thr His Gly Gly Glu Asp Val Ala Val Phe Ser Lys Gly
        435                 440                 445

Pro Met Ala His Leu Leu His Gly Val His Glu Gln Asn Tyr Val Pro
        450                 455                 460

His Val Met Ala Tyr Ala Ala Cys Ile Gly Ala Asn Leu Gly His Cys
465                 470                 475                 480

Ala Pro Ala Ser Ser Ala Gly Ser
                485

<210> SEQ ID NO 2
<211> LENGTH: 22
<212> TYPE: PRT
<213> ORGANISM: Artificial Sequence
<220> FEATURE:
<223> OTHER INFORMATION: Signal sequence

<400> SEQUENCE: 2

Met Arg Gly Pro Ala Val Leu Leu Thr Val Ala Leu Ala Thr Leu Leu
1               5                   10                  15

Ala Pro Gly Ala Gly Ala
            20

<210> SEQ ID NO 3
<211> LENGTH: 18
<212> TYPE: PRT
<213> ORGANISM: Artificial Sequence
<220> FEATURE:
<223> OTHER INFORMATION: Histidine tag

<400> SEQUENCE: 3

His His His His His His His His His Glu Asn Leu Tyr Phe Gln
1               5                   10                  15

Gly Met

<210> SEQ ID NO 4
<211> LENGTH: 534
<212> TYPE: PRT
<213> ORGANISM: Artificial Sequence
<220> FEATURE:
<223> OTHER INFORMATION: Recombinant TNAP polypeptide

<400> SEQUENCE: 4

Met Arg Gly Pro Ala Val Leu Leu Thr Val Ala Leu Ala Thr Leu Leu
1               5                   10                  15

Ala Pro Gly Ala Gly Ala His His His His His His His His His
            20                  25                  30

Glu Asn Leu Tyr Phe Gln Gly Met Leu Val Pro Glu Lys Glu Lys Asp
        35                  40                  45

Pro Lys Tyr Trp Arg Asp Gln Ala Gln Glu Thr Leu Lys Tyr Ala Leu
    50                  55                  60

Glu Leu Gln Lys Leu Asn Thr Asn Val Ala Lys Asn Val Ile Met Phe
65                  70                  75                  80
```

-continued

Leu Gly Asp Gly Met Gly Val Ser Thr Val Thr Ala Ala Arg Ile Leu
                85                  90                  95

Lys Gly Gln Leu His His Asn Pro Gly Glu Thr Arg Leu Glu Met
            100                 105                 110

Asp Lys Phe Pro Phe Val Ala Leu Ser Lys Thr Tyr Asn Thr Asn Ala
            115                 120                 125

Gln Val Pro Asp Ser Ala Gly Thr Ala Thr Ala Tyr Leu Cys Gly Val
    130                 135                 140

Lys Ala Asn Glu Gly Thr Val Gly Val Ser Ala Ala Thr Glu Arg Ser
145                 150                 155                 160

Arg Cys Asn Thr Thr Gln Gly Asn Glu Val Thr Ser Ile Leu Arg Trp
                165                 170                 175

Ala Lys Asp Ala Gly Lys Ser Val Gly Ile Val Thr Thr Thr Arg Val
                180                 185                 190

Asn His Ala Thr Pro Ser Ala Ala Tyr Ala His Ser Ala Asp Arg Asp
                195                 200                 205

Trp Tyr Ser Asp Asn Glu Met Pro Pro Glu Ala Leu Ser Gln Gly Cys
        210                 215                 220

Lys Asp Ile Ala Tyr Gln Leu Met His Asn Ile Arg Asp Ile Asp Val
225                 230                 235                 240

Ile Met Gly Gly Gly Arg Lys Tyr Met Tyr Pro Lys Asn Lys Thr Asp
                245                 250                 255

Val Glu Tyr Glu Ser Asp Glu Lys Ala Arg Gly Thr Arg Leu Asp Gly
                260                 265                 270

Leu Asp Leu Val Asp Thr Trp Lys Ser Phe Lys Pro Arg Tyr Lys His
        275                 280                 285

Ser His Phe Ile Trp Asn Arg Thr Glu Leu Leu Thr Leu Asp Pro His
        290                 295                 300

Asn Val Asp Tyr Leu Leu Gly Leu Phe Glu Pro Gly Asp Met Gln Tyr
305                 310                 315                 320

Glu Leu Asn Arg Asn Asn Val Thr Asp Pro Ser Leu Ser Glu Met Val
                325                 330                 335

Val Val Ala Ile Gln Ile Leu Arg Lys Asn Pro Lys Gly Phe Phe Leu
                340                 345                 350

Leu Val Glu Gly Gly Arg Ile Asp His Gly His His Glu Gly Lys Ala
        355                 360                 365

Lys Gln Ala Leu His Glu Ala Val Glu Met Asp Arg Ala Ile Gly Gln
        370                 375                 380

Ala Gly Ser Leu Thr Ser Ser Glu Asp Thr Leu Thr Val Val Thr Ala
385                 390                 395                 400

Asp His Ser His Val Phe Thr Phe Gly Gly Tyr Thr Pro Arg Gly Asn
                405                 410                 415

Ser Ile Phe Gly Leu Ala Pro Met Leu Ser Asp Thr Asp Lys Lys Pro
            420                 425                 430

Phe Thr Ala Ile Leu Tyr Gly Asn Gly Pro Gly Tyr Lys Val Val Gly
                435                 440                 445

Gly Glu Arg Glu Asn Val Ser Met Val Asp Tyr Ala His Asn Asn Tyr
        450                 455                 460

Gln Ala Gln Ser Ala Val Pro Leu Arg His Glu Thr His Gly Gly Glu
465                 470                 475                 480

Asp Val Ala Val Phe Ser Lys Gly Pro Met Ala His Leu Leu His Gly
                485                 490                 495

```
Val His Glu Gln Asn Tyr Val Pro His Val Met Ala Tyr Ala Ala Cys
                500                 505                 510

Ile Gly Ala Asn Leu Gly His Cys Ala Pro Ser Ser Ala Gly Ser
        515                 520                 525

Asp Asp Asp Asp Asp Asp
        530

<210> SEQ ID NO 5
<211> LENGTH: 528
<212> TYPE: PRT
<213> ORGANISM: Artificial Sequence
<220> FEATURE:
<223> OTHER INFORMATION: Recombinant TNAP polypeptide

<400> SEQUENCE: 5

Met Arg Gly Pro Ala Val Leu Leu Thr Val Ala Leu Ala Thr Leu Leu
1               5                   10                  15

Ala Pro Gly Ala Gly Ala His His His His His His His His
            20                  25                  30

Glu Asn Leu Tyr Phe Gln Gly Met Leu Val Pro Glu Lys Glu Lys Asp
        35                  40                  45

Pro Lys Tyr Trp Arg Asp Gln Ala Gln Glu Thr Leu Lys Tyr Ala Leu
    50                  55                  60

Glu Leu Gln Lys Leu Asn Thr Asn Val Ala Lys Asn Val Ile Met Phe
65                  70                  75                  80

Leu Gly Asp Gly Met Gly Val Ser Thr Val Thr Ala Ala Arg Ile Leu
                85                  90                  95

Lys Gly Gln Leu His His Asn Pro Gly Glu Glu Thr Arg Leu Glu Met
            100                 105                 110

Asp Lys Phe Pro Phe Val Ala Leu Ser Lys Thr Tyr Asn Thr Asn Ala
        115                 120                 125

Gln Val Pro Asp Ser Ala Gly Thr Ala Thr Ala Tyr Leu Cys Gly Val
    130                 135                 140

Lys Ala Asn Glu Gly Thr Val Gly Val Ser Ala Ala Thr Glu Arg Ser
145                 150                 155                 160

Arg Cys Asn Thr Thr Gln Gly Asn Glu Val Thr Ser Ile Leu Arg Trp
                165                 170                 175

Ala Lys Asp Ala Gly Lys Ser Val Gly Ile Val Thr Thr Thr Arg Val
            180                 185                 190

Asn His Ala Thr Pro Ser Ala Ala Tyr Ala His Ser Ala Asp Arg Asp
        195                 200                 205

Trp Tyr Ser Asp Asn Glu Met Pro Pro Glu Ala Leu Ser Gln Gly Cys
    210                 215                 220

Lys Asp Ile Ala Tyr Gln Leu Met His Asn Ile Arg Asp Ile Asp Val
225                 230                 235                 240

Ile Met Gly Gly Gly Arg Lys Tyr Met Tyr Pro Lys Asn Lys Thr Asp
                245                 250                 255

Val Glu Tyr Glu Ser Asp Glu Lys Ala Arg Gly Thr Arg Leu Asp Gly
            260                 265                 270

Leu Asp Leu Val Asp Thr Trp Lys Ser Phe Lys Pro Arg Tyr Lys His
        275                 280                 285

Ser His Phe Ile Trp Asn Arg Thr Glu Leu Leu Thr Leu Asp Pro His
    290                 295                 300

Asn Val Asp Tyr Leu Leu Gly Leu Phe Glu Pro Gly Asp Met Gln Tyr
305                 310                 315                 320
```

-continued

```
Glu Leu Asn Arg Asn Asn Val Thr Asp Pro Ser Leu Ser Glu Met Val
            325                 330                 335

Val Val Ala Ile Gln Ile Leu Arg Lys Asn Pro Lys Gly Phe Phe Leu
        340                 345                 350

Leu Val Glu Gly Gly Arg Ile Asp His Gly His His Glu Gly Lys Ala
    355                 360                 365

Lys Gln Ala Leu His Glu Ala Val Glu Met Asp Arg Ala Ile Gly Gln
370                 375                 380

Ala Gly Ser Leu Thr Ser Ser Glu Asp Thr Leu Thr Val Val Thr Ala
385                 390                 395                 400

Asp His Ser His Val Phe Thr Phe Gly Gly Tyr Thr Pro Arg Gly Asn
                405                 410                 415

Ser Ile Phe Gly Leu Ala Pro Met Leu Ser Asp Thr Asp Lys Lys Pro
            420                 425                 430

Phe Thr Ala Ile Leu Tyr Gly Asn Gly Pro Gly Tyr Lys Val Val Gly
        435                 440                 445

Gly Glu Arg Glu Asn Val Ser Met Val Asp Tyr Ala His Asn Asn Tyr
    450                 455                 460

Gln Ala Gln Ser Ala Val Pro Leu Arg His Glu Thr His Gly Gly Glu
465                 470                 475                 480

Asp Val Ala Val Phe Ser Lys Gly Pro Met Ala His Leu Leu His Gly
                485                 490                 495

Val His Glu Gln Asn Tyr Val Pro His Val Met Ala Tyr Ala Ala Cys
            500                 505                 510

Ile Gly Ala Asn Leu Gly His Cys Ala Pro Ala Ser Ser Ala Gly Ser
        515                 520                 525

<210> SEQ ID NO 6
<211> LENGTH: 22
<212> TYPE: PRT
<213> ORGANISM: Artificial Sequence
<220> FEATURE:
<223> OTHER INFORMATION: Signal sequence

<400> SEQUENCE: 6

Met Asp Phe Gln Val Gln Ile Phe Ser Phe Leu Leu Ile Ser Ala Ser
1               5                   10                  15

Val Ile Met Ser Arg Gly
            20

<210> SEQ ID NO 7
<211> LENGTH: 22
<212> TYPE: PRT
<213> ORGANISM: Artificial Sequence
<220> FEATURE:
<223> OTHER INFORMATION: Signal peptide

<400> SEQUENCE: 7

Leu Leu Val Thr Ser Leu Leu Leu Cys Glu Leu Pro His Pro Ala Phe
1               5                   10                  15

Leu Leu Ile Pro Asp Thr
            20

<210> SEQ ID NO 8
<211> LENGTH: 20
<212> TYPE: DNA
<213> ORGANISM: Artificial Sequence
<220> FEATURE:
<223> OTHER INFORMATION: Primer
```

<400> SEQUENCE: 8
accacagtcc atgccatcac                                                      20

<210> SEQ ID NO 9
<211> LENGTH: 20
<212> TYPE: DNA
<213> ORGANISM: Artificial Sequence
<220> FEATURE:
<223> OTHER INFORMATION: Primer

<400> SEQUENCE: 9
tccaccaccc tgttgctgta                                                      20

<210> SEQ ID NO 10
<211> LENGTH: 16
<212> TYPE: DNA
<213> ORGANISM: Artificial Sequence
<220> FEATURE:
<223> OTHER INFORMATION: Primer

<400> SEQUENCE: 10
tttacagcct gcaccc                                                          16

<210> SEQ ID NO 11
<211> LENGTH: 16
<212> TYPE: DNA
<213> ORGANISM: Artificial Sequence
<220> FEATURE:
<223> OTHER INFORMATION: Primer

<400> SEQUENCE: 11
ctagcagtga cggtct                                                          16

<210> SEQ ID NO 12
<211> LENGTH: 16
<212> TYPE: DNA
<213> ORGANISM: Artificial Sequence
<220> FEATURE:
<223> OTHER INFORMATION: Primer

<400> SEQUENCE: 12
gcgcggataa ggatga                                                          16

<210> SEQ ID NO 13
<211> LENGTH: 16
<212> TYPE: DNA
<213> ORGANISM: Artificial Sequence
<220> FEATURE:
<223> OTHER INFORMATION: Primer

<400> SEQUENCE: 13
gtccccgtgg ctactc                                                          16

<210> SEQ ID NO 14
<211> LENGTH: 25
<212> TYPE: DNA
<213> ORGANISM: Artificial Sequence
<220> FEATURE:
<223> OTHER INFORMATION: Primer

<400> SEQUENCE: 14
acagggtgga taaattctac tttga                                                25

<210> SEQ ID NO 15
<211> LENGTH: 21

-continued

```
<212> TYPE: DNA
<213> ORGANISM: Artificial Sequence
<220> FEATURE:
<223> OTHER INFORMATION: Primer

<400> SEQUENCE: 15
gcctgtgtac aagtccaacc t                                              21

<210> SEQ ID NO 16
<211> LENGTH: 20
<212> TYPE: DNA
<213> ORGANISM: Artificial Sequence
<220> FEATURE:
<223> OTHER INFORMATION: Primer

<400> SEQUENCE: 16
ggggacatgc agtatgagtt                                                20

<210> SEQ ID NO 17
<211> LENGTH: 20
<212> TYPE: DNA
<213> ORGANISM: Artificial Sequence
<220> FEATURE:
<223> OTHER INFORMATION: Primer

<400> SEQUENCE: 17
ggcctggtag ttgttgtgag                                                20

<210> SEQ ID NO 18
<211> LENGTH: 516
<212> TYPE: PRT
<213> ORGANISM: Artificial Sequence
<220> FEATURE:
<223> OTHER INFORMATION: Recombinant TNAP polypeptide
<220> FEATURE:
<221> NAME/KEY: misc_feature
<222> LOCATION: (509)..(516)
<223> OTHER INFORMATION: D or no amino acid

<400> SEQUENCE: 18

Met His His His His His His Glu Asn Leu Tyr Phe Gln Gly Met Leu
1               5                   10                  15

Val Pro Glu Lys Glu Lys Asp Pro Lys Tyr Trp Arg Asp Gln Ala Gln
            20                  25                  30

Glu Thr Leu Lys Tyr Ala Leu Glu Leu Gln Lys Leu Asn Thr Asn Val
        35                  40                  45

Ala Lys Asn Val Ile Met Phe Leu Gly Asp Gly Met Gly Val Ser Thr
    50                  55                  60

Val Thr Ala Ala Arg Ile Leu Lys Gly Gln Leu His His Asn Pro Gly
65                  70                  75                  80

Glu Glu Thr Arg Leu Glu Met Asp Lys Phe Pro Phe Val Ala Leu Ser
                85                  90                  95

Lys Thr Tyr Asn Thr Asn Ala Gln Val Pro Asp Ser Ala Gly Thr Ala
            100                 105                 110

Thr Ala Tyr Leu Cys Gly Val Lys Ala Asn Glu Gly Thr Val Gly Val
        115                 120                 125

Ser Ala Ala Thr Glu Arg Ser Arg Cys Asn Thr Thr Gln Gly Asn Glu
    130                 135                 140

Val Thr Ser Ile Leu Arg Trp Ala Lys Asp Ala Gly Lys Ser Val Gly
145                 150                 155                 160

Ile Val Thr Thr Thr Arg Val Asn His Ala Thr Pro Ser Ala Ala Tyr
                165                 170                 175
```

Ala His Ser Ala Asp Arg Asp Trp Tyr Ser Asp Asn Glu Met Pro Pro
            180                 185                 190

Glu Ala Leu Ser Gln Gly Cys Lys Asp Ile Ala Tyr Gln Leu Met His
        195                 200                 205

Asn Ile Arg Asp Ile Asp Val Ile Met Gly Gly Gly Arg Lys Tyr Met
210                 215                 220

Tyr Pro Lys Asn Lys Thr Asp Val Glu Tyr Glu Ser Asp Glu Lys Ala
225                 230                 235                 240

Arg Gly Thr Arg Leu Asp Gly Leu Asp Leu Val Asp Thr Trp Lys Ser
                245                 250                 255

Phe Lys Pro Arg Tyr Lys His Ser His Phe Ile Trp Asn Arg Thr Glu
            260                 265                 270

Leu Leu Thr Leu Asp Pro His Asn Val Asp Tyr Leu Leu Gly Leu Phe
        275                 280                 285

Glu Pro Gly Asp Met Gln Tyr Glu Leu Asn Arg Asn Asn Val Thr Asp
290                 295                 300

Pro Ser Leu Ser Glu Met Val Val Ala Ile Gln Ile Leu Arg Lys
305                 310                 315                 320

Asn Pro Lys Gly Phe Phe Leu Leu Val Glu Gly Gly Arg Ile Asp His
                325                 330                 335

Gly His His Glu Gly Lys Ala Lys Gln Ala Leu His Glu Ala Val Glu
            340                 345                 350

Met Asp Arg Ala Ile Gly Gln Ala Gly Ser Leu Thr Ser Ser Glu Asp
        355                 360                 365

Thr Leu Thr Val Val Thr Ala Asp His Ser His Val Phe Thr Phe Gly
370                 375                 380

Gly Tyr Thr Pro Arg Gly Asn Ser Ile Phe Gly Leu Ala Pro Met Leu
385                 390                 395                 400

Ser Asp Thr Asp Lys Lys Pro Phe Thr Ala Ile Leu Tyr Gly Asn Gly
                405                 410                 415

Pro Gly Tyr Lys Val Val Gly Gly Glu Arg Glu Asn Val Ser Met Val
            420                 425                 430

Asp Tyr Ala His Asn Asn Tyr Gln Ala Gln Ser Ala Val Pro Leu Arg
        435                 440                 445

His Glu Thr His Gly Gly Glu Asp Val Ala Val Phe Ser Lys Gly Pro
450                 455                 460

Met Ala His Leu Leu His Gly Val His Glu Gln Asn Tyr Val Pro His
465                 470                 475                 480

Val Met Ala Tyr Ala Ala Cys Ile Gly Ala Asn Leu Gly His Cys Ala
                485                 490                 495

Pro Ala Ser Ser Ala Gly Ser Leu Asp Asp Asp Asp Xaa Xaa Xaa Xaa
            500                 505                 510

Xaa Xaa Xaa Xaa
        515

<210> SEQ ID NO 19
<211> LENGTH: 516
<212> TYPE: PRT
<213> ORGANISM: Artificial Sequence
<220> FEATURE:
<223> OTHER INFORMATION: Recombinant TNAP polypeptide
<220> FEATURE:
<221> NAME/KEY: X
<222> LOCATION: (509)..(516)
<223> OTHER INFORMATION: E or no amino acid

```
<400> SEQUENCE: 19

Met His His His His His Glu Asn Leu Tyr Phe Gln Gly Met Leu
1               5                   10                  15

Val Pro Glu Lys Glu Lys Asp Pro Lys Tyr Trp Arg Asp Gln Ala Gln
            20                  25                  30

Glu Thr Leu Lys Tyr Ala Leu Glu Leu Gln Lys Leu Asn Thr Asn Val
        35                  40                  45

Ala Lys Asn Val Ile Met Phe Leu Gly Asp Gly Met Gly Val Ser Thr
    50                  55                  60

Val Thr Ala Ala Arg Ile Leu Lys Gly Gln Leu His His Asn Pro Gly
65                  70                  75                  80

Glu Glu Thr Arg Leu Glu Met Asp Lys Phe Pro Phe Val Ala Leu Ser
                85                  90                  95

Lys Thr Tyr Asn Thr Asn Ala Gln Val Pro Asp Ser Ala Gly Thr Ala
            100                 105                 110

Thr Ala Tyr Leu Cys Gly Val Lys Ala Asn Glu Gly Thr Val Gly Val
        115                 120                 125

Ser Ala Ala Thr Glu Arg Ser Arg Cys Asn Thr Thr Gln Gly Asn Glu
    130                 135                 140

Val Thr Ser Ile Leu Arg Trp Ala Lys Asp Ala Gly Lys Ser Val Gly
145                 150                 155                 160

Ile Val Thr Thr Thr Arg Val Asn His Ala Thr Pro Ser Ala Ala Tyr
                165                 170                 175

Ala His Ser Ala Asp Arg Asp Trp Tyr Ser Asp Asn Glu Met Pro Pro
            180                 185                 190

Glu Ala Leu Ser Gln Gly Cys Lys Asp Ile Ala Tyr Gln Leu Met His
        195                 200                 205

Asn Ile Arg Asp Ile Asp Val Ile Met Gly Gly Gly Arg Lys Tyr Met
210                 215                 220

Tyr Pro Lys Asn Lys Thr Asp Val Glu Tyr Glu Ser Asp Glu Lys Ala
225                 230                 235                 240

Arg Gly Thr Arg Leu Asp Gly Leu Asp Leu Val Asp Thr Trp Lys Ser
                245                 250                 255

Phe Lys Pro Arg Tyr Lys His Ser His Phe Ile Trp Asn Arg Thr Glu
            260                 265                 270

Leu Leu Thr Leu Asp Pro His Asn Val Asp Tyr Leu Leu Gly Leu Phe
        275                 280                 285

Glu Pro Gly Asp Met Gln Tyr Glu Leu Asn Arg Asn Asn Val Thr Asp
    290                 295                 300

Pro Ser Leu Ser Glu Met Val Val Ala Ile Gln Ile Leu Arg Lys
305                 310                 315                 320

Asn Pro Lys Gly Phe Phe Leu Leu Val Glu Gly Gly Arg Ile Asp His
                325                 330                 335

Gly His His Glu Gly Lys Ala Lys Gln Ala Leu His Glu Ala Val Glu
            340                 345                 350

Met Asp Arg Ala Ile Gly Gln Ala Gly Ser Leu Thr Ser Ser Glu Asp
        355                 360                 365

Thr Leu Thr Val Val Thr Ala Asp His Ser His Val Phe Thr Phe Gly
    370                 375                 380

Gly Tyr Thr Pro Arg Gly Asn Ser Ile Phe Gly Leu Ala Pro Met Leu
385                 390                 395                 400

Ser Asp Thr Asp Lys Lys Pro Phe Thr Ala Ile Leu Tyr Gly Asn Gly
                405                 410                 415
```

```
Pro Gly Tyr Lys Val Val Gly Gly Glu Arg Glu Asn Val Ser Met Val
            420             425             430

Asp Tyr Ala His Asn Asn Tyr Gln Ala Gln Ser Ala Val Pro Leu Arg
            435             440             445

His Glu Thr His Gly Gly Glu Asp Val Ala Val Phe Ser Lys Gly Pro
            450             455             460

Met Ala His Leu Leu His Gly Val His Glu Gln Asn Tyr Val Pro His
465             470             475             480

Val Met Ala Tyr Ala Ala Cys Ile Gly Ala Asn Leu Gly His Cys Ala
            485             490             495

Pro Ala Ser Ser Ala Gly Ser Leu Glu Glu Glu Glu Xaa Xaa Xaa Xaa
            500             505             510

Xaa Xaa Xaa Xaa
        515

<210> SEQ ID NO 20
<211> LENGTH: 19
<212> TYPE: PRT
<213> ORGANISM: Artificial Sequence
<220> FEATURE:
<223> OTHER INFORMATION: Signal peptide

<400> SEQUENCE: 20

Met Thr Arg Leu Thr Val Leu Ala Leu Leu Ala Gly Leu Leu Ala Ser
1               5                   10                  15

Ser Arg Ala
```